US012598192B1

(12) United States Patent
Bhat et al.

(10) Patent No.: US 12,598,192 B1
(45) Date of Patent: Apr. 7, 2026

(54) SWITCHING INPUT MODALITIES BASED ON DATA SECURITY ENVIRONMENT

(71) Applicant: Citibank, N.A., New York, NY (US)

(72) Inventors: Ganesh Prasad Bhat, West Orange, NJ (US); Ramee Karthikeyan, Monmouth Junction, NJ (US); Emily Mclaughlin, New York, NY (US); Joshua Goldman, Merrick, NY (US); James Myers, Clearwater Beach, FL (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/370,254

(22) Filed: Oct. 27, 2025

(51) Int. Cl.
*H04L 29/06* (2006.01)
*H04L 9/40* (2022.01)

(52) U.S. Cl.
CPC ............ *H04L 63/105* (2013.01); *H04L 63/08* (2013.01)

(58) Field of Classification Search
CPC .............................. H04L 63/105; H04L 63/08
See application file for complete search history.

(56) References Cited

U.S. PATENT DOCUMENTS

2025/0352907 A1* 11/2025 Crabtree ................. G06T 19/00

FOREIGN PATENT DOCUMENTS

WO        WO-2025240379 A1 * 11/2025 ............. G06V 10/82

OTHER PUBLICATIONS

U.S. Appl. No. 19/370,184, filed Oct. 27, 2025, Ganesh Prasad Bhat et al., Multi-Modal Adaptive System for Personalized Data Transformation.
U.S. Appl. No. 19/370,299, filed Oct. 27, 2025, Ganesh Prasad Bhat et al., Multi-Modal Adaptive AI With AUtomatic Accessibility Detection.

* cited by examiner

*Primary Examiner* — Izunna Okeke

(74) *Attorney, Agent, or Firm* — Perkins Coie LLP

(57)        ABSTRACT

A multi-modal adaptive artificial intelligence system automatically detects user accessibility needs and personalizes content delivery across multiple presentation formats. The system may modify input modalities based on security requirements, automatically switching between voice, gesture, touch, or biometric inputs when handling sensitive data. Additionally, the system detects user disabilities through behavioral analysis and generates compliant interfaces with appropriate accommodations for color vision deficiencies, dyslexia, ADHD, and motor control limitations.

14 Claims, 14 Drawing Sheets

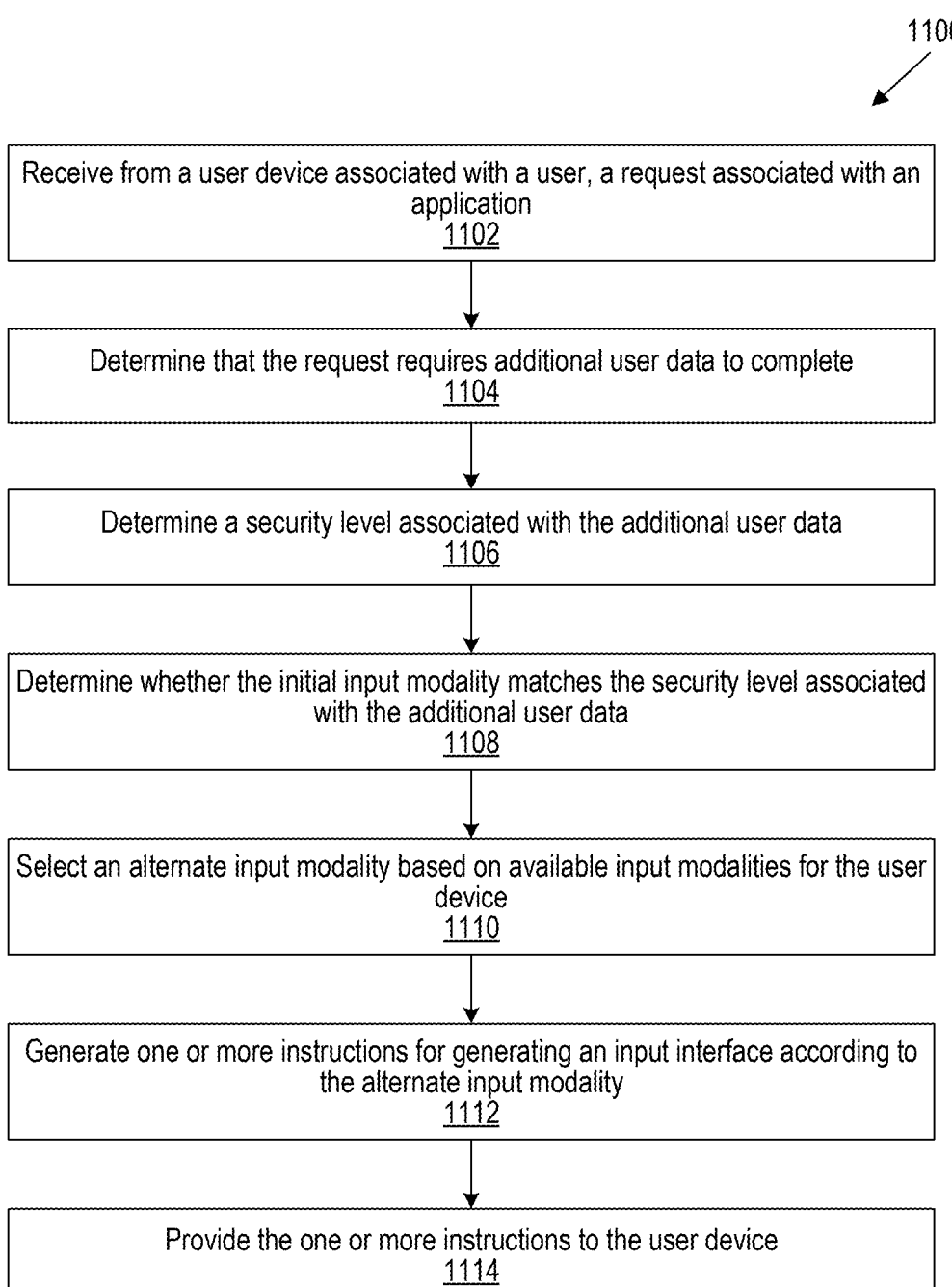

1100

Receive from a user device associated with a user, a request associated with an application
1102

Determine that the request requires additional user data to complete
1104

Determine a security level associated with the additional user data
1106

Determine whether the initial input modality matches the security level associated with the additional user data
1108

Select an alternate input modality based on available input modalities for the user device
1110

Generate one or more instructions for generating an input interface according to the alternate input modality
1112

Provide the one or more instructions to the user device
1114

*FIG. 11*

Multi-Modal Pattern Recognition for Accessibility Needs

No user disclosure required • Privacy-preserving detection • Continuous learning

Color Vision Deficiency Detection 1203

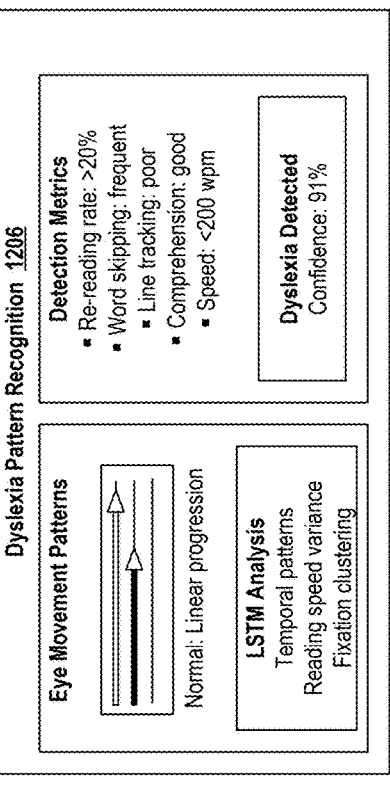

Behavioral Indicators
- Hesitation on color choices
- Incorrect color selections
- Hover patterns over colors
- Task completion delays
- Error clustering analysis

Classification Types

Normal   Protanopia
Deuteranopia   Tritanopia

Confidence Threshold: 85%

CNN Classification
Input: Click heatmaps
Output: Color blindness type
Accuracy: 94.7%

Dyslexia Pattern Recognition 1206

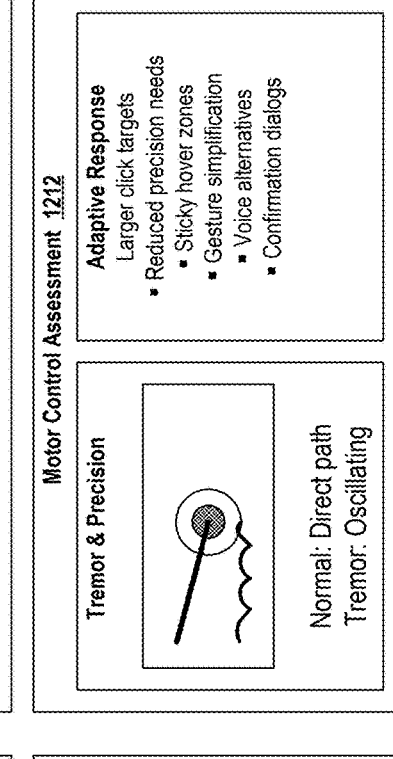

Eye Movement Patterns

Normal: Linear progression

LSTM Analysis
Temporal patterns
Reading speed variance
Fixation clustering

Detection Metrics
- Re-reading rate: >20%
- Word skipping: frequent
  - Line tracking: poor
- Comprehension: good
  - Speed: <200 wpm

Dyslexia Detected
Confidence: 91%

ADHD & Attention Pattern Detection 1209

Behavioral Markers
- Rapid task switching
- Short focus periods
- High click frequency
- Incomplete workflows
- Distraction patterns Focus Duration Timeline

Detection Algorithm if avg_focus < 5min
  AND switch_rate > 10/hr
  AND completion < 60%
  AND interaction_speed > $\mu + 2\sigma$
then:
  ADHD_probability = HIGH
  activate_focus_aids( )

Motor Control Assessment 1212

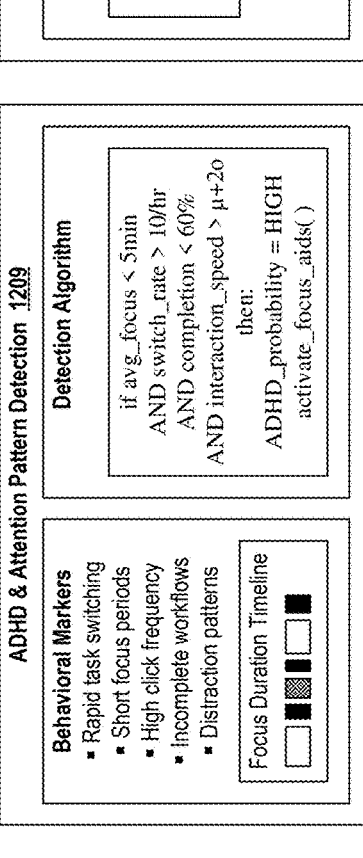

Tremor & Precision

Normal: Direct path
Tremor: Oscillating

Adaptive Response
- Larger click targets
- Reduced precision needs
  - Sticky hover zones
  - Gesture simplification
  - Voice alternatives
  - Confirmation dialogs

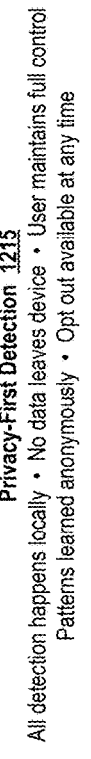

Privacy-First Detection 1215

All detection happens locally • No data leaves device • User maintains full control • Patterns learned anonymously • Opt out available at any time

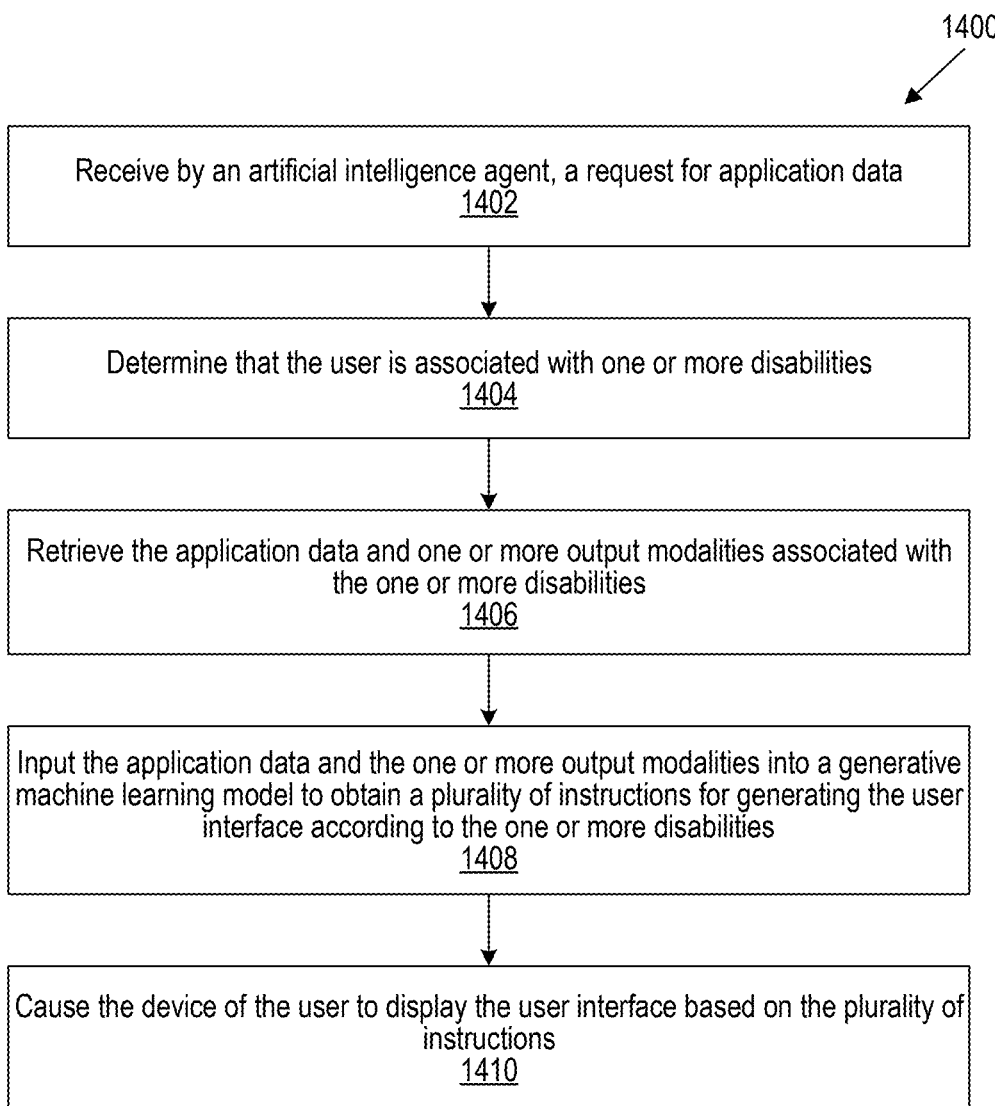

Receive by an artificial intelligence agent, a request for application data
1402

Determine that the user is associated with one or more disabilities
1404

Retrieve the application data and one or more output modalities associated with the one or more disabilities
1406

Input the application data and the one or more output modalities into a generative machine learning model to obtain a plurality of instructions for generating the user interface according to the one or more disabilities
1408

Cause the device of the user to display the user interface based on the plurality of instructions
1410

*FIG. 14*

SWITCHING INPUT MODALITIES BASED ON DATA SECURITY ENVIRONMENT

BACKGROUND

Artificial intelligence systems have become increasingly prevalent in various applications, from virtual assistants to content management platforms. These systems typically deliver information through predetermined formats, most commonly text-based interfaces, without considering individual user preferences or accessibility requirements. This standardized approach to content presentation creates barriers for users who may benefit from alternative presentation modalities or require specific accommodations.

Current accessibility solutions in digital systems often operate as separate, manually-configured tools that require users to actively identify and declare their needs. Screen readers, color adjustment filters, and text-to-speech systems function independently without intelligent integration or automatic adaptation capabilities. These fragmented approaches place the burden on users to configure multiple systems across different applications, resulting in inconsistent experiences and potential gaps in accessibility coverage.

Furthermore, compliance with accessibility standards such as the Americans with Disabilities Act (ADA), Web Content Accessibility Guidelines (WCAG), and Section 508 requirements adds complexity for organizations deploying AI systems. Manual compliance verification and remediation processes are time-intensive and may not address the dynamic nature of AI-generated content, creating ongoing challenges for maintaining accessibility standards across diverse user interactions.

SUMMARY

A multi-modal adaptive artificial intelligence system (e.g., an AI agent) is described herein that automatically detects user accessibility needs and personalizes content delivery across multiple presentation formats. The AI agent may receive requests for application data from user devices, such that the application data includes text, images, videos, or audio content delivered through a user interface. The AI agent may then retrieve user interface parameters from a user repository along with the requested application data from various applications, such that these parameters may specify delivery modes, data complexity levels, audio preferences, and video preferences. The AI agent may input the application data and user interface code into a generative machine learning model with modification commands, using the user interface parameters to guide the transformation process and receive uniquely generated modification data from the generative machine learning model that is specifically tailored for each user based on their individual interface parameters. Furthermore, the AI agent may modify both the application data and user interface code using this modification data to create personalized modified application data and an adapted user interface and may transmit the modified application data along with the customized user interface back to the user's device for display.

In some implementations, the system may modify input modalities based on the type of data needed for performing the user request. In particular, the AI agent may receive a request from a user device that has been input using an initial input modality, where the request is associated with an application and handled by an artificial intelligence agent configured to autonomously execute operations on software applications. The AI agent may determine that completing the request requires additional user data to be input by the user through their device and may then determine a security level associated with this additional user data, such that the security level indicates how sensitive the data is. Furthermore, the AI agent may evaluate whether the initial input modality used for the original request matches the security level required for the additional user data. When the AI agent determines that the initial input modality does not match the required security level, the AI agent may select an alternate input modality from the available input options on the user device based on the security requirements. The AI agent may then generate instructions for creating an input interface that uses this alternate input modality, enabling the user to securely input the additional data. The AI agent may then provide these instructions to the user device, which then generates the secure input interface and allows the user to input the additional data through the more appropriate modality.

In some implementations, the AI agent may be configured to detect user disabilities and modify user interfaces and/or application data to comply with certain rules. In particular, the multi-modal adaptive artificial intelligence system (e.g., the AI agent) may receive requests for application data from user devices, such that the application data includes text, images, videos, or audio content delivered through a user interface. The AI agent may determine that a given user is associated with one or more disabilities, with each disability being associated with a corresponding output modality. The AI agent may then retrieve the application data from one or more applications and retrieve one or more output modalities associated with the identified disabilities. The output modalities may be associated with delivery mode parameters, data complexity parameters, audio preference parameters, or video preference parameters. The AI agent may input the application data and the one or more output modalities into a generative machine learning model to obtain a plurality of instructions for generating the user interface according to the one or more disabilities. The plurality of instructions may generate the user interface that modifies the application data according to the one or more output modalities. The system may cause the user's device to display the user interface, where the user interface is generated based on the plurality of instructions.

According to an aspect of the present disclosure, systems, methods, and media are provided for modifying user interfaces for different user preferences. The multi-modal adaptive artificial intelligence system may receive requests for application data from user devices. The application data may be delivered to a user when obtained using a user interface. The application data may include one or more of textual data, image data, video data, or audio data. For example, a user may request access to a travel application that displays information through text, charts, and video tutorials.

The multi-modal adaptive artificial intelligence system may retrieve a plurality of user interface parameters and the application data. The application data may be retrieved from one or more applications and the plurality of user interface parameters may be retrieved from a user repository. The plurality of user interface parameters may include one or more of delivery mode parameter, data complexity parameter, audio preference parameter, or video preference parameter. For example, the system may retrieve user preferences indicating the user prefers audio narration, simplified language, and high contrast visual elements from a centralized user profile database. In some implementations, the user preferences may be derived from previous interactions or from the preferences the user has previously set.

The multi-modal adaptive artificial intelligence system may input the application data and the user interface including user interface code into a generative machine learning model with a modification command to modify the user interface code and the application data using the plurality of user interface parameters. The plurality of user interface parameters may be input into the generative machine learning model for modifying the user interface code and the application data. For example, the system may provide the travel application's code along with user preferences to a transformer-based language model that generates customized interface and application data modifications.

The multi-modal adaptive artificial intelligence system may receive modification data for the application data and the user interface code from the generative machine learning model. The modification data may be uniquely generated by the generative machine learning model for the user based on the plurality of user interface parameters. For example, the generative model may output specific CSS styling changes, alternative text descriptions, and audio file references tailored to the individual user's accessibility needs. In another example, the system may substitute audio or video files based on user preferences.

The multi-modal adaptive artificial intelligence system may modify the application data and the user interface code using the modification data to generate modified application data and a modified user interface. For example, the system may apply the generated modifications to transform standard black text on white background to high-contrast yellow text on dark blue background with accompanying audio descriptions. The system may also provide explanations for certain text and/or add descriptions to video and/or audio files. In some implementations, the system may replace text and/or audio/video files with other data that is more appropriate for the user based on those preferences.

The multi-modal adaptive artificial intelligence system may then transmit the modified application data with the modified user interface to the user device. For example, the customized travel interface with enhanced accessibility features may be sent back to the user's smartphone or computer for display.

According to another of the present disclosure, the multi-modal adaptive artificial intelligence system may include one or more of the following features. The system may determine using the generative machine learning model and based on one or more of facial expression, eye tracking, or interaction patterns, that a complexity level associated with the application data and the user interface is improper for the user. The system may input, as a parameter of the plurality of user interface parameters, a user complexity level into the generative machine learning model to receive alternative application data and an alternative user interface. The system may then receive from the generative machine learning model the alternative application data. The alternative application data may be the application data that is modified to lower the complexity level of the application data.

In some implementations, the system may split the application data according to placement of the application data within the user interface into a plurality of application data segments based on determining that the complexity level of the application data is improper. The system may input the plurality of application data segments into the generative machine learning model with a command to generate a corresponding explanation for each data segment of the plurality of application data segments. Each explanation may correspond to the user complexity level. The system may receive the corresponding explanation for each data segment from the generative machine learning model and may add each corresponding explanation to the modified user interface according to the placement of each corresponding data segment of the plurality of application data segments.

In some implementations, the system may split the application data based on context of the application data into a plurality of application data segments based on determining that the complexity level of the application data is improper for the user (e.g., does not match a known complexity level associated with the user). The system may input the plurality of application data segments into the generative machine learning model with a command to generate a corresponding explanation for each data segment. Each explanation may correspond to the user complexity level (e.g., a complexity level that enables the user to comprehend the information). In some implementations, the system may generate, for each corresponding explanation, an audio segment to be added to the modified user interface. In yet some implementations, the system may determine that the modification data indicates that video file parameters of a video file within the application data do not match the plurality of user interface parameters. The system may identify an alternative video file having the video file parameters matching the plurality of user interface parameters. The system may replace the video file with the alternative video file.

In some implementations, the system may determine that the modification data indicates that video file parameters of a video file within the application data do not match the plurality of user interface parameters. The system may identify portions of the video file that do not match the plurality of user interface parameters. The system may modify the portions of the video file that do not match the plurality of user interface parameters. For example, the system may replace certain portions (e.g., inappropriate portions) of the video file or cut those portions out.

In some implementations, the system may determine using the generative machine learning model and based on one or more of facial expression, eye tracking, or interaction patterns, that the user interface is not optimal for the user. The system may generate for display to the user a prompt as to whether to change the user interface. The prompt may indicate one or more causes for the user interface not to be optimal for the user.

According to another aspect of the present disclosure, methods, systems, and media are provided for modifying input modalities based on the type of data that the user is to input into the user's device. The multi-modal adaptive artificial intelligence system may receive, from a user device associated with a user, a request associated with an application that includes a component residing on the user device. The request may have been input using an initial input modality of the user device. The artificial intelligence agent may be associated with a corresponding computer-executable operation set configured to be autonomously executed by the artificial intelligence agent on a software application set. For example, a user may speak a voice command to book a flight through a travel application on their smartphone.

The multi-modal adaptive artificial intelligence system may determine that the request requires additional user data to complete (e.g., login information, credit card information, etc.). The additional user data may be input by the user using the user device. For example, the system may determine that completing a travel booking requires the user to input sensitive login information or credit card numbers. Thus, the multi-modal adaptive artificial intelligence system may determine a security level associated with the additional user data. The security level may indicate a sensitivity level associated with the additional user data. For example, the system may classify login information and/or credit card numbers as highly sensitive data requiring enhanced security measures.

The multi-modal adaptive artificial intelligence system may then determine whether the initial input modality matches the security level associated with the additional user data. For example, the system may evaluate whether voice input in a public environment (e.g., in a taxi or while walking outside) is appropriate for entering sensitive information. The multi-modal adaptive artificial intelligence system may then select (e.g., based on the public environment being inappropriate) an alternate input modality based on available input modalities for the user device. That is, the selection is based on determining that the initial input modality does not match the security level associated with the additional user data. The selection may be based on the security level associated with the additional user data. For example, the system may switch from voice input to a secure visual interface with encrypted text entry when detecting the user is in a public location.

The multi-modal adaptive artificial intelligence system may generate one or more instructions for generating an input interface according to the alternate input modality. The input interface may enable the user to input the additional user data via the alternate input modality. For example, the system may create instructions to display a secure keypad interface with screenshot prevention enabled. The multi-modal adaptive artificial intelligence system may then provide the one or more instructions to the user device. The user device may generate the input interface and enable input of the additional user data via the input interface. For example, the smartphone may display the secure interface allowing the user to safely enter their login information and/or credit card number through touch input.

According to other aspects of the present disclosure, the multi-modal adaptive artificial intelligence system may include one or more of the following features. The alternate input modality may include one of a voice input, a gesture input, a touch input, a key-press input, or a biometric input. Furthermore, the system may determine that the additional user data will include authentication data for authenticating with the application. The system may set the security level to a metric not compatible with the initial input modality based on determining that the additional user data will include the authentication data.

The system may also determine that the additional user data will include account identification data for accessing an account associated with the user. Based on determining that the additional user data will include the account identification data, the system may assign a high security level as the security level. The high security level may indicate that a high security modality is required.

In some implementations, the system may determine a location parameter and a movement parameter associated with a location of the user device. The system may also determine audio characteristics of the location of the user device. The system may then generate a security metric associated with the location of the user device and, based on the security metric and the privacy setting, whether the initial input modality matches the privacy setting. In some implementations, the system may determine an initial output modality being used by the user device does not match an output security level associated with the initial output data. The system may select an alternate output modality for displaying the initial output data based on the security level associated with the initial output data.

According to another aspect of the present disclosure, methods, systems, and media are provided for modifying user interfaces for users with disabilities. The multi-modal adaptive artificial intelligence system may receive, from device associated with a user by an artificial intelligence agent, a request for application data. The application data may be delivered using a user interface. The application data may include one or more of text data, image data, video data, or audio data. The artificial intelligence agent may be associated with a corresponding computer-executable operation set configured to be autonomously executed by the artificial intelligence agent on a software application set. For example, a user with visual impairments may request access to an online application through their tablet device.

The multi-modal adaptive artificial intelligence system may determine that the user is associated with one or more disabilities. Each disability may be associated with a corresponding output modality. For example, the system may detect through behavioral analysis that the user has color blindness and requires alternative visual presentation methods. The multi-modal adaptive artificial intelligence system may retrieve the application data and one or more output modalities associated with the one or more disabilities. The application data may be retrieved from one or more applications. The one or more output modalities may be associated with one or more of delivery mode parameter, data complexity parameter, audio preference parameter, or video preference parameter. For example, the system may retrieve application content and corresponding accessibility parameters for color-blind users, including high contrast settings and pattern overlays.

The multi-modal adaptive artificial intelligence system may input the application data and the one or more output modalities into a generative machine learning model to obtain a plurality of instructions for generating the user interface (including modified application data) according to the one or more disabilities. The plurality of instructions may generate the user interface that modifies the application data according to the one or more output modalities. For example, the system may use a transformer model to generate specific interface modifications that replace color-only indicators with pattern-based visual cues. Furthermore, the images and/or text may be modified according to the user's disability.

The multi-modal adaptive artificial intelligence system may then cause the device of the user to display the user interface. The user interface may be generated based on the plurality of instructions, as described above. For example, the tablet may display the application with enhanced visual accessibility features automatically applied such that not just the user interface is modified, but the application data is modified to enable a user to digest that data. For example, text data may be replaced with audio data, etc.

According to other aspects of the present disclosure, the multi-modal adaptive artificial intelligence system may include one or more of the following features. The system may determine that the one or more disabilities are associated with one or more input modalities. The system may retrieve a plurality of device input modalities associated with the device of the user, and input the one or more input modalities and the plurality of device input modalities into the generative machine learning model to obtain one or more device commands for activating device component for enabling the one or more input modalities. The one or more input modalities may include one or more of input mode parameter, input complexity parameter, audio input parameter, or video input parameter.

In some implementations, the system may receive, in near-real time from the device of the user, user interaction data such as eye fixation metrics, saccade patterns, pupil response, and blink data. The system may determine one or more of reading patterns, confusion indicators, engagement metrics or cognitive load. The system may then generate, based on one or more of the reading patterns, the confusion indicators, the engagement metrics or the cognitive load, the one or more output modalities for the one or more disabilities. The one or more output modalities may include content definitions for the application data, visual aids for the application data, simplified textual data for the application data, or examples of the application data.

In some implementations, the system may receive the application data, a user context including a user disability profile, and real-time sensor data. The application data may include textual data and audiovisual data. The real-time sensor data may include eye fixation metrics, saccade patterns, pupil response, and blink data. The system may analyze the application data to determine semantic context of the application data, complexity of the application data, or structure of the application data. The system may then determine, based on comparing the semantic context of the application data, the complexity of the application data, or the structure of the application data with a parameter set associated with the user, a plurality of transformations for the application data. The system may execute the plurality of transformations to generate modified application data. The modified application data may be delivered using the one or more output modalities associated with the one or more disabilities of the user.

In some implementations, the system may generate a user profile including the one or more output modalities and one or more input modalities. The one or more output modalities may include one or more of input mode parameter, input complexity parameter, audio input parameter, or video input parameter. The one or more input modalities may include one or more of the input mode parameter, the input complexity parameter, the audio input parameter, or the video input parameter.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

FIG. 11 is a flowchart of operations for modifying input modalities, in accordance with one or more embodiments of this disclosure.

FIG. 12 illustrates a multi-modal pattern recognition system for accessibility needs, in accordance with one or more embodiments of this disclosure.

FIG. 14 is a flowchart of operations for identifying accessibility needs and modifying user interface and application data, in accordance with one or more embodiments of this disclosure.

DETAILED DESCRIPTION

Figure 1:
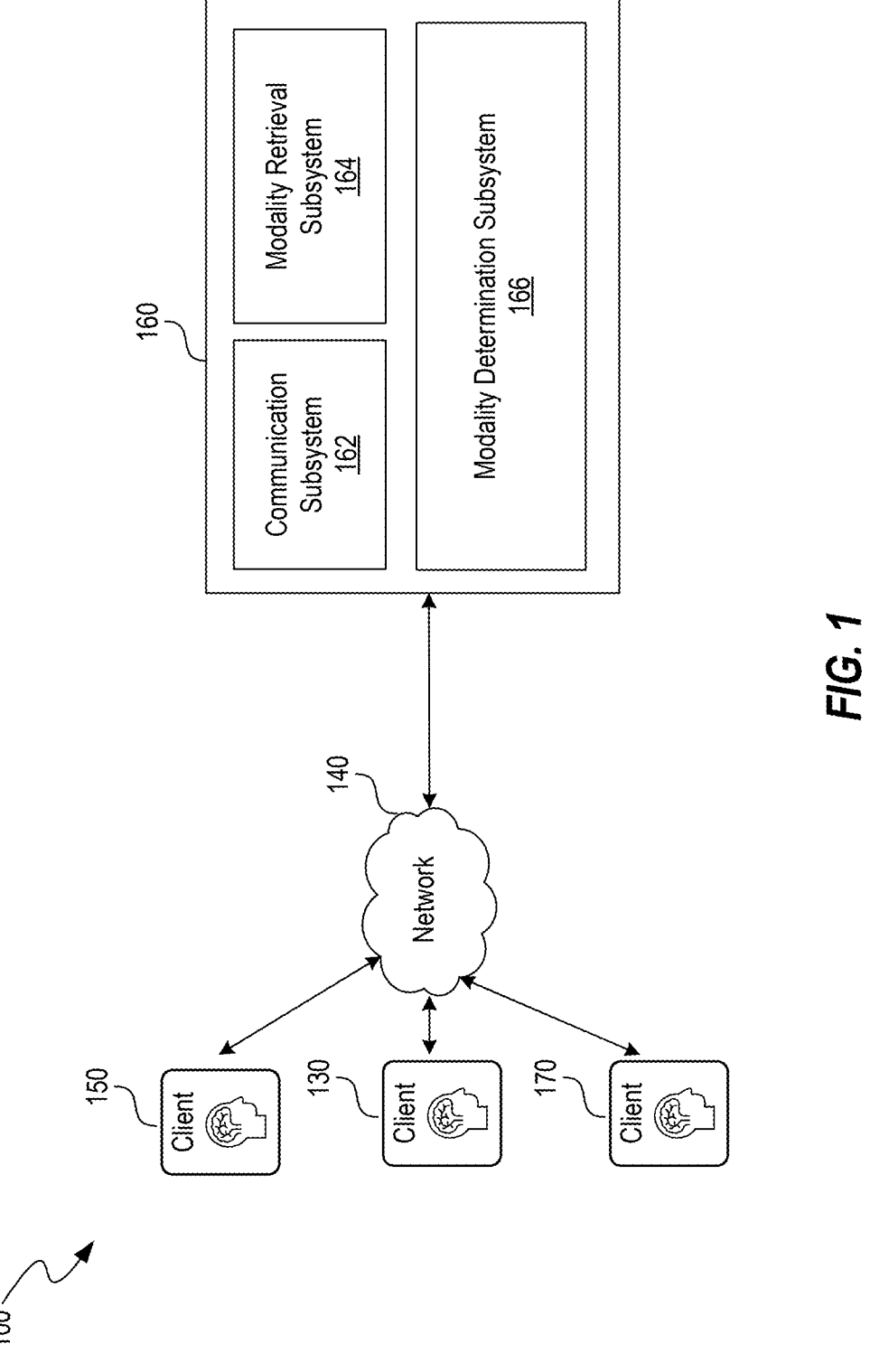
FIG. 1 shows an illustrative system for modifying input and output modalities, in accordance with one or more embodiments of this disclosure.

The following description sets forth exemplary aspects of the present disclosure. It should be recognized, however, that such description is not intended as a limitation on the scope of the present disclosure. Rather, the description also encompasses combinations and modifications to those exemplary aspects described herein. Furthermore, in the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement.

A multi-modal adaptive AI system may provide automated detection of user accessibility needs and personalized content delivery across text, audio, visual, and video presentation formats. The system may analyze user interaction patterns and behavioral indicators to identify accessibility requirements without requiring explicit user disclosure of disabilities or conditions. Through real-time monitoring of user engagement and comprehension patterns, the system may automatically adapt content presentation to accommodate diverse cognitive styles, visual processing differences, and attention patterns.

The system may maintain a universal user preference profile that governs content adaptation across all AI interactions. This profile may store personalized settings for visual preferences including color schemes, typography selections, and display configurations. Audio preferences may include voice characteristics, speech parameters, and sound enhancement options. Content preferences may encompass information density levels, language complexity settings, and preferred modality hierarchies for information presentation.

Content transformation capabilities may enable real-time adaptation of application data while preserving semantic meaning and context. The system may automatically adjust color palettes for users with color vision deficiencies, modify font selections and spacing for reading pattern differences, and provide alternative content formats based on detected comprehension challenges. Voice synthesis may be customized with personalized characteristics including tone, speed, accent, and gender preferences.

The system may incorporate compliance frameworks to ensure adherence to accessibility standards including Americans with Disabilities Act requirements, Web Content Accessibility Guidelines, and Section 508 specifications. Automated compliance verification may occur during content transformation processes to maintain legal accessibility standards across all adapted content presentations.

Comprehension analysis capabilities may monitor user engagement through multiple sensing modalities to detect when users experience difficulty with presented content. The system may provide automatic augmentations including contextual definitions, visual aids, simplified language alternatives, and supplementary explanations when comprehension challenges are identified. These augmentations may be delivered seamlessly without interrupting the natural flow of user interaction.

Referring to FIG. 1, an environment 100 may include multiple clients 130, 150, 170 connected through a network 140 to a modality modification system 160. The modality modification system 160 may be designed with a modular architecture that enables scalable processing and real-time adaptation capabilities while maintaining high performance across multiple concurrent user sessions. The clients 130, 150, 170 may each establish bidirectional communication connections with the network 140 to facilitate data exchange with the modality modification system 160.

The modality modification system 160 may include a communication subsystem 162, a modality retrieval subsystem 164, and a modality determination subsystem 166 arranged in a block configuration. The communication subsystem 162 may handle incoming requests from the clients 130, 150, 170 and manage data transmission protocols across the network 140. The modality retrieval subsystem 164 may access stored user preference profiles and application data from distributed storage systems. The modality determination subsystem 166 may analyze user requirements and select appropriate content transformation strategies based on detected accessibility needs and preference settings.

With continued reference to FIG. 1, the modular architecture of the modality modification system 160 may enable independent scaling of each subsystem based on processing demands. The communication subsystem 162 and modality retrieval subsystem 164 may be positioned in an upper portion of the system architecture, while the modality determination subsystem 166 may span a lower portion to provide centralized decision-making capabilities. This configuration may allow for distributed processing loads and fault-tolerant operation across the system components.

Figure 2:
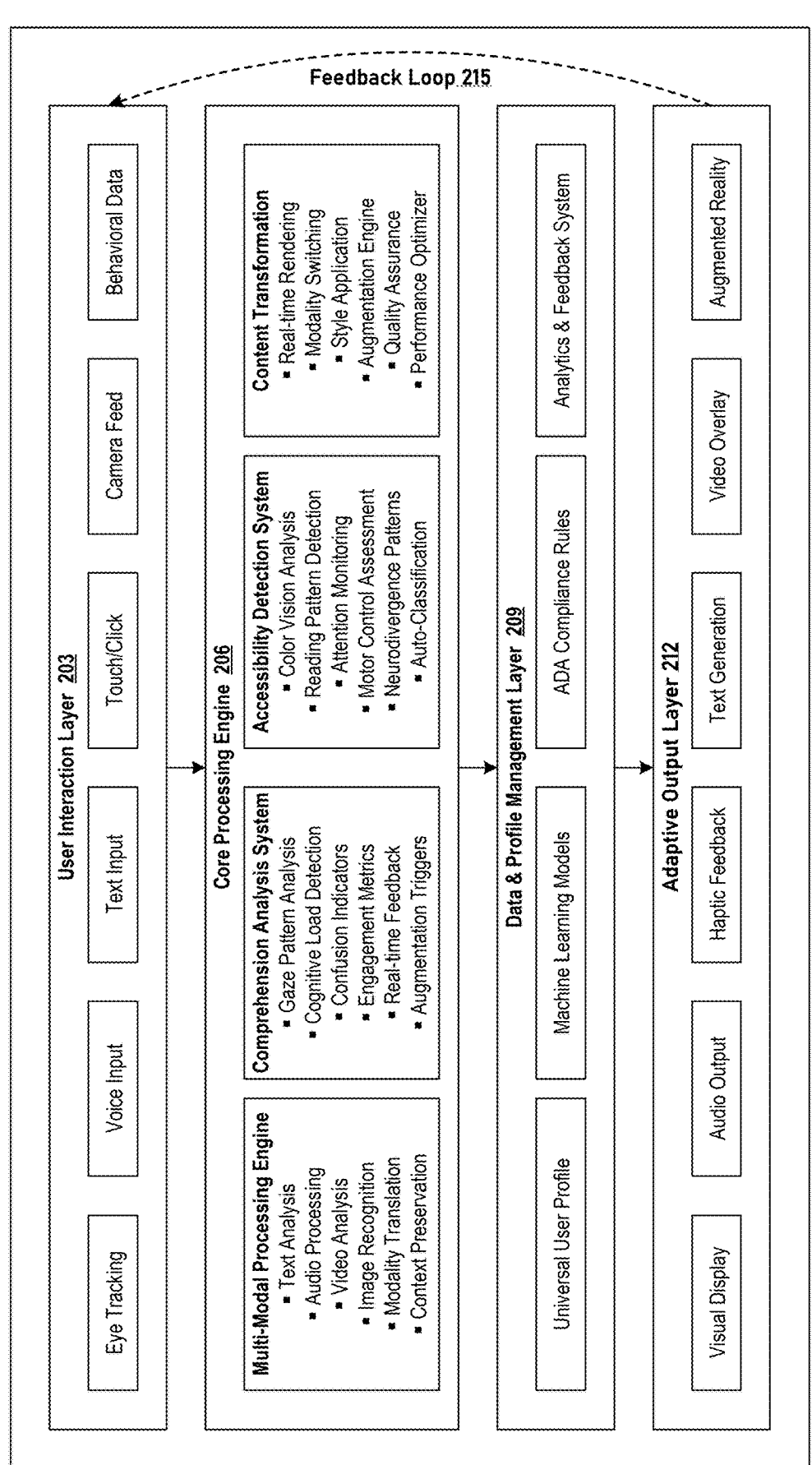
FIG. 2 illustrates an exemplary architecture for modifying output modalities, in accordance with one or more embodiments of this disclosure.

Referring to FIG. 2, a user interaction layer 203 may provide multiple input mechanisms for capturing user data and behavioral patterns. The user interaction layer 203 may include eye tracking components for monitoring gaze patterns, voice input systems for processing spoken commands, text input interfaces for receiving typed content, touch and click detection for capturing interaction patterns, camera feed analysis for facial expression monitoring, and behavioral data collection systems for pattern recognition.

A core processing engine 206 may be positioned below the user interaction layer 203 and may contain four main processing subsystems for handling multi-modal content analysis. The core processing engine 206 may include a multi-modal processing engine for simultaneous analysis of text, audio, video, and image data streams. A comprehension analysis system within the core processing engine 206 may perform pattern analysis and cognitive load detection based on user interaction data. An accessibility detection system may analyze vision patterns and reading behaviors to identify user accommodation needs. A content transformation component may handle rendering operations and style application for adapted content presentation.

As further shown in FIG. 2, a data profile management layer 209 may be positioned below the core processing engine 206 and may implement encrypted cloud storage with local caching capabilities for user preference data. The data profile management layer 209 may provide cross-device synchronization to maintain consistent user profiles across multiple client devices. Universal user profile management within the data profile management layer 209 may store personalized settings and accessibility configurations. Machine learning models within the data profile management layer 209 may analyze user patterns and improve adaptation strategies over time. ADA compliance rules may be maintained within the data profile management layer 209 to ensure accessibility standard adherence. Analytics and feedback capabilities may monitor system performance and user satisfaction metrics.

An adaptive output layer 212 may provide multiple output modalities for delivering transformed content to users. The adaptive output layer 212 may support voice synthesis with fifteen or more voice options including variations in gender, age, and accent characteristics. Visual display capabilities within the adaptive output layer 212 may render adapted content with customized color schemes, typography, and layout modifications. Audio output systems may provide enhanced narration and sound-based feedback. Haptic feedback mechanisms may deliver tactile responses for users with visual or auditory processing differences. Text generation capabilities may produce simplified or enhanced textual content based on user comprehension levels. Video overlay systems may add contextual information and visual aids to multimedia content. Augmented reality functionality may provide immersive content presentation options.

A feedback loop 215 may connect the adaptive output layer 212 back to the user interaction layer 203 to enable continuous monitoring and refinement of content adaptation strategies. The feedback loop 215 may collect user response data, engagement metrics, and effectiveness measurements to inform future content transformation decisions. This closed-loop system may enable the modality modification system 160 to learn from user interactions and improve adaptation accuracy over time.

The system may implement one or more non-transitory computer-readable media storing instructions for modifying user interfaces for different user preferences. The instructions may cause one or more processors within the modality modification system 160 to execute content transformation operations based on detected user needs and stored preference profiles. The modular architecture may enable distributed processing of these instructions across multiple system components while maintaining synchronized operation and consistent user experiences.

In some embodiments, the modality modification system 160 may be integrated as a component of an artificial intelligence agent that is configured to autonomously execute operations on software applications. The AI agent may utilize the modality modification system 160 to dynamically adapt user interfaces and content presentation based on detected accessibility needs, user preferences, and contextual requirements. The AI agent may leverage the communication subsystem 162, modality retrieval subsystem 164, and modality determination subsystem 166 to process user requests, analyze behavioral patterns, and generate personalized content transformations in real-time. Through this integration, the AI agent may provide seamless accessibility adaptations across multiple applications while maintaining compliance with accessibility standards and preserving the semantic meaning of original content during transformation processes.

The modality modification system 160 may receive requests for application data from user devices to initiate content adaptation processes. A user device associated with a user may transmit a request for application data to the modality modification system 160 through the network 140. The application data may be delivered using a user interface and may include one or more data types selected from textual data, image data, video data, or audio data. The textual data may include documents, web content, chat messages, or written instructions that require presentation to the user. Image data may encompass photographs, diagrams, charts, screenshots, or graphical elements that convey visual information. Video data may include recorded content, live streams, instructional videos, or multimedia presentations. Audio data may comprise voice recordings, music files, sound effects, or spoken content that provides auditory information to users.

The modality modification system 160 may retrieve a plurality of user interface parameters and the application data from distributed storage systems to support content transformation operations. The application data may be retrieved from one or more applications that store content in various formats and structures. These applications may include content management systems, databases, web services, or multimedia repositories that maintain the requested information. The plurality of user interface parameters may be retrieved from a user repository that stores personalized configuration settings and accessibility preferences for individual users. The user repository may maintain encrypted user profiles with cross-device synchronization capabilities to ensure consistent parameter availability across multiple client sessions.

The plurality of user interface parameters may include one or more parameter types selected from delivery mode parameter, data complexity parameter, audio preference parameter, or video preference parameter. A delivery mode parameter may specify the preferred presentation format for content delivery, such as text-first presentation, audio-first presentation, visual-first presentation, or mixed-modality presentation based on user cognitive processing preferences.

A data complexity parameter may indicate the appropriate level of information density and language complexity for the user, ranging from simplified presentations with basic vocabulary to detailed technical presentations with advanced terminology. An audio preference parameter may define voice characteristics including gender selection, age characteristics, accent preferences, speech speed ranging from 0.5× to 2.0× normal rate, pitch adjustments, and volume settings for optimal auditory processing. A video preference parameter may specify visual presentation settings including frame rate preferences, resolution requirements, caption display options, color enhancement settings, and motion sensitivity adjustments for users with visual processing differences.

The retrieval process may involve querying multiple data sources simultaneously to gather both the requested application data and the associated user interface parameters. The modality modification system 160 may implement caching mechanisms to reduce retrieval latency for frequently accessed user parameters and application content. Parameter validation may occur during the retrieval process to ensure that stored user interface parameters remain compatible with current system capabilities and accessibility standards. The retrieved parameters may be formatted and structured for input into subsequent content transformation processes within the core processing engine 206.

The modality modification system 160 may input the application data and a user interface including user interface code into a generative machine learning model with a modification command to modify the user interface code and the application data using the plurality of user interface parameters. The user interface code may define the structural elements, styling properties, and interactive components that determine how content is presented to users. The modification command may specify the types of transformations to be applied based on the retrieved user interface parameters and detected accessibility requirements. The plurality of user interface parameters may be input into the generative machine learning model for modifying the user interface code and the application data to create personalized content presentations.

The generative machine learning model may process multiple input streams simultaneously to generate comprehensive content transformations. The application data may be analyzed for semantic content, structural organization, and complexity levels to determine appropriate adaptation strategies. The user interface code may be parsed to identify modifiable elements including color schemes, typography settings, layout configurations, and interactive components. The modification command may provide specific instructions for the types of transformations to be applied, such as color palette adjustments for color vision deficiencies, font modifications for reading pattern differences, or content simplification for cognitive processing variations.

The core processing engine 206 may implement convolutional neural networks for eye tracking pattern analysis to support the generative machine learning model processing operations. These convolutional neural networks may analyze gaze position data, fixation duration measurements, saccade movement patterns, and pupil dilation responses to identify user comprehension patterns and engagement levels. The eye tracking pattern analysis may detect characteristic indicators of reading difficulties, attention variations, or visual processing challenges that inform content adaptation strategies. The convolutional neural networks may process temporal sequences of eye tracking data to recognize patterns associated with specific accessibility needs or cognitive processing styles.

Transformer models within the core processing engine 206 may perform content complexity assessment to evaluate the difficulty level of application data and determine appropriate simplification strategies. The transformer models may analyze textual content for vocabulary complexity, sentence structure patterns, conceptual density, and technical terminology usage. These models may generate complexity scores that guide content transformation decisions within the generative machine learning model. The transformer models may also assess cross-modal content relationships to maintain semantic coherence when adapting content across different presentation modalities.

The generative machine learning model may utilize the input parameters to create modification data that specifies precise transformations for both the user interface code and the application data. The model may generate cascading style sheet modifications for visual adaptations, audio synthesis parameters for voice customization, content restructuring instructions for complexity adjustments, and interactive element modifications for accessibility enhancements. The modification data may be structured to preserve the original semantic meaning of the application data while optimizing presentation format for individual user needs and preferences.

A selective multi-modal security switching system may demonstrate how the generative machine learning model processes security-sensitive content transformations. The system may analyze security requirements associated with different types of application data and generate appropriate modality switches to maintain data protection while ensuring accessibility. The generative machine learning model may evaluate security levels associated with user interface elements and application data to determine when alternative presentation modalities are required for sensitive information handling.

The security switching system may implement dynamic modality selection based on contextual security requirements and user accessibility needs. The generative machine learning model may process security parameters alongside user interface parameters to generate modification commands that balance accessibility requirements with data protection protocols. The system may automatically transition between voice interaction modes and visual presentation modes based on the sensitivity level of the application data being processed.

A proactive memory-based assistant architecture may illustrate how the generative machine learning model maintains context and user preference information across multiple interaction sessions. The architecture may demonstrate how the generative machine learning model accesses stored user interface parameters and applies them consistently across different types of application data and user interface modifications. The memory-based system may enable the generative machine learning model to learn from previous transformation results and refine future modification strategies based on user feedback and engagement patterns.

The proactive assistant architecture may show how the generative machine learning model processes temporal context information to generate time-aware content adaptations. The system may analyze user interaction patterns over time to identify optimal presentation strategies for different types of content and user states. The generative machine learning model may incorporate historical user interface parameter effectiveness data to improve the accuracy and relevance of generated modification commands for both user interface code and application data transformations.

The generative machine learning model may implement attention mechanisms to focus processing resources on the most relevant aspects of the user interface parameters when generating modification data. These attention mechanisms may prioritize accessibility-related parameters for users with detected disabilities, emphasize visual parameters for users with color vision differences, or focus on audio parameters for users who prefer auditory content presentation. The model may dynamically adjust attention weights based on real-time user interaction data and feedback signals collected through the system's monitoring capabilities.

Figure 5:
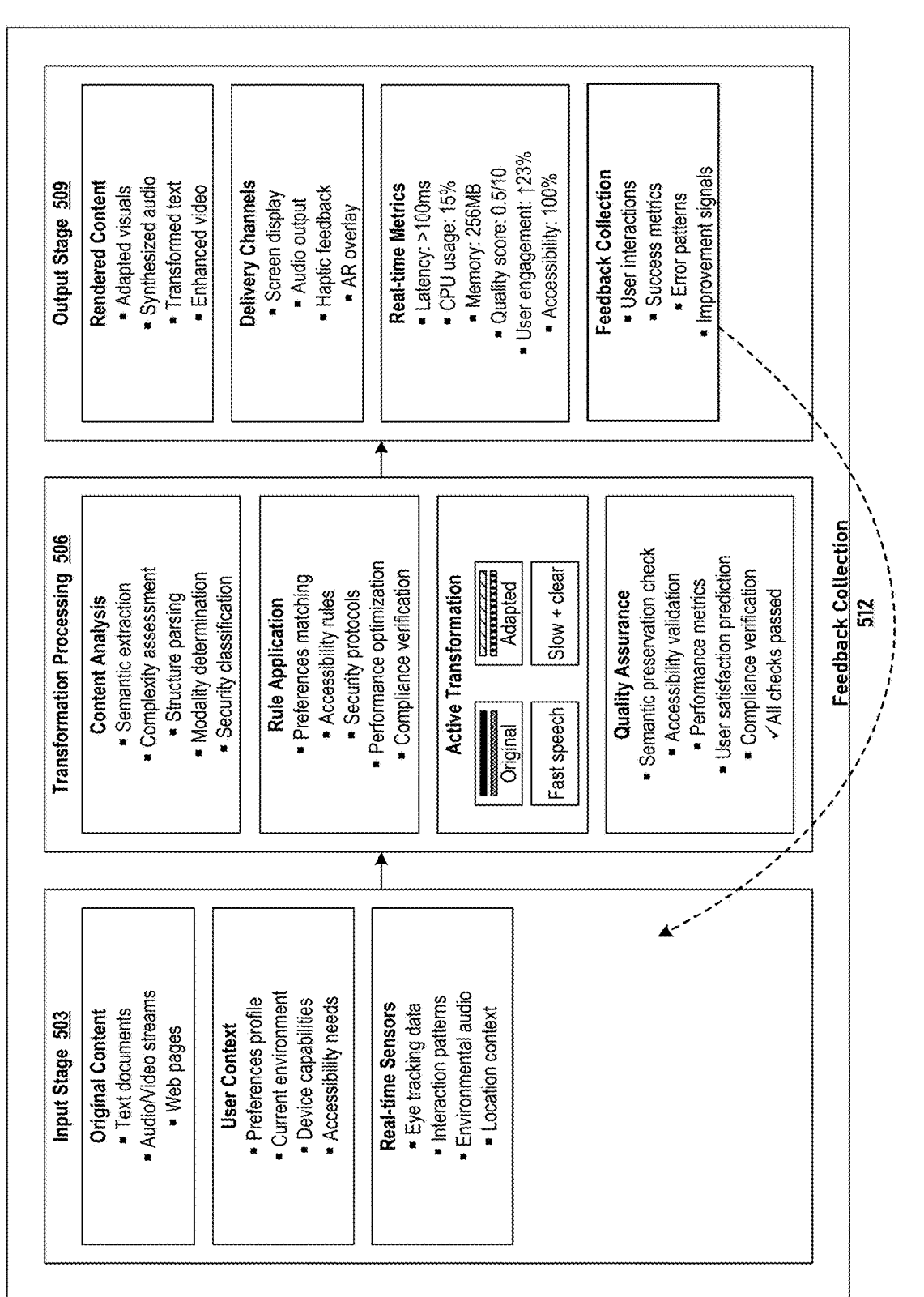
FIG. 5 illustrates a content transformation pipeline, in accordance with one or more embodiments of this disclosure.

Referring to FIG. 5, the modality modification system 160 may receive modification data from the generative machine learning model through a structured content transformation pipeline. The modification data may be uniquely generated by the generative machine learning model for the user based on the plurality of user interface parameters retrieved from the user repository. The modification data may specify precise transformations for both the application data and the user interface code to create personalized content presentations that accommodate detected accessibility needs and user preferences. The generative machine learning model may generate the modification data by analyzing the relationships between the user interface parameters and the structural elements of the application data to determine optimal adaptation strategies.

The modification data may include cascading style sheet modifications for visual adaptations, audio synthesis parameters for voice customization, content restructuring instructions for complexity adjustments, and interactive element modifications for accessibility enhancements. The modification data may specify color palette transformations for users with color vision deficiencies, font family changes and spacing adjustments for users with reading pattern differences, and content simplification strategies for users requiring reduced cognitive load. Audio modification parameters within the modification data may define voice characteristics including gender selection, speech speed adjustments, pitch modifications, and volume settings tailored to individual user preferences.

An input stage 503 may receive the modification data along with the original application data and user interface code for processing within the content transformation pipeline. The input stage 503 may validate the modification data to ensure compatibility with the existing application data structure and user interface code format. The input stage 503 may also incorporate user context information and real-time sensor data collected through the user interaction layer 203 to provide additional context for the transformation process. The input stage 503 may organize the modification data into structured transformation commands that can be processed efficiently by subsequent pipeline stages.

As further shown in FIG. 5, transformation processing 506 may modify the application data and the user interface code using the modification data to generate modified application data and a modified user interface. The transformation processing 506 may implement multiple parallel processing streams to handle different types of content modifications simultaneously while maintaining semantic coherence across all transformed elements. The transformation processing 506 may apply visual transformations to user interface code by modifying color values, font specifications, layout parameters, and interactive element properties based on the modification data specifications.

The transformation processing 506 may implement caching mechanisms for common transformations to reduce processing overhead and improve response times for frequently requested adaptations. Predictive pre-rendering capabilities within the transformation processing 506 may anticipate likely transformation requirements based on user behavior patterns and prepare modified content elements before explicit requests are received. The transformation processing 506 may maintain transformation templates for standard accessibility adaptations including color blindness accommodations, dyslexia-friendly formatting, and attention-focused interface simplifications.

Content analysis operations within the transformation processing 506 may parse the application data to identify modifiable elements including textual content, multimedia components, and interactive features. The transformation processing 506 may apply complexity reduction algorithms to textual content when the modification data specifies simplified presentation requirements. Audio content transformations may generate speech synthesis parameters with speed ranging from 0.5× to 2.0× normal rate based on user audio preference parameters. Visual content modifications may adjust font sizes from 12-24 pt and implement spacing modifications to accommodate reading pattern differences identified through user interface parameters.

The core processing engine 206 may maintain latency under 100 milliseconds for seamless user experience during content transformation operations performed by the transformation processing 506. The core processing engine 206 may achieve this performance through distributed processing architectures that parallelize transformation operations across multiple processing units. Real-time optimization algorithms within the core processing engine 206 may dynamically allocate processing resources based on transformation complexity and user priority levels to maintain consistent response times across all user sessions.

With continued reference to FIG. 5, an output stage 509 may generate the final modified application data and modified user interface for delivery to the user device. The output stage 509 may compile the transformed content elements into cohesive presentations that maintain the original semantic meaning while optimizing format and presentation style for individual user needs. The output stage 509 may implement quality assurance processes to verify that all transformations preserve content accuracy and maintain accessibility compliance standards.

The output stage 509 may format the modified application data and modified user interface according to the delivery requirements of the requesting user device. The output stage 509 may generate multiple output formats simultaneously to support different presentation modalities including visual display, audio narration, and haptic feedback delivery. The output stage 509 may also prepare supplementary content elements such as contextual definitions, visual aids, and explanatory materials that may be delivered alongside the primary modified content based on detected user comprehension needs.

The modality modification system 160 may transmit the modified application data with the modified user interface to the user device through the network 140 using the communication subsystem 162. The transmission process may utilize optimized data compression and streaming protocols to minimize bandwidth requirements while maintaining content quality and accessibility features. The communication subsystem 162 may implement adaptive transmission strategies that adjust data delivery rates based on network conditions and user device capabilities to ensure consistent content availability across diverse connection environments.

Feedback collection 512 may monitor the effectiveness of the transmitted modified application data and modified user interface through real-time user interaction analysis. The feedback collection 512 may maintain a quality score of 9.5 out of 10 or higher by continuously measuring user engagement metrics, comprehension indicators, and satisfaction levels with the adapted content presentations. The feedback collection 512 may achieve 100% accessibility compliance by verifying that all transmitted content modifications meet or exceed established accessibility standards including Web Content Accessibility Guidelines and Americans with Disabilities Act requirements.

The feedback collection 512 may gather user response data including interaction patterns, dwell times, error rates, and completion metrics to assess the effectiveness of the applied content transformations. The feedback collection 512 may also monitor technical performance indicators including loading times, rendering accuracy, and cross-device compatibility to ensure consistent user experiences across different client platforms. The collected feedback data may be transmitted back to the data profile management layer 209 through the feedback loop 215 to inform future transformation strategies and improve the accuracy of the generative machine learning model for subsequent content adaptation requests.

The transformation pipeline may implement progressive enhancement strategies that deliver basic accessible content immediately while continuing to apply advanced transformations in the background. The output stage 509 may prioritize the delivery of fundamental accessibility adaptations such as color adjustments and font modifications before applying more complex transformations such as content restructuring or multimedia enhancements. This approach may ensure that users receive immediate accessibility benefits while the system completes comprehensive content adaptations based on their specific user interface parameters and detected needs.

Figure 3:
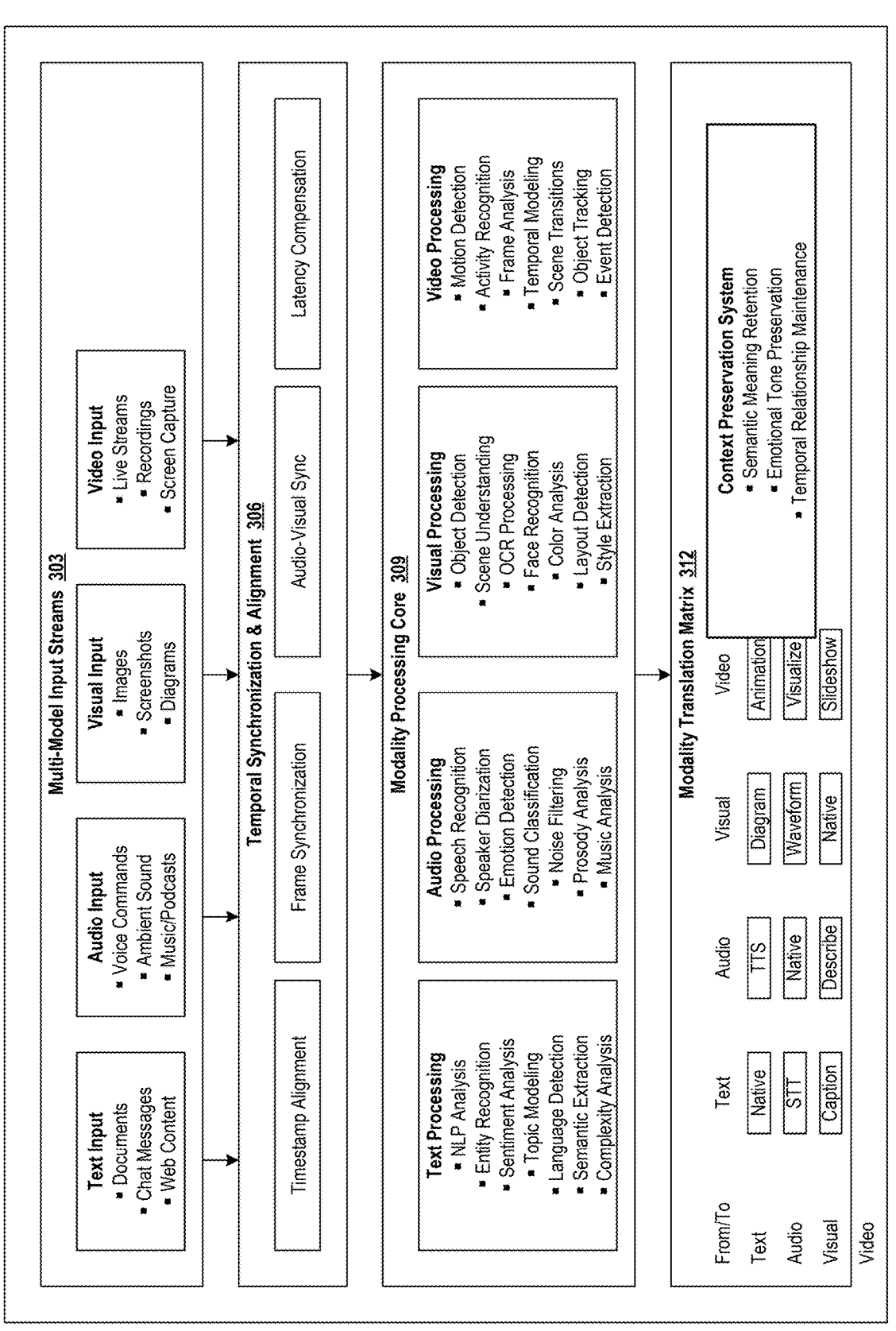
FIG. 3 illustrates a multi-modal input processing system, in accordance with one or more embodiments of this disclosure.

Referring to FIG. 3, the modality modification system 160 may implement complexity level detection through analysis of multiple input streams to determine when application data complexity levels are improper for individual users. A text input stream 303 may process documents, chat messages, and web content to analyze textual complexity indicators including vocabulary difficulty, sentence structure patterns, and conceptual density measurements. An audio input stream 306 may handle voice commands, ambient sound, and music or podcast content to detect audio-based complexity factors such as speech rate variations, terminology usage, and information density levels. A visual input stream 309 may process images, screenshots, and diagrams to evaluate visual complexity elements including information density, color usage patterns, and structural organization. A video input stream 312 may manage live streams, recordings, and screen capture content to assess multimedia complexity factors including presentation speed, visual transitions, and information layering.

The generative machine learning model may analyze data from the text input stream 303, audio input stream 306, visual input stream 309, and video input stream 312 in combination with facial expression monitoring, eye tracking measurements, and interaction pattern analysis to determine that a complexity level associated with the application data and the user interface is improper for the user. Facial expression analysis may detect indicators of confusion, frustration, or cognitive overload through micro-expression recognition algorithms that identify subtle changes in facial muscle tension, eyebrow positioning, and mouth configuration. The generative machine learning model may correlate these facial expression indicators with content complexity metrics to identify when application data exceeds appropriate difficulty levels for individual users.

Eye tracking measurements may provide detailed behavioral indicators of complexity-related comprehension challenges through gaze pattern analysis and fixation duration monitoring. The generative machine learning model may process eye tracking data to identify characteristic patterns associated with content complexity issues including increased fixation times on specific content elements, irregular saccade movements between information sections, and reduced reading efficiency metrics. Interaction pattern analysis may detect complexity-related difficulties through user behavior indicators such as increased scrolling frequency, repeated content access attempts, and extended task completion times that suggest cognitive processing challenges.

With continued reference to FIG. 3, temporal synchronization and alignment capabilities may enable the generative machine learning model to correlate complexity indicators across multiple input modalities simultaneously. The system may analyze temporal relationships between facial expression changes, eye tracking pattern variations, and interaction behavior modifications to generate comprehensive complexity assessments. Modality-specific processing within the core processing engine 206 may evaluate complexity factors unique to each input stream while maintaining contextual relationships between different data types during the analysis process.

The modality translation matrix may enable the generative machine learning model to assess complexity levels across different presentation formats while maintaining context preservation through semantic meaning retention, emotional tone preservation, and temporal relationship maintenance. The generative machine learning model may evaluate how complexity factors translate between textual presentations, audio narrations, visual displays, and video content to determine optimal complexity reduction strategies for individual users. This cross-modal complexity analysis may inform the generation of alternative application data that maintains semantic accuracy while reducing cognitive processing demands.

The modality modification system 160 may input a user complexity level as a parameter of the plurality of user interface parameters into the generative machine learning model to receive alternative application data and an alternative user interface. The user complexity level parameter may specify the appropriate difficulty level for content presentation based on detected user capabilities, preferences, and real-time comprehension indicators. The generative machine learning model may process this complexity level parameter alongside other user interface parameters to generate comprehensive content adaptations that reduce cognitive load while preserving information accuracy and completeness.

The generative machine learning model may receive the alternative application data from the complexity reduction processing operations, where the alternative application data may be the application data modified to lower the complexity level of the application data. The alternative application data may include simplified vocabulary substitutions, shortened sentence structures, reduced information density, and enhanced visual organization to accommodate detected user processing capabilities. The generative machine learning model may maintain semantic equivalence between the original application data and the alternative application data while optimizing presentation format for improved user comprehension and engagement.

Figure 4:
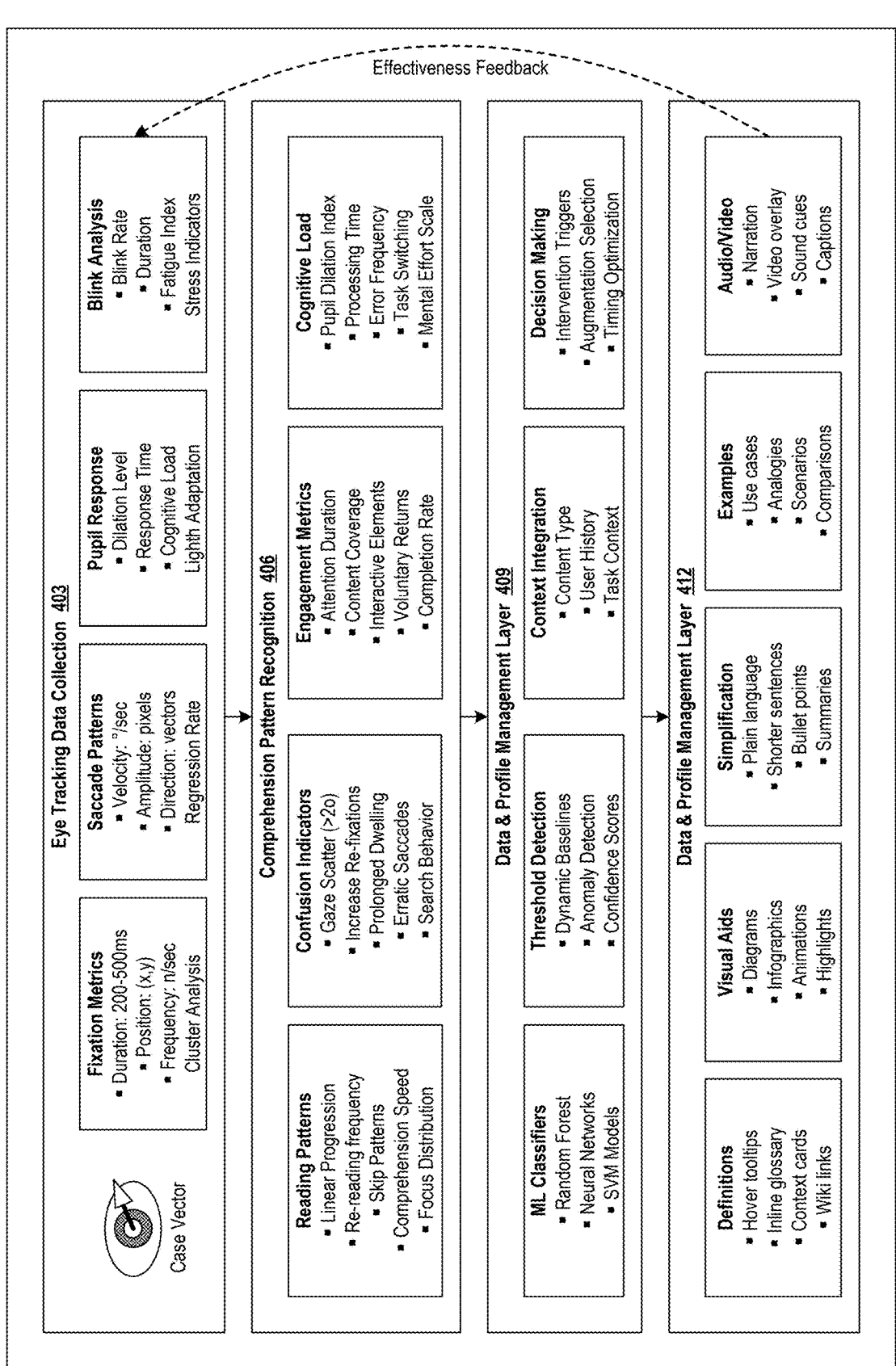
FIG. 4 illustrates a data collection environment, in accordance with one or more embodiments of this disclosure.

Referring to FIG. 4, an eye tracking module 403 may provide detailed physiological monitoring capabilities to support complexity level detection through pupil dilation measurements and blink rate analysis. The eye tracking module 403 may measure pupil dilation for cognitive load assessment by detecting involuntary pupil size changes that correlate with mental processing demands and information complexity levels. Pupil dilation measurements may indicate when users experience cognitive overload from complex application data, with increased dilation patterns suggesting elevated processing demands that exceed comfortable comprehension levels.

The eye tracking module 403 may perform blink rate analysis for fatigue detection by monitoring the frequency and duration of eye blink patterns during content interaction sessions. Increased blink rates may indicate visual fatigue or cognitive strain associated with complex content processing, while decreased blink rates may suggest intense concentration or difficulty with content comprehension. The eye tracking module 403 may correlate blink rate variations with content complexity metrics to identify when application data requires simplification or alternative presentation formats to reduce user fatigue and improve comprehension outcomes.

A comprehension pattern module 406 may analyze gaze behavior data from the eye tracking module 403 to detect complexity-related comprehension challenges through pattern recognition algorithms. The comprehension pattern module 406 may detect gaze scatter patterns indicating confusion by identifying irregular eye movement sequences, random fixation distributions, and non-linear reading progressions that suggest difficulty with content organization or complexity levels. These gaze scatter patterns may indicate when users struggle to follow logical information flow or experience cognitive overload from dense or poorly structured application data.

The comprehension pattern module 406 may correlate gaze scatter patterns with interaction patterns collected through the user interaction layer 203 to generate comprehensive complexity assessments. Interaction pattern correlation may include analysis of mouse movement behaviors, keyboard input patterns, touch gesture sequences, and navigation choices that provide additional indicators of user comprehension challenges. The comprehension pattern module 406 may identify relationships between visual attention patterns and behavioral interaction data to determine when complexity reduction interventions are needed for optimal user experience.

As further shown in FIG. 4, an analysis engine 409 may process data from the eye tracking module 403 and comprehension pattern module 406 to generate real-time complexity level determinations using machine learning classifiers and threshold detection algorithms. The analysis engine 409 may implement context integration capabilities that combine physiological indicators, behavioral patterns, and content characteristics to produce accurate complexity assessments for individual users. Decision making components within the analysis engine 409 may determine when complexity levels exceed user capabilities and trigger automatic content adaptation processes through the generative machine learning model.

The analysis engine 409 may maintain threshold detection parameters that define acceptable ranges for pupil dilation measurements, blink rate frequencies, gaze scatter distributions, and interaction pattern indicators. When measured values exceed these threshold parameters, the analysis engine 409 may signal the need for complexity reduction interventions through the generative machine learning model. The analysis engine 409 may also implement adaptive threshold adjustment capabilities that learn from user feedback and performance outcomes to refine complexity detection accuracy over time.

A content augmentation module 412 may provide automatic content enhancement capabilities when complexity issues are detected by the analysis engine 409. The content augmentation module 412 may provide inline definitions with hover or gaze-triggered explanations that appear when users focus attention on complex terminology or concepts within the application data. These hover-triggered explanations may activate based on gaze duration thresholds detected by the eye tracking module 403, providing contextual assistance without interrupting the natural flow of content consumption.

The content augmentation module 412 may implement automatic diagram generation for complex concepts by analyzing textual content and creating visual representations that clarify abstract or technical information. The automatic diagram generation may produce flowcharts, concept maps, hierarchical structures, or process illustrations that supplement textual explanations with visual learning aids. These generated diagrams may be integrated into the modified user interface at appropriate locations based on content context and user comprehension patterns detected through the eye tracking module 403 and comprehension pattern module 406.

With continued reference to FIG. 4, the modality modification system 160 may split the application data according to placement of the application data within the user interface into a plurality of application data segments when complexity levels are determined to be improper. The splitting process may analyze the spatial organization of content elements within the user interface to identify logical segmentation boundaries based on visual layout, information hierarchy, and functional groupings. Each application data segment may correspond to specific interface regions such as header sections, content blocks, sidebar elements, or footer information that can be processed independently for complexity reduction.

The generative machine learning model may receive the plurality of application data segments with a command to generate a corresponding explanation for each data segment of the plurality of application data segments, where each explanation corresponds to the user complexity level determined through the analysis engine 409. The generative machine learning model may analyze the content, context, and complexity characteristics of each segment to produce explanations that clarify technical terminology, provide background information, or offer simplified interpretations of complex concepts. Each corresponding explanation may be tailored to the specific user complexity level to ensure appropriate difficulty levels and comprehension support.

The modality modification system 160 may receive the corresponding explanation for each data segment from the generative machine learning model and add each corresponding explanation to the modified user interface according to the placement of each corresponding data segment of the plurality of application data segments. The explanations may be integrated into the user interface through expandable text sections, tooltip displays, sidebar annotations, or overlay panels that maintain spatial relationships with their corresponding content segments. This placement-based integration may preserve the logical organization of the original user interface while providing targeted complexity reduction support where needed.

The modality modification system 160 may alternatively split the application data based on context of the application data into a plurality of application data segments when complexity reduction is required. Context-based splitting may analyze semantic relationships, topical boundaries, and conceptual groupings within the application data to create segments that represent coherent information units regardless of their spatial placement within the user interface. This contextual segmentation approach may group related concepts, sequential process steps, or thematically connected information elements into logical segments for targeted complexity reduction processing.

The generative machine learning model may process the context-based application data segments to generate corresponding explanations that address the conceptual complexity of each thematic or procedural grouping. The generative machine learning model may analyze the semantic content, prerequisite knowledge requirements, and conceptual difficulty levels of each context-based segment to produce explanations that bridge knowledge gaps and clarify complex relationships between information elements. These contextual explanations may provide background information, define technical concepts, or offer alternative perspectives that enhance user comprehension of complex subject matter.

The content augmentation module 412 may generate an audio segment for each corresponding explanation to be added to the modified user interface according to the contextual organization of the application data segments. The audio segments may provide spoken explanations, narrated descriptions, or verbal clarifications that complement visual content presentations with auditory learning support. These audio segments may be synchronized with visual content display, activated through user interaction, or delivered proactively based on detected comprehension challenges identified through the eye tracking module 403 and comprehension pattern module 406. The audio segments may utilize personalized voice characteristics and speech parameters defined in the user interface parameters to ensure optimal auditory presentation for individual users.

The modality modification system 160 may determine that modification data indicates that video file parameters of a video file within the application data do not match the plurality of user interface parameters retrieved from the user repository. Video file parameters may include frame rate specifications, resolution settings, color depth values, compression formats, audio track characteristics, subtitle availability, and motion intensity levels that define the technical and accessibility characteristics of video content. The determination process may involve comparing these video file parameters against user interface parameters that specify preferred video characteristics, accessibility requirements, and presentation preferences for individual users.

The modification data generated by the generative machine learning model may contain parameter mismatch indicators that identify specific discrepancies between video file characteristics and user requirements. These mismatch indicators may highlight frame rate incompatibilities for users with motion sensitivity conditions, resolution mismatches for users with visual processing differences, color depth issues for users with color vision deficiencies, or audio track problems for users requiring specific auditory accommodations. The modality modification system 160 may analyze these mismatch indicators to determine the scope and severity of video parameter incompatibilities that require correction through replacement or modification processes.

Video parameter analysis may evaluate technical specifications including frame rates ranging from 24 to 120 frames per second, resolution formats from standard definition to ultra-high definition, color space specifications such as sRGB or Adobe RGB, and compression codec compatibility with user device capabilities. The analysis may also assess accessibility-related parameters including closed caption availability, audio description tracks, sign language interpretation overlays, and motion reduction options that accommodate users with various accessibility needs. The modality modification system 160 may correlate these technical parameters with user interface parameters to identify specific areas of incompatibility that require video content adaptation.

The modality modification system 160 may identify an alternative video file having video file parameters matching the plurality of user interface parameters when replacement is determined to be the optimal adaptation strategy. The identification process may involve querying video content repositories, multimedia databases, or content delivery networks to locate alternative video files that contain equivalent semantic content while providing compatible technical specifications. Alternative video file identification may utilize content similarity algorithms, semantic matching techniques, and metadata analysis to ensure that replacement videos maintain the same informational value and contextual relevance as the original video content.

Content similarity algorithms may analyze video metadata, transcription data, visual scene descriptions, and audio characteristics to identify alternative videos that convey equivalent information through compatible presentation formats. The algorithms may evaluate semantic equivalence by comparing topic coverage, information density, presentation style, and educational or informational objectives between original and alternative video files. Metadata analysis may examine video tags, descriptions, categorization data, and accessibility annotations to identify suitable replacement candidates that meet both content requirements and technical parameter specifications.

The modality modification system 160 may replace the video file with the alternative video file when a suitable replacement is identified that meets both content equivalence and parameter compatibility requirements. The replacement process may involve updating video file references within the application data, modifying user interface code to accommodate different video dimensions or aspect ratios, and ensuring seamless integration of the alternative video content within the existing interface layout. Video file replacement may also include updating associated metadata, caption files, and supplementary content elements to maintain consistency with the new video content.

Replacement operations may implement progressive loading strategies that begin displaying the alternative video file while completing background processing tasks such as metadata updates and interface adjustments. The modality modification system 160 may verify that the alternative video file maintains semantic equivalence with the original content through automated content analysis and quality assurance processes. The replacement process may also include fallback mechanisms that revert to the original video file if the alternative content fails to meet quality or compatibility standards during the replacement operation.

The modality modification system 160 may alternatively identify portions of the video file that do not match the plurality of user interface parameters when selective modification is determined to be more appropriate than complete file replacement. Portion identification may involve temporal analysis to locate specific time segments within the video that contain problematic characteristics, spatial analysis to identify regions within video frames that require modification, or content-based analysis to isolate specific visual or audio elements that conflict with user requirements. This selective approach may enable targeted modifications that preserve the majority of the original video content while addressing specific compatibility issues.

Temporal portion identification may analyze video content across time segments to locate sections with excessive motion intensity for users with motion sensitivity, rapid scene transitions that may trigger seizure conditions, or audio segments with inappropriate volume levels or frequency characteristics. The analysis may generate time-based markers that define the beginning and end points of problematic video segments, enabling precise targeting of modification operations while preserving unaffected portions of the video content. Temporal analysis may also identify sections requiring caption additions, audio description enhancements, or visual overlay insertions to improve accessibility compliance.

Spatial portion identification may examine individual video frames or frame sequences to locate specific regions that require modification for user compatibility. This analysis may identify areas with problematic color combinations for users with color vision deficiencies, text elements with insufficient contrast ratios, or visual elements that may cause attention difficulties for users with focus-related conditions. Spatial identification may generate coordinate-based markers that define rectangular regions, irregular shapes, or pixel-level selections within video frames that require targeted modification operations.

The modality modification system 160 may modify the portions of the video file that do not match the plurality of user interface parameters through targeted video processing operations that address specific compatibility issues while preserving unaffected content. Modification operations may include color palette adjustments for portions containing problematic color combinations, motion smoothing or reduction for segments with excessive movement, audio level normalization for sections with inappropriate volume characteristics, or visual overlay additions for regions requiring accessibility enhancements. These selective modifications may maintain the overall integrity and semantic content of the original video while ensuring compatibility with user requirements.

Color modification operations may apply color space transformations, palette substitutions, or contrast adjustments to specific video portions that contain colors incompatible with user vision characteristics. The modifications may implement color blindness simulation algorithms to verify that adjusted color schemes remain distinguishable for users with various types of color vision deficiencies. Motion modification operations may apply temporal smoothing filters, frame rate adjustments, or motion blur effects to reduce the intensity of movement in video segments that exceed user motion sensitivity thresholds.

Audio modification operations may adjust volume levels, frequency responses, or dynamic range characteristics for specific audio segments within the video file that do not match user audio preference parameters. These modifications may include dialogue enhancement for users with hearing difficulties, background noise reduction for users requiring clear audio separation, or speech rate adjustments for users with auditory processing differences. Visual overlay modifications may add text captions, graphical indicators, or supplementary visual elements to video portions that require additional accessibility support or clarification for optimal user comprehension.

The selective modification approach may implement real-time processing capabilities that apply targeted changes to video portions during content delivery without requiring complete video file regeneration. This approach may reduce processing overhead and storage requirements while providing immediate accessibility improvements for users with specific parameter requirements. The modality modification system 160 may cache commonly applied modifications to improve processing efficiency for frequently requested video adaptations and maintain consistent performance across multiple user sessions requiring similar video parameter adjustments.

The modality modification system may determine using the generative machine learning model and based on one or more of facial expression, eye tracking, or interaction patterns, that the user interface is not optimal for the user through comprehensive behavioral analysis and performance assessment algorithms. The generative machine learning model may process facial expression data collected through camera systems within the user interaction layer to identify micro-expressions indicating frustration, confusion, or cognitive strain that suggest suboptimal user interface design or content presentation. Facial expression analysis may detect subtle changes in eyebrow positioning, mouth configuration, eye movement patterns, and overall facial tension that correlate with user interface usability issues or accessibility barriers that impede effective user interaction.

Eye tracking data analysis within the generative machine learning model may identify patterns indicating user interface optimization issues through gaze behavior assessment and visual attention distribution analysis. The generative machine learning model may detect irregular scanning patterns, excessive fixation durations on interface elements, frequent re-reading of content sections, or scattered attention distribution that suggests poor information architecture or inadequate visual hierarchy within the user interface. Eye tracking analysis may also identify accessibility-related issues such as difficulty locating interactive elements, problems with color contrast recognition, or challenges with text readability that indicate the need for user interface modifications.

Interaction pattern analysis may provide behavioral indicators of user interface optimization issues through user behavior monitoring and task completion assessment. The generative machine learning model may analyze mouse movement patterns, keyboard input sequences, touch gesture behaviors, and navigation choices to identify inefficiencies, repeated actions, error patterns, or task abandonment behaviors that suggest user interface design problems. Interaction pattern analysis may detect when users struggle with interface navigation, experience difficulty completing intended tasks, or demonstrate behavioral indicators of frustration or confusion during system interaction sessions.

The generative machine learning model may correlate data from facial expression monitoring, eye tracking analysis, and interaction pattern assessment to generate comprehensive user interface optimization assessments that account for multiple behavioral indicators simultaneously. This multi-modal analysis approach may provide more accurate determinations of user interface optimization issues by identifying consistent patterns across different data sources that confirm usability problems or accessibility barriers. The generative machine learning model may weight different behavioral indicators based on their reliability and relevance to specific user interface optimization challenges to produce accurate assessments of interface effectiveness.

Performance metrics analysis within the generative machine learning model may evaluate task completion rates, error frequencies, time-to-completion measurements, and user satisfaction indicators to quantify user interface optimization issues. The generative machine learning model may compare current user performance metrics against baseline performance standards, historical user data, or population averages to identify when user interface configurations fail to support optimal user productivity and satisfaction. Performance degradation patterns may indicate specific areas of user interface design that require modification to improve user experience and accessibility compliance.

The modality modification system may generate for display to the user a prompt as to whether to change the user interface, where the prompt indicates one or more causes for the user interface not to be optimal for the user based on the behavioral analysis and performance assessment results. The prompt generation process may create user-friendly explanations that describe identified optimization issues in accessible language while providing specific recommendations for user interface improvements. The prompt may include descriptions of detected accessibility barriers, usability challenges, or performance limitations that affect user interaction effectiveness and satisfaction.

Prompt content generation may analyze the specific behavioral indicators and performance metrics that led to the user interface optimization determination to create targeted explanations that help users understand the identified issues. The prompt may describe how detected facial expressions indicate cognitive strain or frustration, explain how eye tracking patterns suggest visual accessibility problems, or clarify how interaction patterns reveal navigation difficulties or task completion barriers. These explanations may enable users to make informed decisions about whether to accept recommended user interface modifications based on understanding of the underlying optimization issues.

The prompt may present multiple user interface modification options with descriptions of how each option addresses specific optimization issues identified through the behavioral analysis process. These options may include accessibility enhancements such as color scheme adjustments, font size modifications, or layout simplifications that address detected visual processing challenges. The prompt may also offer interaction method alternatives such as voice input activation, gesture control enablement, or keyboard navigation improvements that accommodate detected motor control or input preference issues.

User response handling for the generated prompt may enable users to accept recommended modifications, request alternative solutions, or decline changes while maintaining their current user interface configuration. The modality modification system may process user responses to update user interface parameters, trigger additional analysis processes, or record user preferences for future optimization assessments. User response data may also inform machine learning model training processes to improve the accuracy of future user interface optimization determinations and prompt generation quality.

The user repository may receive the plurality of user interface parameters from an artificial intelligence agent that corresponds to the user, where the artificial intelligence agent maintains personalized configuration data and behavioral analysis results for individual users across multiple interaction sessions. The artificial intelligence agent may collect user interface parameters through direct user configuration processes, behavioral pattern analysis, accessibility need detection, and performance optimization assessments conducted during system interactions. The artificial intelligence agent may maintain persistent user profiles that store accumulated user interface parameters and continuously update these parameters based on ongoing behavioral analysis and user feedback.

The artificial intelligence agent may be associated with a corresponding computer-executable operation set configured to be autonomously executed by the artificial intelligence agent on a software application set to provide comprehensive user interface optimization and accessibility enhancement services. The computer-executable operation set may include automated behavioral analysis routines, user interface modification algorithms, accessibility compliance verification processes, and performance optimization procedures that operate continuously during user interaction sessions. These autonomous operations may enable the artificial intelligence agent to provide proactive user interface improvements without requiring explicit user requests or manual configuration processes.

Autonomous execution capabilities of the artificial intelligence agent may enable real-time user interface optimization through continuous monitoring of user behavioral patterns, performance metrics, and accessibility indicators. The artificial intelligence agent may automatically detect changes in user needs, capabilities, or preferences and update user interface parameters accordingly to maintain optimal user experience across different contexts and usage scenarios. The autonomous operation set may include predictive algorithms that anticipate user interface optimization needs based on historical patterns, contextual factors, and emerging accessibility requirements.

The software application set may encompass multiple applications, services, and platforms that benefit from the artificial intelligence agent's user interface optimization capabilities through standardized parameter sharing and consistent accessibility enhancement approaches. The artificial intelligence agent may apply learned user interface parameters across different applications within the software application set to provide consistent user experiences and accessibility accommodations regardless of the specific application being used. This cross-application parameter sharing may eliminate the need for users to repeatedly configure accessibility settings or user interface preferences for each individual application.

Integration between the artificial intelligence agent and the software application set may enable seamless user interface parameter synchronization and automatic optimization deployment across multiple platforms and services. The artificial intelligence agent may communicate with applications within the software application set to share user interface parameters, coordinate accessibility enhancements, and ensure consistent user experience delivery across different interaction contexts. This integration approach may provide users with unified accessibility support and personalized user interface optimization that transcends individual application boundaries.

The computer-executable operation set may include machine learning algorithms that continuously improve user interface optimization accuracy through analysis of user feedback, behavioral pattern evolution, and accessibility requirement changes over time. These learning algorithms may refine the artificial intelligence agent's ability to detect user interface optimization needs, generate appropriate modification recommendations, and predict user preferences for different types of interface adaptations. The autonomous learning capabilities may enable the artificial intelligence agent to provide increasingly personalized and effective user interface optimization services as interaction history and behavioral data accumulate.

Security and privacy protection mechanisms within the artificial intelligence agent may ensure that user interface parameters and behavioral analysis data remain protected while enabling effective optimization services across the software application set. The artificial intelligence agent may implement data encryption, access control, and privacy-preserving analysis techniques that protect sensitive user information while maintaining the functionality needed for comprehensive user interface optimization. These security measures may enable users to benefit from personalized accessibility enhancements without compromising their privacy or data security across multiple applications and platforms.

Computing Environment

Figure 6:
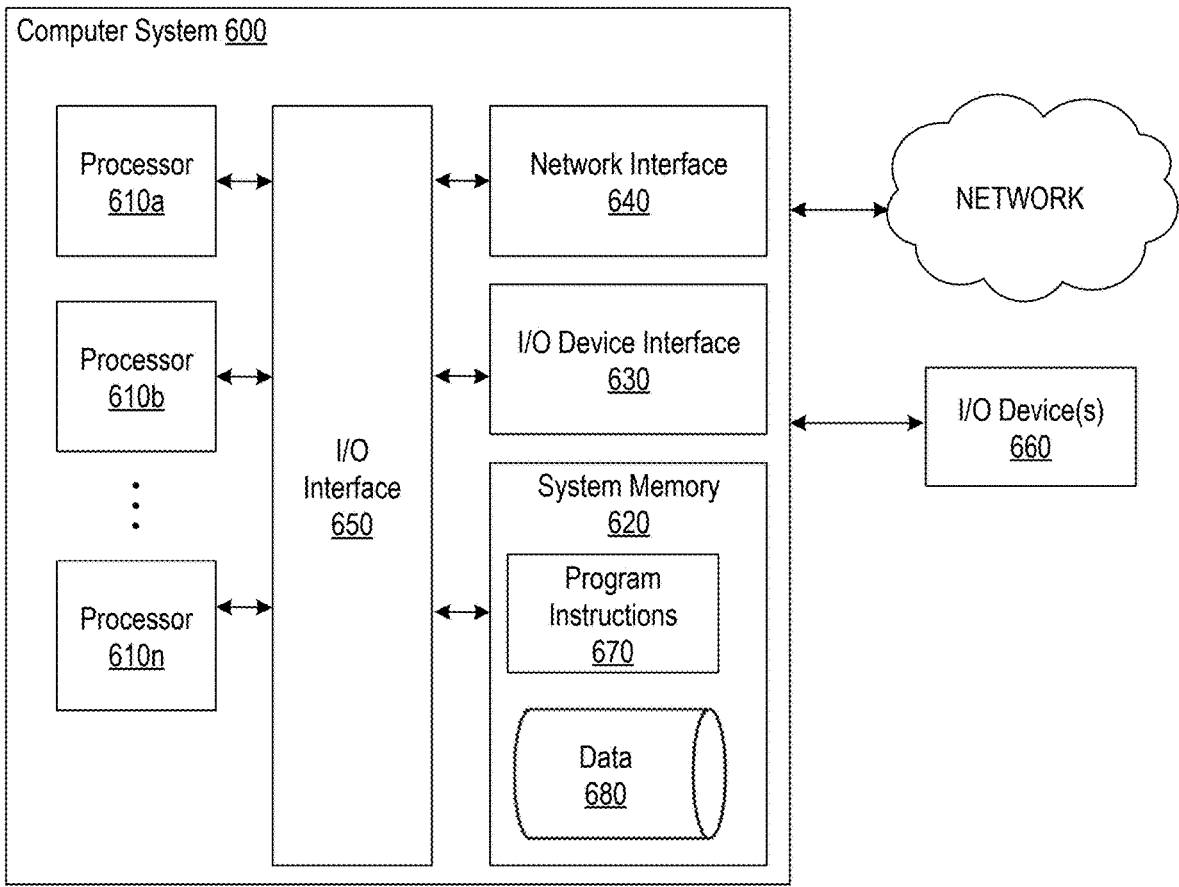
FIG. 6 illustrates an exemplary computing system, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a, 610b, etc. up to 610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610$a$-610$n$) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610$a$-610$n$) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610$a$-610$n$, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610$a$-610$n$). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Machine Learning

Figure 7:
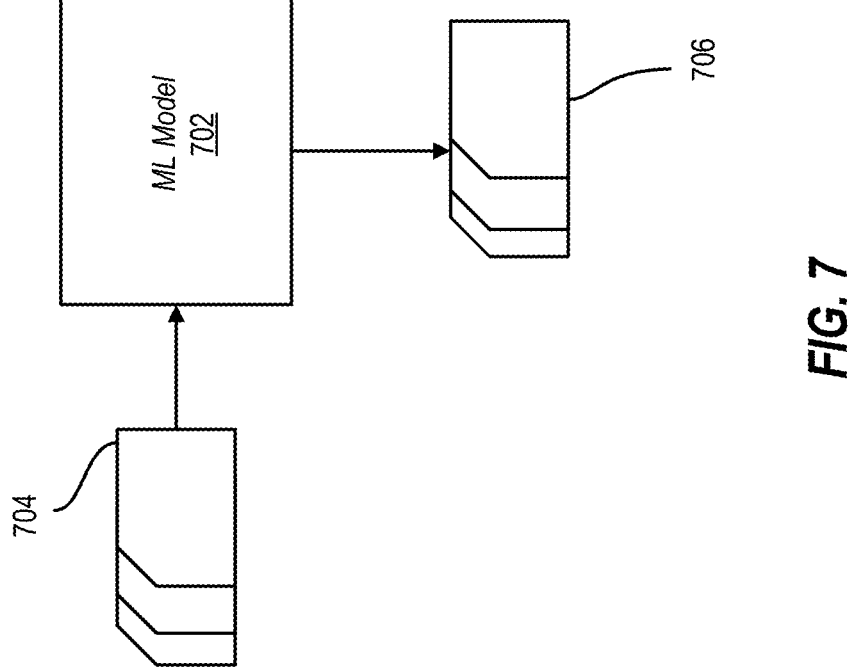
FIG. 7 illustrates exemplary machine learning models, in accordance with one or more embodiments of this disclosure.

FIG. 7 illustrates an exemplary machine learning model 702. According to some examples, the machine learning model may be any model, such as a model for data imputation. For example, the machine learning model may be trained to intake input 704. As a result of inputting the input 704 into the machine learning model, the model may then output an output 706, which may include, for example, an imputed value. Furthermore, as described, the machine learning model may be configured to output a confidence interval or other metric for certainty regarding the outputs. Output 706 may include output parameters.

The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction and reference feedback information (e.g., user indication of accuracy, reference labels, or other information). Connection weights may be adjusted, for example, if the machine learning model is a neural network, to reconcile differences between the neural network's prediction and the reference feedback.

One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function that combines the values of all of its inputs together. Each connection (or the neural unit itself) may have a threshold function that a signal must surpass before it propagates to other neural units. The machine learning model may be self-learning and/or trained rather than explicitly programmed and may perform significantly better in certain areas of problem-solving as compared to computer programs that do not use machine learning. During training, an output layer of the machine learning model may correspond to a classification or imputation of the machine learning model, and an input known to correspond to that classification or imputation value may be input into an input layer of the machine learning model during training. During testing, an input without a known classification or known imputation value may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector. The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer"), and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from publicly available sources. Such a technique may be used to identify values and generate a corpus that can be accessed to impute values. For example, in some embodiments, if a value is missing, the model may access the corpus to identify relevant information for the missing value. For example, the values can be used to calculate the missing value. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. The specific training samples may be used to generate language in a certain style or in a certain format.

Some concepts in ML-based language models will now be discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or, in the case of an LLM, may contain millions or billions of learned parameters or more. As non-limiting examples, a language model may generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models may also be used for chatbots (e.g., virtual assistance).

A type of neural network architecture, referred to as a "transformer," may be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 8:
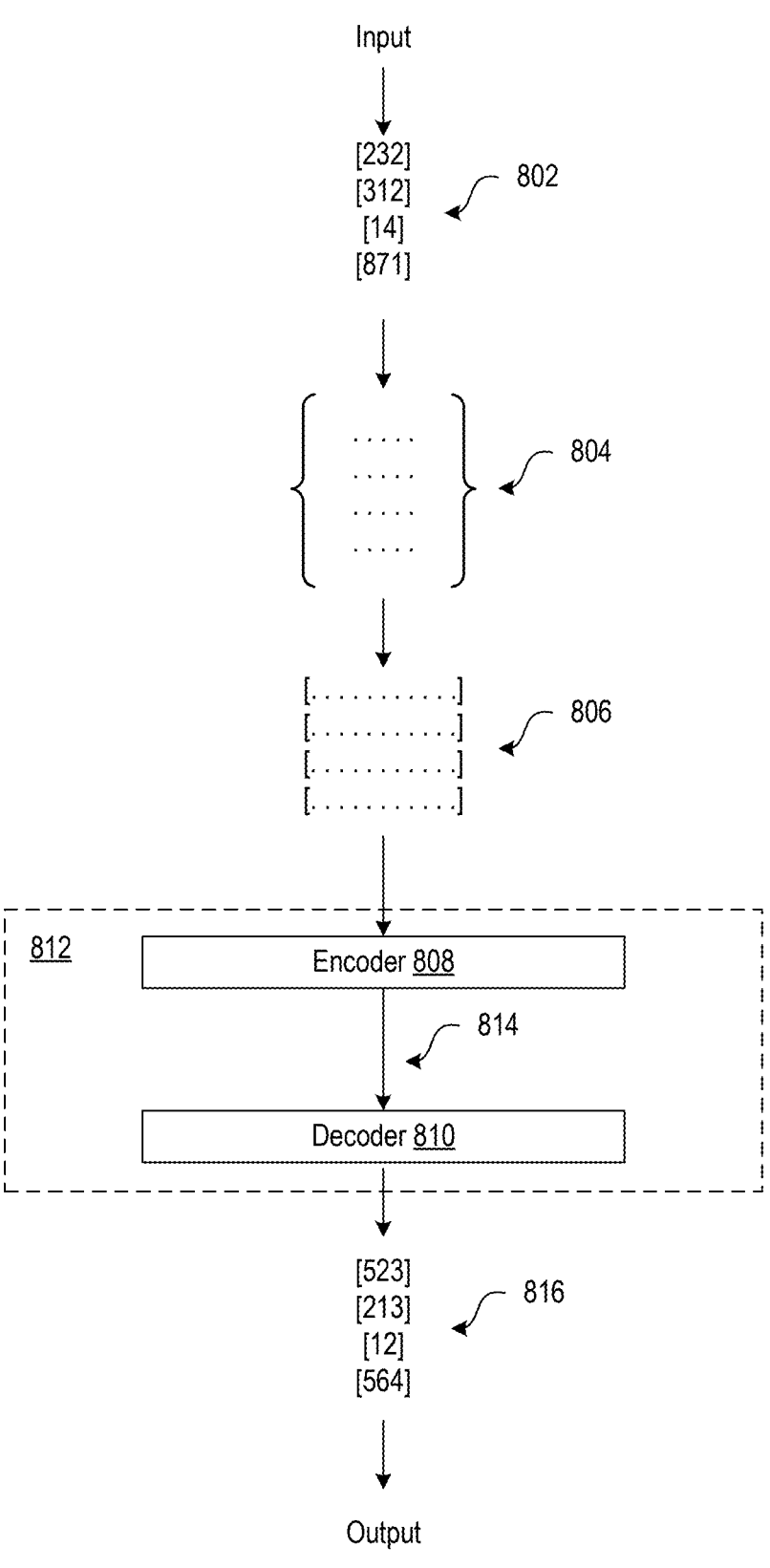
FIG. 8 is a block diagram of an example transformer that may be used for modifying input and/or output modalities, in accordance with one or more embodiments of this disclosure.

FIG. 8 is a block diagram of an example transformer 812. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

Transformer 812 may include an encoder 808 (which may include one or more encoder layers/blocks connected in series) and a decoder 810 (which may include one or more decoder layers/blocks connected in series). Generally, encoder 808 and decoder 810 may each include multiple neural network layers, at least one of which may be a self-attention layer. The parameters of the neural network layers may be referred to as the parameters of the language model.

Transformer 812 may be trained to perform certain functions on a natural language input. Examples of the functions include summarizing existing content, brainstorming ideas, writing a rough draft, fixing spelling and grammar, and translating content. Summarizing may include extracting key points or themes from an existing content in a high-level summary. As described herein, it may take existing content from publicly available sources (e.g., text, images, etc.) to help in imputing missing values. Brainstorming ideas may include generating a list of ideas based on provided input. For example, the ML model may generate a list of names for a startup or costumes for an upcoming party. Writing a rough draft may include generating writing in a particular style that may be useful as a starting point for the user's writing. The style may be identified as, e.g., an email, a blog post, a social media post, or a poem. Fixing spelling and grammar may include correcting errors in an existing input text. Translating may include converting an existing input text into a variety of different languages. In some implementations, transformer 812 is trained to perform certain functions on other input formats than natural language input. For example, the input may include objects, images, audio content, or video content, or a combination thereof. In some examples, this may be used to generate commands for authorizing and completing the transaction, for example.

Transformer 812 may be trained on a text corpus that is labeled (e.g., annotated to indicate verbs, nouns) or unlabeled. LLMs may be trained on a large unlabeled corpus. The term "language model," as used herein, may include an ML-based language model (e.g., a language model that is implemented using a neural network or other ML architecture), unless stated otherwise. Some LLMs may be trained on a large multi-language, multi-domain corpus to enable the model to be versatile at a variety of language-based tasks such as generative tasks (e.g., generating human-like natural language responses to natural language input).

FIG. 8 illustrates an example of how transformer 812 may process textual input data. Input to a language model (whether transformer-based or otherwise) typically is in the form of natural language that may be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without white space appended. In some implementations, a token may correspond to a portion of a word.

For example, the word "greater" may be represented by a token for [great] and a second token for [er]. In another example, the text sequence "write a summary" may be parsed into the segments [write], [a], and [summary], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a list, a paragraph), an [EOT] token may be another special token that indicates the end of the textual sequence, other tokens can provide formatting information, etc.

In FIG. 8, a short sequence of tokens 802 corresponding to the input text is illustrated as input to transformer 812. Tokenization of the text sequence into tokens 802 may be performed by some pre-processing tokenization module such as, for example, a byte-pair encoding tokenizer (the "pre" referring to the tokenization occurring prior to the processing of the tokenized input by the LLM), which is not shown in FIG. 8 for brevity. In general, the token sequence that is inputted into transformer 812 may be of any length up to a maximum length defined based on the dimensions of transformer 812. Each token 802 in the token sequence is converted into an embedding 806 (also referred to as "embedding vector").

Embedding 806 is a learned numerical representation (such as, for example, a vector) of a token that captures some semantic meaning of the text segment represented by the token 802. Embedding 806 represents the text segment corresponding to token 802 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, embedding 806 corresponding to the "write" token will be closer to another embedding corresponding to the "jot down" token in the vector space as compared to the distance between the embedding 806 corresponding to the "write" token and another embedding corresponding to the "summary" token.

The vector space may be defined by the dimensions and values of the embedding vectors. Various techniques may be used to convert token 802 into embedding 806. For example, another trained ML model may be used to convert token 802 into embedding 806. In particular, another trained ML model may be used to convert token 802 into embedding 806 in a way that encodes additional information into embedding 806 (e.g., a trained ML model may encode positional information about the position of token 802 in the text sequence into the embedding 806). In some implementations, the numerical value of token 802 may be used to look up the corresponding embedding in an embedding matrix 804, which may be learned during training of transformer 812.

The generated embeddings, e.g., such as embedding 806, are input into the encoder 808. Encoder 808 serves to encode embedding 806 into feature vectors 814 that represent the latent features of embedding 806. Encoder 808 can encode positional information (i.e., information about the sequence of the input) in feature vectors 814. Feature vectors 814 may have very high dimensionality (e.g., on the order of thousands or tens of thousands), with each element in a feature vector corresponding to a respective feature. The numerical weight of each element in a feature vector represents the importance of the corresponding feature. The space of all possible feature vectors, e.g., such as feature vectors 814 that may be generated by encoder 808 may be referred to as a latent space or feature space.

Conceptually, decoder 810 is designed to map the features represented by feature vectors 814 into meaningful output, which may depend on the task that was assigned to transformer 812. For example, if transformer 812 is used for a translation task, decoder 810 may map feature vectors 814 into text output in a target language different from the language of the original tokens 802. Generally, in a generative language model, decoder 810 serves to decode feature vectors 814 into a sequence of tokens. Decoder 810 may generate output tokens 816 one by one. Each output token 816 may be fed back as input to decoder 810 in order to generate the next output token 816. By feeding back the generated output and applying self-attention, decoder 810 may generate a sequence of output tokens 816 that has sequential meaning (e.g., the resulting output text sequence is understandable as a sentence and obeys grammatical rules). Decoder 810 may generate output tokens 816 until a special [EOT] token (indicating the end of the text) is generated. The resulting sequence of output tokens 816 can then be converted to a text sequence in post-processing. For example, each output token 816 may be an integer number that corresponds to a vocabulary index. By looking up the text segment using the vocabulary index, the text segment corresponding to each output token 816 may be retrieved, the text segments may be concatenated together, and the final output text sequence can be obtained.

In some implementations, the input provided to transformer 812 includes instructions to perform a function on an existing text. The output may include, for example, a modified version of the input text and instructions to modify the text. The modification may include summarizing, translating, correcting grammar or spelling, changing the style of the input text, lengthening or shortening the text, or changing the format of the text (e.g., adding bullet points or checkboxes).

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that may then be further processed by a task-specific layer (e.g., a classification layer). BERT is an example of a language model that may be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models may be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system may access a remote language model (e.g., a cloud-based language model), such as ChatGPT or GPT-3, via a software interface (e.g., an API). Additionally or alternatively, such a remote language model may be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Input(s) to an LLM can be referred to as a prompt, which is a natural language input that includes instructions to the LLM to generate a desired output. A computer system can generate a prompt that is provided as input to the LLM via an API. As described above, the prompt may optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Figure 9:
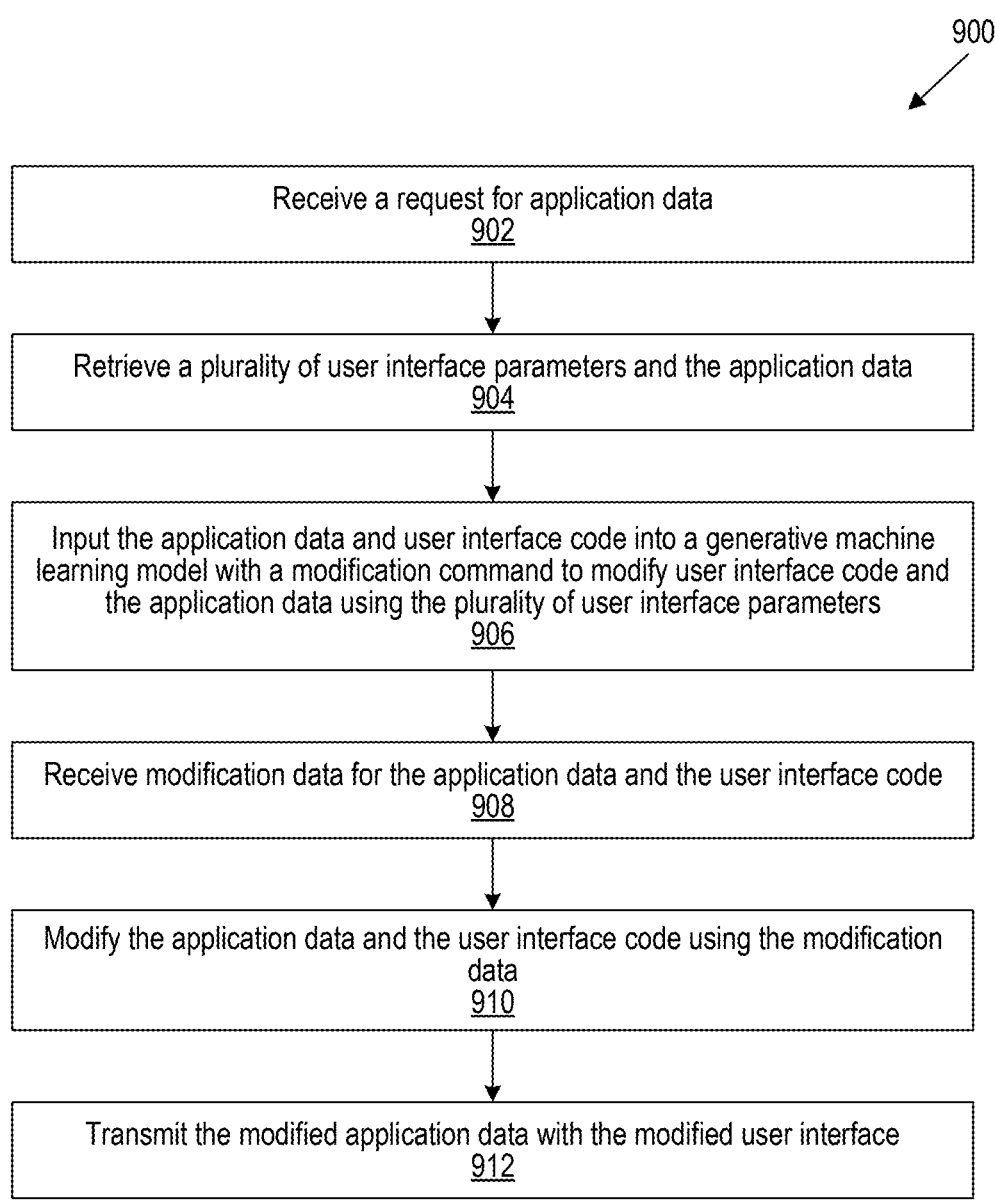
FIG. 9 is a flowchart of operations for modifying output modalities, in accordance with one or more embodiments of this disclosure.

The flowchart in FIG. 9 illustrates process 900 for modifying user interfaces using generative machine learning models. Each operation in the process may be implemented using various computing components and machine learning architectures described in the referenced figures.

Operation 902 involves receiving a request for application data from a user device. This operation may be performed by processors 610*a*-610*n* shown in FIG. 6, which execute program instructions 670 stored in system memory 620 to handle incoming requests through network interface 640. The request processing may utilize the input/output device interface 630 to manage communication with client devices.

Operation 904 encompasses retrieving a plurality of user interface parameters and the application data from storage systems. This operation may be executed by the computing system 600 of FIG. 6, where processors 610*a*-610*n* access data 680 stored in system memory 620. The retrieval process may involve database queries and file system operations coordinated through I/O interface 650 to gather both user preference data and application content from distributed storage locations.

Operation 906 involves inputting the application data and user interface code into a generative machine learning model with modification commands. This operation may be implemented using the machine learning model 702 architecture shown in FIG. 7, where the application data and user interface parameters serve as input 704 to the model. The generative machine learning model may utilize the transformer 812 architecture depicted in FIG. 8, where the input data is first tokenized into tokens 802, converted to embeddings 806 through embedding matrix 804, and processed by encoder 808 to generate feature vectors 814.

Operation 908 involves receiving modification data from the generative machine learning model. This operation corresponds to the output 706 generation process shown in FIG. 7, where the machine learning model 702 produces transformation instructions based on the processed input. In the transformer architecture of FIG. 8, decoder 810 processes the feature vectors 814 to generate output tokens 816 that specify the required modifications for both user interface code and application data.

Operation 910 encompasses modifying the application data and user interface code using the received modification data. This operation may be executed by processors 610*a*-610*n* in FIG. 6, which implement the transformation algorithms specified in the modification data. The processing may involve multiple processors working in parallel to apply visual adaptations, content restructuring, and accessibility enhancements as directed by the generative model output.

Operation 912 involves transmitting the modified application data with the modified user interface to the user device. This operation may be performed through network interface 640 shown in FIG. 6, which handles the data transmission protocols and network communication. The computing system 600 may utilize I/O interface 650 to coordinate the delivery of the transformed content while maintaining data integrity and accessibility compliance throughout the transmission process.

The modality modification system 160 may implement a security-based input modality switching system that dynamically adapts user interaction methods based on the sensitivity level of requested data and contextual security requirements. The system may analyze incoming user requests to determine when additional sensitive information is required and automatically transition between different input modalities to maintain appropriate security levels while preserving user accessibility and interaction flow. The security-based switching capabilities may enable the system to balance data protection requirements with user experience optimization across diverse interaction contexts and security scenarios.

Figure 10:
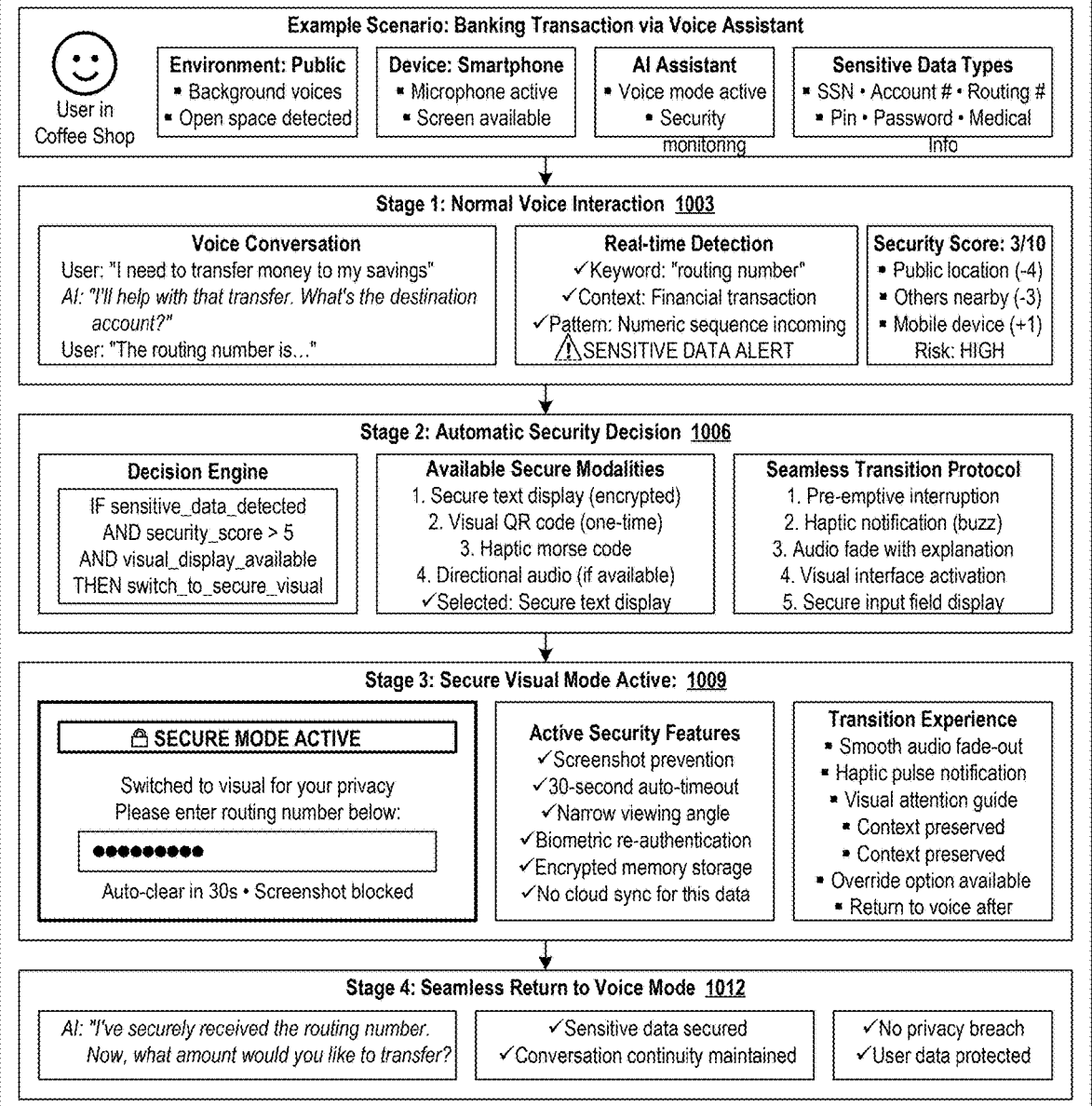
FIG. 10 illustrates an exemplary process for changing input modalities, in accordance with one or more embodiments of this disclosure.

Referring to FIG. 10, a voice interaction stage 1003 may initiate user interaction sessions through voice-based communication channels that provide natural language processing capabilities for initial request handling. The voice interaction stage 1003 may process spoken user requests through the audio input stream 306 and utilize speech recognition algorithms within the core processing engine 206 to convert voice input into structured data representations. The voice interaction stage 1003 may implement conversational AI capabilities that enable users to express complex requests using natural language patterns while maintaining contextual understanding across multi-turn dialogue sessions.

The communication subsystem 162 may implement asynchronous walkie-talkie communication capabilities within the voice interaction stage 1003 to provide flexible interaction timing that accommodates user attention patterns and availability constraints. The asynchronous communication approach may enable users to engage with the system without immediate response pressure while maintaining conversation context across temporal gaps in the interaction flow. The communication subsystem 162 may preserve conversation state and user intent information during periods of user inactivity to ensure seamless interaction resumption when users return to active engagement with the system.

Attention-aware delivery mechanisms within the communication subsystem 162 may monitor user focus levels, activity patterns, and contextual indicators to determine optimal timing for system responses and information delivery. The attention-aware delivery system may detect task transition points, natural breaks in user activity, and periods of low cognitive load to schedule system communications that minimize interruption and maximize user receptivity. The communication subsystem 162 may deliver audio responses at whisper level volume for 3-5 seconds duration with smooth fade-in and fade-out transitions to provide unobtrusive information delivery that respects user attention and environmental context.

The modality determination subsystem 166 may integrate calendar data and do-not-disturb status information to implement optimal timing logic for system communications and interaction scheduling. Calendar integration capabilities may analyze user schedule information to identify appropriate windows for system interaction, avoiding conflicts with meetings, focused work periods, or other scheduled activities that require uninterrupted user attention. The modality determination subsystem 166 may process do-not-disturb status indicators from user devices to respect user availability preferences and defer non-urgent communications until appropriate interaction windows become available.

Task transition point detection within the modality determination subsystem 166 may analyze user behavior patterns, application usage data, and contextual signals to identify natural breakpoints in user workflows where system communications may be delivered with minimal disruption. The optimal timing logic may consider factors such as application switching events, document save operations, meeting conclusion indicators, and other behavioral markers that suggest user readiness for system interaction. The modality determination subsystem 166 may queue pending communications and deliver them strategically during identified transition points to maximize user engagement and minimize workflow interruption.

As further shown in FIG. 10, a security decision stage 1006 may analyze the security requirements associated with user requests and determine appropriate input modality selections based on data sensitivity levels and contextual security factors. The security decision stage 1006 may implement decision engine logic that evaluates the type of additional user data required to complete requests and assigns security level classifications based on predefined sensitivity criteria and regulatory compliance requirements. The security decision stage 1006 may assess available secure modalities for handling sensitive data input while maintaining user accessibility and interaction efficiency.

The modality modification system 160 may receive requests from user devices associated with users, where the requests have been input using an initial input modality of the user device. The initial input modality may include voice input through microphone systems, text input through keyboard interfaces, touch input through touchscreen displays, gesture input through motion detection systems, or other interaction methods supported by the user device. The modality modification system 160 may analyze the characteristics and security implications of the initial input modality to determine its appropriateness for handling different types of user data and request processing requirements.

The artificial intelligence agent associated with the modality modification system 160 may be configured with a corresponding computer-executable operation set that enables autonomous execution of security assessment and modality switching operations on a software application set. The computer-executable operation set may include security level determination algorithms, input modality compatibility assessment routines, and dynamic interface generation procedures that operate automatically without requiring explicit user configuration or manual intervention. The autonomous execution capabilities may enable the artificial intelligence agent to provide proactive security adaptations that protect sensitive user data while maintaining seamless interaction experiences across diverse application contexts.

The modality modification system 160 may determine that received requests require additional user data to complete the requested operations or transactions. The determination process may involve analyzing request parameters, application requirements, and data completeness indicators to identify when supplementary information must be collected from users. The additional user data may include authentication credentials, account identification information, personal identification numbers, biometric data, or other sensitive information required for secure transaction processing or account access operations.

Security level determination within the security decision stage 1006 may analyze the characteristics and sensitivity of the additional user data to assign appropriate security classifications that guide input modality selection decisions. The security level may indicate a sensitivity level associated with the additional user data, ranging from low-sensitivity information that may be handled through standard input methods to high-sensitivity data that requires enhanced security measures and specialized input modalities. The security level assessment may consider regulatory compliance requirements, data protection standards, and organizational security policies to ensure appropriate handling of sensitive user information.

The modality modification system 160 may determine whether the initial input modality matches the security level associated with the additional user data through compatibility assessment algorithms that evaluate input method security characteristics against data sensitivity requirements. The compatibility assessment may consider factors such as input channel encryption capabilities, environmental security conditions, potential eavesdropping risks, and authentication strength associated with different input modalities. The system may identify mismatches between initial input modality security capabilities and the protection requirements of the additional user data to trigger appropriate modality switching operations.

Based on determining that the initial input modality does not match the security level associated with the additional user data, the modality modification system 160 may select an alternate input modality based on the security level requirements and available input modalities for the user device. The alternate input modality selection process may evaluate the security characteristics of available input methods including voice input with speaker verification, biometric input through fingerprint or facial recognition systems, secure text input with encryption, or specialized hardware-based input methods that provide enhanced security protection for sensitive data collection.

With continued reference to FIG. 10, a visual mode stage 1009 may provide secure interface capabilities for handling sensitive data input through visual presentation methods that implement enhanced security measures and data protection protocols. The visual mode stage 1009 may display secure interfaces for entering sensitive information such as routing numbers, account identifiers, or authentication credentials while implementing security features including screenshot prevention, encrypted memory storage, and secure rendering techniques that protect sensitive data from unauthorized access or interception.

The visual mode stage 1009 may implement secure interface generation capabilities that create specialized input forms and data entry screens optimized for sensitive information collection. The secure interfaces may include features such as masked input fields, randomized keypad layouts, time-limited input windows, and visual indicators that confirm secure data handling throughout the input process. The visual mode stage 1009 may coordinate with the security decision stage 1006 to ensure that visual interface security measures align with the determined security level requirements for the additional user data.

The modality modification system 160 may generate one or more instructions for generating an input interface according to the alternate input modality, where the input interface enables users to input the additional user data via the alternate input modality. The instruction generation process may create detailed specifications for interface layout, security controls, input validation rules, and user interaction protocols that ensure secure and accessible data collection through the selected alternate input modality. The generated instructions may include interface rendering parameters, security configuration settings, and user guidance information that supports effective utilization of the alternate input modality.

Interface generation instructions may specify the technical requirements for implementing the alternate input modality including hardware component activation, software module initialization, security protocol establishment, and user interface element configuration. The instructions may define input field properties, validation criteria, encryption parameters, and data handling procedures that ensure secure processing of the additional user data throughout the collection and transmission process. The modality modification system 160 may customize the generated instructions based on user device capabilities, accessibility requirements, and security policy constraints to optimize both security and usability outcomes.

The modality modification system 160 may provide the generated instructions to the user device, where the user device generates the input interface and enables input of the additional user data via the input interface. The instruction delivery process may utilize secure communication channels and encrypted transmission protocols to protect the interface generation specifications during transfer to the user device. The user device may process the received instructions to configure appropriate hardware components, initialize required software modules, and render the specified input interface with the designated security measures and accessibility features.

As further shown in FIG. 10, a voice return stage 1012 may implement seamless transition capabilities that return users to voice interaction modes after secure data collection operations are completed through alternate input modalities. The voice return stage 1012 may maintain security and data protection measures while transitioning back to voice-based interaction, ensuring that sensitive data collected through secure input modalities remains protected throughout the interaction session. The voice return stage 1012 may preserve conversation context and user intent information to enable natural continuation of the original user request processing after secure data collection is completed.

The voice return stage 1012 may implement transition protocols that verify successful completion of secure data input operations before enabling return to voice interaction modes. The transition verification may include data validation checks, security compliance confirmation, and user authentication verification to ensure that all required sensitive information has been collected securely before proceeding with request completion. The voice return stage 1012 may coordinate with the communication subsystem 162 to resume asynchronous walkie-talkie communication capabilities and restore attention-aware delivery mechanisms for continued user interaction.

Security maintenance throughout the voice return stage 1012 may include data encryption, secure memory handling, and audit trail generation that documents the secure data collection process and modality transition operations. The voice return stage 1012 may implement data isolation techniques that prevent sensitive information collected through alternate input modalities from being exposed through voice interaction channels or stored in unsecured system components. The security measures may ensure compliance with data protection regulations and organizational security policies throughout the complete interaction session lifecycle.

The modality modification system 160 may implement dynamic modality switching capabilities that enable multiple transitions between different input methods based on evolving security requirements and user interaction needs throughout extended interaction sessions. The system may monitor ongoing security conditions, data sensitivity changes, and user context variations to trigger additional modality switches when security requirements change or when user preferences indicate alternative input methods would be more appropriate. The dynamic switching capabilities may provide flexible security adaptation that responds to changing conditions while maintaining user experience continuity and accessibility compliance throughout complex multi-step interaction processes.

The alternate input modality may comprise one of a voice input, a gesture input, a touch input, a key-press input, or a biometric input that provides enhanced security characteristics compared to standard input methods. Voice input as an alternate input modality may utilize speaker verification algorithms and voice pattern recognition to authenticate user identity while collecting sensitive data through spoken responses. The voice input modality may implement noise cancellation, speech isolation, and acoustic analysis to ensure secure voice data collection in various environmental conditions while preventing unauthorized access through voice spoofing or recording attacks.

Gesture input may provide an alternate input modality through motion detection systems that recognize specific hand movements, finger patterns, or body gestures to collect sensitive information without requiring physical contact with input devices. The gesture input modality may utilize computer vision algorithms, depth sensing technology, and pattern recognition systems to interpret user gestures accurately while maintaining security through gesture complexity requirements and temporal validation sequences. Gesture input may offer advantages in environments where traditional input methods are impractical or where contactless interaction is preferred for hygiene or accessibility reasons.

Touch input as an alternate input modality may implement enhanced security measures including pressure sensitivity analysis, touch pattern recognition, and multi-point authentication sequences that verify user identity through unique tactile interaction characteristics. The touch input modality may utilize capacitive sensing, force detection, and temporal pattern analysis to distinguish authorized users from potential security threats while collecting sensitive data through secure touch interfaces. Touch input security may include palm rejection algorithms, accidental touch prevention, and deliberate interaction verification to ensure that sensitive data entry occurs only through intentional user actions.

Key-press input may serve as an alternate input modality through specialized keyboard interfaces that implement security features including keystroke dynamics analysis, typing pattern recognition, and temporal sequence validation to authenticate users based on their unique typing characteristics. The key-press input modality may utilize mechanical keyboards, virtual keyboards, or specialized input devices that provide tactile feedback and security confirmation during sensitive data entry operations. Key-press security measures may include key randomization, input masking, and timing analysis to prevent keylogging attacks and unauthorized data interception during sensitive information collection.

Biometric input may provide an alternate input modality through biological characteristic recognition including fingerprint scanning, facial recognition, iris scanning, voice pattern analysis, or other physiological or behavioral biometric measurements that uniquely identify users. The biometric input modality may implement liveness detection algorithms, anti-spoofing measures, and multi-factor biometric verification to ensure authentic user identification during sensitive data collection processes. Biometric input systems may utilize specialized hardware sensors, encrypted biometric templates, and secure matching algorithms that protect biometric data while providing reliable user authentication for high-security applications.

The modality modification system may determine that the additional user data will comprise authentication data for authenticating with the application through analysis of request parameters, application security requirements, and user session context information. Authentication data determination may involve examining the types of credentials required for application access including passwords, personal identification numbers, security tokens, biometric identifiers, or multi-factor authentication elements that verify user identity and authorize access to protected resources. The system may analyze application authentication policies, security protocols, and regulatory compliance requirements to identify when authentication data collection is necessary for request completion.

Based on determining that the additional user data will comprise the authentication data, the modality modification system may set the security level to a metric not compatible with the initial input modality to ensure appropriate protection for sensitive authentication information. The security level assignment process may evaluate the sensitivity of authentication data against the security capabilities of the initial input modality to identify compatibility mismatches that require alternate input method selection. The incompatible security metric may indicate that the initial input modality lacks sufficient security measures such as encryption strength, environmental protection, or authentication verification capabilities needed for secure authentication data handling.

Security level metrics for authentication data may incorporate factors including data encryption requirements, transmission security protocols, storage protection standards, and regulatory compliance mandates that govern authentication information handling. The metric assignment process may consider the potential impact of authentication data compromise, the likelihood of interception or unauthorized access through the initial input modality, and the availability of enhanced security measures through alternate input methods. The security level determination may trigger automatic modality switching to input methods that provide appropriate protection levels for authentication data collection and processing.

The modality modification system may determine that the additional user data will comprise account identification data for accessing an account associated with the user through analysis of transaction requirements, account access protocols, and user authorization needs. Account identification data determination may involve examining the types of information required for account access including account numbers, routing information, user identifiers, or other account-specific data that enables access to financial, personal, or organizational accounts. The system may analyze account security policies, access control requirements, and data protection standards to identify when account identification data collection is necessary for secure account access operations.

Based on determining that the additional user data will comprise the account identification data, the modality modification system may assign a high security level as the security level, where the high security level indicates that a high security modality is required for appropriate data protection. The high security level assignment may reflect the sensitive nature of account identification information and the potential consequences of unauthorized access or data compromise. High security level requirements may mandate the use of input modalities that provide enhanced protection measures including biometric authentication, encrypted data transmission, secure hardware components, or multi-factor verification processes.

High security modality requirements may include specialized input methods that implement advanced security features such as hardware security modules, tamper-resistant input devices, secure enclaves, or cryptographic protection mechanisms that ensure account identification data remains protected throughout the collection and processing lifecycle. The high security level may trigger selection of input modalities that provide end-to-end encryption, secure key management, audit trail generation, and compliance verification capabilities that meet or exceed regulatory requirements for sensitive financial or personal account information handling.

The modality modification system may determine a location parameter and a movement parameter associated with a location of the user device through analysis of geographic positioning data, motion sensor information, and environmental context indicators. Location parameter determination may utilize global positioning system coordinates, network-based location services, wireless access point triangulation, or other positioning technologies to establish the physical location of the user device during sensitive data input operations. Movement parameter analysis may process accelerometer data, gyroscope measurements, and velocity calculations to assess device stability, user mobility patterns, and environmental motion characteristics that may affect input security.

Location parameter analysis may evaluate factors including geographic coordinates, altitude measurements, location accuracy indicators, and positioning confidence levels to establish precise device location information for security assessment purposes. The location parameters may include indoor positioning data, building identification information, floor level indicators, and room-specific location details when available through enhanced positioning systems. Movement parameter evaluation may analyze device acceleration patterns, rotation characteristics, walking or transportation indicators, and stability measurements that provide context about user activity and environmental conditions during sensitive data input sessions.

The modality modification system may determine audio characteristics of the location of the user device through environmental sound analysis, ambient noise measurement, and acoustic signature recognition that provide context about the security and privacy conditions of the user's environment. Audio characteristics determination may utilize microphone sensors, sound level meters, and acoustic analysis algorithms to assess environmental factors including background noise levels, conversation presence, crowd density indicators, and potential eavesdropping risks that may compromise the security of voice-based or audio-sensitive input modalities.

Audio characteristics analysis may evaluate ambient sound patterns, frequency distributions, volume levels, and acoustic signatures that indicate the presence of other individuals, recording devices, or environmental conditions that may pose security risks during sensitive data input operations. The audio analysis may identify specific sound patterns including human voices, electronic device signatures, or environmental noise characteristics that suggest potential privacy or security concerns. Audio characteristics may include reverberation patterns, acoustic isolation measurements, and sound propagation analysis that help assess the likelihood of audio interception or unauthorized listening during voice-based authentication or data input processes.

The modality modification system may generate a security metric associated with the location of the user device based on the determined location parameters, movement parameters, and audio characteristics to provide a comprehensive assessment of environmental security conditions. Security metric generation may combine multiple environmental factors including location privacy levels, movement stability indicators, audio security assessments, and contextual risk factors to produce a quantitative security score that guides input modality selection decisions. The security metric may incorporate weighting factors that prioritize different environmental characteristics based on their relative importance for specific types of sensitive data input operations.

Security metric calculation may utilize machine learning algorithms, risk assessment models, and statistical analysis techniques to process the location, movement, and audio parameters into a unified security assessment that reflects the overall safety and privacy conditions of the user's environment. The security metric may include sub-scores for different security aspects including location privacy, environmental stability, audio security, and contextual risk factors that provide detailed insight into specific security considerations. The generated security metric may be compared against predefined security thresholds, policy requirements, and application-specific security standards to determine appropriate input modality selections for different types of sensitive data collection operations.

The modality modification system may determine, based on the security metric and the privacy setting, whether the initial input modality matches the privacy setting through comparative analysis of environmental security conditions against predefined privacy requirements for authentication data input. The privacy setting comparison may evaluate whether the generated security metric meets or exceeds the minimum security thresholds required for safe authentication data collection through the initial input modality. Privacy setting evaluation may consider factors including location-based privacy requirements, environmental security standards, and regulatory compliance mandates that govern authentication data handling in different contexts and environments.

Privacy setting matching determination may involve analyzing the relationship between the calculated security metric and the specific privacy requirements associated with authentication data input operations. The matching assessment may consider whether environmental conditions provide sufficient privacy protection, security isolation, and risk mitigation to support secure authentication data collection through the initial input modality. When the security metric indicates that environmental conditions do not meet privacy setting requirements, the system may trigger alternate input modality selection to ensure appropriate protection for sensitive authentication information throughout the data collection and processing operations.

The modality modification system may receive initial output data from the application during request processing operations to evaluate the security requirements and presentation characteristics of information that will be delivered to users. The initial output data may include sensitive information such as account balances, transaction details, personal identification information, financial records, or other confidential data that requires appropriate security measures during presentation to users. The initial output data reception process may involve analyzing data classification levels, security tags, and content sensitivity indicators that determine the protection requirements for information display and user interaction.

Initial output data analysis may examine the content structure, data types, and security classifications associated with application responses to identify sensitive elements that require enhanced protection during presentation. The analysis process may evaluate textual content for personally identifiable information, financial data, authentication tokens, or other sensitive elements that may require specialized display methods or security controls. The initial output data may include metadata, security headers, and classification tags that specify the required protection levels and handling procedures for different types of information contained within the application response.

The modality modification system may determine an initial output modality being used by the user device does not match an output security level associated with the initial output data through security compatibility assessment algorithms that evaluate presentation method security characteristics against data protection requirements. The initial output modality may include standard visual display through screen rendering, audio output through speakers, haptic feedback through vibration systems, or other presentation methods that may lack sufficient security measures for sensitive information display. The output security level assessment may consider factors including display encryption capabilities, screen protection measures, audio isolation characteristics, and environmental security conditions that affect the safety of information presentation.

Output security level determination may analyze the sensitivity classification of the initial output data against the security capabilities of the initial output modality to identify mismatches that require alternate presentation methods. The security level evaluation may consider regulatory compliance requirements, data protection standards, and organizational security policies that govern sensitive information display and user interaction. The output security level may specify requirements for encrypted display channels, secure rendering techniques, access control measures, or environmental protection standards that ensure appropriate security during information presentation to users.

Security compatibility assessment may evaluate whether the initial output modality provides sufficient protection measures including screen capture prevention, unauthorized viewing protection, audio interception resistance, or other security features required for safe presentation of the initial output data. The assessment process may consider environmental factors including location privacy, potential observer presence, device sharing risks, or other contextual security concerns that may compromise information security during presentation through the initial output modality. When security compatibility mismatches are identified, the system may trigger alternate output modality selection to ensure appropriate protection for sensitive information display.

The modality modification system may select, based on the security level associated with the initial output data, an alternate output modality for displaying the initial output data through security-optimized presentation method selection algorithms that match data protection requirements with appropriate display technologies. The alternate output modality selection process may evaluate available presentation methods including secure visual displays with encryption, private audio delivery through headphones, haptic communication through tactile feedback, or other specialized output methods that provide enhanced security characteristics for sensitive information presentation.

Alternate output modality selection may consider the specific security requirements of the initial output data including confidentiality protection, integrity verification, access control enforcement, and audit trail generation capabilities that ensure appropriate handling of sensitive information throughout the presentation process. The selection algorithms may evaluate the effectiveness of different output modalities for presenting specific types of sensitive data while maintaining user accessibility, comprehension, and interaction efficiency. The alternate output modality may implement security features including display masking, time-limited presentation, user authentication verification, or other protective measures that prevent unauthorized access to sensitive information.

The modality modification system may determine a plurality of output modalities available to the user device, where the plurality of output modalities may comprise an output media type and one or more output parameters associated with the output media type. The output modality determination process may analyze device capabilities, hardware components, software features, and connectivity options to identify all available presentation methods that may be utilized for secure information display. The plurality of output modalities may include visual display systems, audio output devices, haptic feedback mechanisms, wireless communication channels, or other presentation technologies supported by the user device.

Output media type identification may categorize available presentation methods based on their fundamental communication characteristics including visual media types that utilize screen displays or projection systems, audio media types that employ speakers or headphone systems, tactile media types that provide haptic feedback or vibration patterns, or hybrid media types that combine multiple presentation channels for enhanced information delivery. The output media type classification may consider the security characteristics, user accessibility features, and environmental suitability of different presentation methods to support appropriate modality selection for various types of sensitive information display requirements.

Output parameters associated with each output media type may include technical specifications, security features, accessibility options, and presentation characteristics that define the capabilities and limitations of different output modalities. Visual output parameters may include screen resolution, color depth, brightness levels, contrast ratios, refresh rates, encryption capabilities, and display protection features that affect the quality and security of visual information presentation. Audio output parameters may include frequency response, volume levels, channel configuration, noise cancellation capabilities, privacy features, and audio encryption options that influence the effectiveness and security of audio information delivery.

Haptic output parameters may include vibration patterns, force feedback capabilities, tactile resolution, response timing, and pattern complexity options that determine the effectiveness of tactile information communication. The output parameters may also include environmental adaptation capabilities, user customization options, accessibility accommodation features, and security enhancement measures that enable optimal information presentation across diverse user needs and contextual requirements. The parameter evaluation process may consider user preferences, accessibility requirements, and security constraints to identify the most appropriate output modality configurations for specific information presentation scenarios.

The modality modification system may select the alternate output modality based on the output media type and the one or more output parameters through comprehensive evaluation algorithms that match information presentation requirements with optimal device capabilities and security features. The selection process may analyze the compatibility between the security requirements of the initial output data and the protection capabilities offered by different combinations of output media types and their associated parameters. The selection algorithms may prioritize output modalities that provide the highest level of security protection while maintaining user accessibility and information comprehension effectiveness.

Output modality selection may involve scoring algorithms that evaluate different combinations of output media types and parameters against multiple criteria including security effectiveness, user accessibility, information clarity, environmental suitability, and device compatibility. The scoring process may weight different selection criteria based on the specific requirements of the initial output data, user preferences, accessibility needs, and contextual security considerations. The alternate output modality selection may optimize the balance between security protection and user experience to ensure that sensitive information is presented safely while maintaining effective user interaction and task completion capabilities.

The selection process may implement fallback mechanisms that identify secondary and tertiary output modality options when the preferred alternate output modality is unavailable or incompatible with current device conditions or user requirements. The fallback selection may maintain security protection standards while adapting to device limitations, environmental constraints, or user accessibility needs that may prevent utilization of the primary alternate output modality. The modality selection algorithms may continuously monitor device status, environmental conditions, and user context to ensure that the selected alternate output modality remains appropriate and effective throughout the information presentation process.

The modality modification system may determine that the request has been completed through request status monitoring algorithms that track the progress of user interactions, data processing operations, and transaction completion indicators throughout the request lifecycle. Request completion determination may involve analyzing user confirmation signals, application response codes, transaction verification messages, or other completion indicators that signify successful fulfillment of the original user request. The completion assessment may verify that all required data has been collected, processed, and delivered appropriately while maintaining security and accessibility standards throughout the interaction session.

Request completion monitoring may evaluate multiple completion criteria including successful data transmission, user acknowledgment receipt, application confirmation responses, security verification completion, and audit trail generation to ensure comprehensive request fulfillment. The monitoring process may track the status of both input data collection operations and output data presentation activities to confirm that all aspects of the user request have been addressed appropriately. Request completion determination may include verification that sensitive data has been handled securely, accessibility requirements have been met, and user satisfaction indicators suggest successful interaction outcomes.

Based on determining that the request has been completed, the modality modification system may transmit one or more commands to the user device to change the alternate input modality to the initial input modality and an alternate output modality to an initial output modality. The modality restoration process may implement transition protocols that safely return user interaction methods to their original configurations while maintaining security protection for any residual sensitive data or system state information. The restoration commands may specify the technical procedures for deactivating alternate modality components, reinitializing original input and output systems, and clearing any temporary security configurations that were established during the secure interaction session.

Modality restoration commands may include instructions for hardware component deactivation, software module reinitialization, security protocol termination, and user interface reconfiguration that restore the user device to its pre-request interaction state. The restoration process may implement secure cleanup procedures that remove sensitive data from temporary storage locations, clear authentication tokens from memory, and reset security configurations to prevent unauthorized access to residual information from the completed request session. The modality restoration may include verification procedures that confirm successful return to original input and output modalities while ensuring that no security vulnerabilities or data exposure risks remain from the alternate modality operations.

The restoration command transmission may utilize secure communication protocols and encrypted message delivery to protect the modality transition instructions during transfer to the user device. The user device may process the restoration commands to systematically deactivate alternate modality components, restore original interaction methods, and verify successful completion of the modality restoration process. The restoration operations may include user notification mechanisms that confirm successful return to original interaction modes and provide feedback about the completion of the secure request processing session.

Modality restoration may implement gradual transition procedures that smoothly shift from alternate modalities back to original input and output methods without disrupting ongoing user activities or creating jarring interface changes. The restoration process may preserve user context information, interaction history, and preference settings that were established during the original interaction session while safely removing security-specific configurations and temporary adaptations that were implemented for sensitive data handling. The modality restoration capabilities may enable users to seamlessly continue their interactions using familiar input and output methods after secure request processing operations have been completed successfully.

FIG. 11 is a flowchart of operations for a process 1100 for modifying input modalities. Operation 1102 involves receiving a request associated with an application from a user device associated with a user, where the request has been input using an initial input modality of the user device. This operation may use network interface 640 and I/O device interface 630, which handle incoming requests from user devices and manage communication protocols. The processors 610a-610n execute program instructions 670 stored in system memory 620 to process these incoming requests and determine their characteristics and requirements.

Operation 1104 involves determining that the request requires additional user data to complete the requested operations or transactions. This operation may use processors 610a-610n that analyze the request parameters and application requirements stored as data 680 in system memory 620. The determination process may utilize the computing system's analytical capabilities to identify when supplementary information must be collected from users to fulfill the original request.

Operation 1106 involves determining a security level associated with the additional user data, where the security level indicates a sensitivity level associated with the additional user data. This operation may use processors 610a-610n. Operation 1108 involves determining whether the initial input modality matches the security level associated with the additional user data through compatibility assessment algorithms. This operation may use processors 610a-610n, which may execute comparison algorithms and security evaluation routines stored as program instructions 670 in system memory 620. The compatibility assessment utilizes the computing system's processing capabilities to evaluate input method security characteristics against data sensitivity requirements.

Operation 1110 involves selecting an alternate input modality based on available input modalities for the user device when the initial input modality does not match the required security level. This operation may use processors 610a-610n for the selection process and store data in system memory 620. Operation 1112 involves generating one or more instructions for creating an input interface according to the alternate input modality, where the input interface enables users to input additional data securely. This operation builds upon elements where the machine learning model 702 processes security requirements and device capabilities as input 704 to generate detailed interface specifications as output 706. The transformer 812 architecture in FIG. 8 supports this process through decoder 810, which processes feature vectors 814 to generate output tokens 816 that specify interface generation parameters and security configurations.

Operation 1114 involves providing the generated instructions to the user device, where the user device generates the input interface and enables secure input of additional data. This operation may use network interface 640 and communication capabilities of computing system 600, which handle the secure transmission of interface generation instructions to user devices. The I/O interface 650 coordinates the delivery of transformation specifications while maintaining data integrity and security compliance throughout the transmission process.

The modality modification system 160 may implement comprehensive disability detection and accessibility adaptation capabilities that automatically identify user accessibility needs and generate personalized user interface modifications through advanced pattern recognition and machine learning analysis. The system may determine that users are associated with one or more disabilities of a plurality of disabilities through behavioral analysis, interaction pattern monitoring, and physiological indicator assessment without requiring explicit user disclosure of accessibility needs or medical conditions. Each disability may be associated with a corresponding output modality that provides optimized content presentation and interaction methods tailored to specific accessibility requirements and user capabilities.

Referring to FIG. 12, a color vision module 1203 may implement automatic color blindness type classification through behavioral pattern analysis and interaction monitoring that identifies color vision deficiencies without requiring user disclosure or medical testing. The color vision module 1203 may analyze user interaction patterns with color-coded interface elements, monitor hesitation or error patterns when distinguishing between specific color combinations, and detect characteristic behavioral indicators associated with different types of color vision deficiencies. The color vision module 1203 may utilize convolutional neural network classification algorithms that process user interaction data to identify specific color blindness types and generate appropriate color adaptation strategies.

The color vision module 1203 may perform automatic color blindness type classification including protanopia, deuteranopia, tritanopia, and achromatopsia through comprehensive analysis of user responses to color-based interface elements and visual content presentations. Protanopia detection may involve analyzing user difficulties with red color perception through monitoring of interaction patterns with red-green color combinations, error rates in color-dependent tasks, and hesitation patterns when processing red-dominant visual elements. The color vision module 1203 may identify protanopia indicators through analysis of user performance with traffic light interfaces, status indicator recognition, and color-coded data visualization interactions.

Deuteranopia classification within the color vision module 1203 may focus on green color deficiency detection through analysis of user interactions with green-dominant interface elements, nature-themed color schemes, and green-red contrast scenarios. The color vision module 1203 may monitor user behavior patterns when processing vegetation imagery, environmental color schemes, and green-based status indicators to identify characteristic deuteranopia response patterns. Tritanopia detection may involve analyzing user difficulties with blue color perception through monitoring of interactions with blue-yellow color combinations, sky-themed interfaces, and blue-dominant visual presentations.

Achromatopsia identification within the color vision module 1203 may detect complete color blindness through analysis of user reliance on brightness and contrast cues rather than color information for interface navigation and content comprehension. The color vision module 1203 may identify achromatopsia indicators through monitoring of user interaction patterns that demonstrate consistent color-independent navigation strategies, preference for high-contrast interfaces, and reliance on textural or pattern-based visual cues rather than color-based information processing. The classification algorithms may generate confidence scores for each color blindness type based on the strength and consistency of detected behavioral indicators.

A dyslexia detection module 1206 may implement reading pattern analysis and eye tracking assessment to identify dyslexia indicators through characteristic reading behaviors and text processing patterns. The dyslexia detection module 1206 may track reading speed below 200 words per minute with re-reading rates above 30% as primary indicators of dyslexia-related reading challenges that require specialized text presentation and accessibility accommodations. The dyslexia detection module 1206 may monitor eye movement patterns, fixation durations, and saccade irregularities that indicate difficulty with text processing and comprehension despite adequate intellectual capabilities.

Reading speed analysis within the dyslexia detection module 1206 may measure words per minute processing rates across different types of textual content including simple sentences, complex paragraphs, and technical documentation to establish baseline reading performance metrics. The dyslexia detection module 1206 may identify reading speeds consistently below 200 words per minute as potential dyslexia indicators when combined with other behavioral markers such as frequent re-reading, word skipping patterns, and line tracking difficulties. The module may account for content complexity variations and user familiarity factors when establishing reading speed thresholds for dyslexia detection.

Re-reading rate monitoring within the dyslexia detection module 1206 may track the frequency of repeated text processing attempts, backtracking behaviors, and content review patterns that exceed 30% of total reading time. The dyslexia detection module 1206 may analyze temporal patterns of text re-reading to distinguish between normal comprehension verification behaviors and dyslexia-related processing difficulties that require repeated exposure to textual content for understanding. The module may correlate re-reading rates with comprehension assessment results to identify cases where frequent re-reading indicates processing challenges rather than thoroughness or caution.

The dyslexia detection module 1206 may implement word skipping detection algorithms that identify patterns of missed words, letter transpositions, and reading sequence irregularities characteristic of dyslexia-related text processing challenges. Line tracking analysis within the dyslexia detection module 1206 may monitor user ability to maintain proper reading progression across text lines, detect frequent line-skipping errors, and identify difficulties with text organization and spatial processing. The module may generate dyslexia confidence scores based on the combination of reading speed measurements, re-reading frequency analysis, and characteristic behavioral pattern recognition.

An attention pattern module 1209 may detect ADHD indicators through rapid task switching and shortened focus periods with preference for multimedia content that suggest attention regulation challenges requiring specialized interface design and interaction accommodations. The attention pattern module 1209 may monitor user behavior patterns including task completion rates, attention span measurements, and engagement level variations across different types of content and interface designs. The module may analyze temporal patterns of user focus, distraction frequency, and attention maintenance capabilities to identify ADHD-related attention regulation difficulties.

Rapid task switching detection within the attention pattern module 1209 may monitor user navigation patterns, application switching frequency, and multitasking behaviors that indicate difficulty maintaining sustained attention on single tasks or content areas. The attention pattern module 1209 may track the frequency of interface element changes, content area transitions, and task abandonment patterns that suggest attention regulation challenges characteristic of ADHD. The module may distinguish between purposeful multitasking behaviors and attention-driven task switching that indicates difficulty with sustained focus and task completion.

Shortened focus period analysis within the attention pattern module 1209 may measure attention span durations across different types of content and interface interactions to identify patterns of reduced sustained attention characteristic of ADHD. The attention pattern module 1209 may track engagement duration with textual content, video materials, interactive elements, and complex tasks to establish baseline attention capabilities and identify when focus periods fall below typical ranges. The module may correlate shortened focus periods with task complexity, content type, and interface design factors to distinguish ADHD-related attention challenges from content-specific engagement issues.

Multimedia content preference detection within the attention pattern module 1209 may analyze user engagement patterns with different content types including text, images, videos, and interactive elements to identify preferences for dynamic and visually stimulating content characteristic of ADHD attention patterns. The attention pattern module 1209 may monitor user response rates, engagement duration, and completion rates across different media types to identify patterns suggesting improved attention maintenance with multimedia presentations compared to static textual content. The module may track user interaction quality and comprehension outcomes with multimedia content to verify that multimedia preferences correlate with improved attention and learning outcomes.

A motor control module 1212 may perform tremor and precision analysis with adaptive interface element sizing based on click/tap accuracy measurement to identify motor control challenges that require specialized interface accommodations and interaction method adaptations. The motor control module 1212 may monitor user interaction precision, movement stability, and coordination patterns through analysis of mouse movements, touch gestures, and input device usage patterns. The module may implement real-time analysis of user motor control capabilities to generate appropriate interface adaptations that accommodate detected motor control limitations.

Tremor analysis within the motor control module 1212 may detect involuntary movement patterns, hand stability variations, and coordination difficulties through monitoring of input device usage patterns and gesture execution quality. The motor control module 1212 may analyze mouse movement trajectories, touch pressure variations, and gesture completion accuracy to identify tremor-related motor control challenges that affect user interaction effectiveness. The module may distinguish between intentional movement variations and involuntary tremor patterns that indicate motor control difficulties requiring interface accommodations.

Precision analysis within the motor control module 1212 may measure click accuracy, tap precision, and target acquisition success rates to assess user fine motor control capabilities and identify when interface elements require sizing or positioning modifications. The motor control module 1212 may track user success rates with different interface element sizes, button spacing configurations, and target acquisition tasks to establish baseline precision capabilities and identify optimal interface configurations for individual users. The module may analyze error patterns, correction attempts, and task completion efficiency to determine appropriate interface element sizing and spacing requirements.

Adaptive interface element sizing within the motor control module 1212 may automatically adjust button sizes, clickable areas, and interactive element dimensions based on measured click/tap accuracy and precision analysis results. The motor control module 1212 may implement dynamic sizing algorithms that increase interface element dimensions when precision analysis indicates motor control challenges, while maintaining interface functionality and visual design coherence. The module may provide sticky hover zones, enlarged click targets, and reduced precision requirements for users with detected motor control limitations while preserving interface usability for users without motor control challenges.

As further shown in FIG. 12, a privacy detection module 1215 may ensure all detection happens locally with no data leaving the device and maintains user control with opt-out availability to protect user privacy while enabling effective accessibility need identification and accommodation. The privacy detection module 1215 may implement on-device processing algorithms that analyze user behavioral patterns, interaction data, and physiological indicators without transmitting sensitive information to external servers or cloud-based processing systems. The module may maintain complete user control over disability detection processes through transparent opt-out mechanisms and user consent management systems.

Local processing capabilities within the privacy detection module 1215 may utilize on-device machine learning algorithms, edge computing resources, and local data analysis techniques to perform disability detection and accessibility need assessment without requiring data transmission to external systems. The privacy detection module 1215 may implement federated learning approaches that enable model improvement through anonymous pattern sharing while maintaining individual user data privacy and preventing personal information disclosure. The module may ensure that all behavioral analysis, pattern recognition, and disability classification operations occur within the user device environment without exposing sensitive user information to external analysis or storage systems.

User control mechanisms within the privacy detection module 1215 may provide transparent opt-out options that enable users to disable disability detection processes, delete collected behavioral data, and control the scope of accessibility analysis performed by the system. The privacy detection module 1215 may implement granular privacy controls that allow users to selectively enable or disable specific types of disability detection while maintaining access to desired accessibility accommodations. The module may provide clear explanations of detection processes, data usage policies, and privacy protection measures to enable informed user consent and control over accessibility analysis operations.

The privacy detection module 1215 may implement data anonymization techniques, differential privacy methods, and secure computation approaches that enable pattern learning and model improvement while preventing individual user identification or personal information exposure. The module may maintain audit trails of privacy protection measures, user consent decisions, and data handling procedures to ensure compliance with privacy regulations and user preferences throughout the disability detection and accessibility accommodation processes. The privacy detection module 1215 may enable users to review, modify, or delete their accessibility profiles while maintaining the effectiveness of personalized accommodations and interface adaptations.

Figure 13:
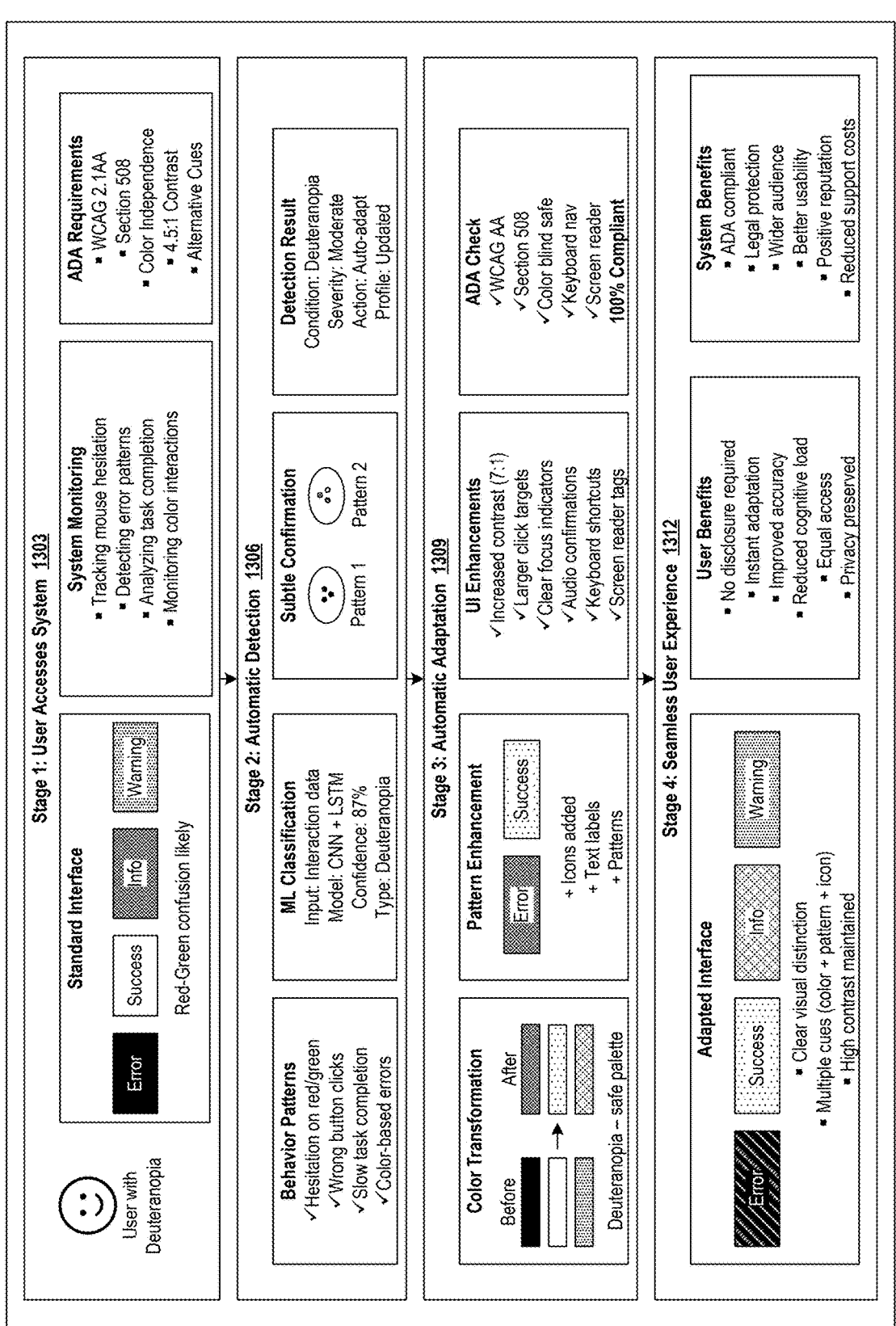
FIG. 13 illustrates an exemplary system for user interface adaptation, in accordance with one or more embodiments of this disclosure.

Referring to FIG. 13, a user access stage 1303 may provide the initial interface presentation and system monitoring capabilities that establish baseline user interaction patterns and collect behavioral data for disability detection analysis. The user access stage 1303 may present standard interfaces with error, success, info, and warning indicators while implementing system monitoring capabilities that track user interaction patterns, response times, and behavioral indicators without disrupting normal system usage. The user access stage 1303 may incorporate ADA requirements and accessibility standards into baseline interface designs to ensure compliance with accessibility regulations while enabling effective disability detection through user behavior analysis.

Standard interface presentation within the user access stage 1303 may provide consistent visual layouts, interaction elements, and content organization that enable reliable behavioral pattern analysis and disability detection across different user sessions and content types. The user access stage 1303 may implement standardized color schemes, typography selections, and interface element arrangements that provide controlled conditions for detecting user accessibility needs and interaction challenges. The stage may present content using established design patterns and accessibility guidelines to create baseline conditions for measuring user adaptation needs and interface optimization requirements.

System monitoring capabilities within the user access stage 1303 may track user interaction patterns, navigation behaviors, and task completion metrics through unobtrusive data collection methods that preserve user privacy while gathering information needed for disability detection analysis. The user access stage 1303 may monitor mouse movements, keyboard usage patterns, touch gestures, and eye tracking data when available to establish comprehensive behavioral profiles that inform accessibility need identification. The monitoring systems may operate continuously during user sessions to capture sufficient behavioral data for reliable disability detection while maintaining system performance and user experience quality.

A detection stage 1306 may implement behavioral pattern analysis and machine learning classification algorithms that process user interaction data collected during the user access stage 1303 to identify specific disability types and accessibility requirements. The detection stage 1306 may utilize the color vision module 1203, dyslexia detection module 1206, attention pattern module 1209, and motor control module 1212 to perform comprehensive disability detection across multiple accessibility domains. The detection stage 1306 may implement subtle confirmation mechanisms that verify disability detection results through additional behavioral analysis without requiring explicit user disclosure or medical documentation.

Behavioral pattern analysis within the detection stage 1306 may process user interaction data through pattern recognition algorithms that identify characteristic behaviors associated with specific disability types including color vision deficiencies, reading pattern differences, attention regulation challenges, and motor control limitations. The detection stage 1306 may correlate behavioral indicators across multiple interaction sessions to establish reliable disability detection results while accounting for temporary factors such as fatigue, distraction, or environmental conditions that may affect user behavior patterns. The analysis algorithms may generate confidence scores for different disability types based on the strength and consistency of detected behavioral indicators.

Machine learning classification within the detection stage 1306 may utilize trained models that process behavioral pattern data to generate disability type predictions and accessibility requirement recommendations based on established patterns and validated detection criteria. The detection stage 1306 may implement ensemble classification approaches that combine multiple detection algorithms to improve accuracy and reduce false positive rates in disability identification. The classification systems may continuously learn from user feedback and accommodation effectiveness data to refine detection accuracy and improve accessibility recommendation quality over time.

Subtle confirmation mechanisms within the detection stage 1306 may implement verification procedures that confirm disability detection results through additional behavioral analysis, task-based assessments, or preference-based interactions that provide supporting evidence for detected accessibility needs. The detection stage 1306 may utilize embedded assessment tasks, preference surveys, or interaction challenges that appear as normal system features while providing additional data for disability detection verification. The confirmation processes may operate transparently without alerting users to disability detection activities while ensuring accurate identification of accessibility requirements.

An adaptation stage 1309 may implement color transformation, pattern enhancement, UI enhancements, and ADA compliance checking based on disability detection results from the detection stage 1306 to generate personalized accessibility accommodations and interface modifications. The adaptation stage 1309 may retrieve application data and one or more output modalities associated with detected disabilities, where the application data may be retrieved from one or more applications and the output modalities may be associated with delivery mode parameters, data complexity parameters, audio preference parameters, or video preference parameters that optimize content presentation for specific accessibility needs.

Color transformation within the adaptation stage 1309 may implement automatic color palette adjustments, contrast enhancements, and color scheme modifications based on detected color vision deficiencies identified by the color vision module 1203. The adaptation stage 1309 may apply protanopia-specific color transformations that shift red-dominant color schemes to blue-yellow alternatives, deuteranopia adaptations that modify green-based color elements, or tritanopia accommodations that adjust blue-dominant visual presentations. The color transformation algorithms may maintain visual design coherence while ensuring that color-dependent information remains accessible to users with different types of color vision deficiencies.

Pattern enhancement within the adaptation stage 1309 may add textural overlays, shape-based indicators, and pattern-based visual cues that supplement color-based information presentation for users with color vision deficiencies or visual processing differences. The adaptation stage 1309 may implement pattern overlays that distinguish between different data categories, status indicators, or interface elements through texture variations, line patterns, or shape modifications that provide alternative visual differentiation methods. The pattern enhancement algorithms may ensure that visual information remains accessible through multiple sensory channels while preserving interface functionality and aesthetic quality.

UI enhancements within the adaptation stage 1309 may implement font modifications, spacing adjustments, and layout optimizations based on detected dyslexia indicators, attention pattern challenges, or motor control limitations identified through the disability detection modules. The adaptation stage 1309 may apply dyslexia-friendly typography including OpenDyslexic font selections, increased letter spacing, and enhanced line spacing that improve text readability for users with reading pattern differences. The UI enhancements may include attention-focused design modifications such as reduced visual clutter, simplified navigation structures, and enhanced focus indicators that support users with ADHD-related attention challenges.

ADA compliance checking within the adaptation stage 1309 may verify that all interface modifications and accessibility accommodations meet or exceed Americans with Disabilities Act requirements, Web Content Accessibility Guidelines standards, and Section 508 compliance specifications. The adaptation stage 1309 may implement automated compliance verification algorithms that assess color contrast ratios, keyboard navigation compatibility, screen reader accessibility, and alternative text availability to ensure that adapted interfaces maintain legal accessibility compliance. The compliance checking systems may generate compliance reports and remediation recommendations when adaptation modifications require additional accessibility enhancements.

As further shown in FIG. 13, a user experience stage 1312 may display the adapted interface with clear visual distinction and provide user benefits including instant adaptation and improved accuracy along with system benefits such as ADA compliance and reduced support costs. The user experience stage 1312 may present the modified user interface generated through the adaptation stage 1309 while monitoring user interaction quality, task completion effectiveness, and satisfaction indicators to verify accommodation success. The user experience stage 1312 may implement feedback collection mechanisms that gather user response data to inform future adaptation improvements and disability detection refinements.

Adapted interface presentation within the user experience stage 1312 may display personalized accessibility accommodations including color-adjusted visual elements, dyslexia-friendly typography, attention-focused interface designs, and motor control-optimized interaction elements based on detected disability types and user requirements. The user experience stage 1312 may ensure that adapted interfaces maintain visual coherence and functional effectiveness while providing necessary accessibility accommodations that improve user interaction quality and task completion success rates. The adapted interface presentation may implement smooth transition effects and gradual adaptation deployment to minimize user disruption during accommodation activation.

User benefits within the user experience stage 1312 may include instant adaptation capabilities that provide immediate accessibility accommodations without requiring manual configuration or explicit disability disclosure from users. The user experience stage 1312 may deliver improved accuracy in task completion, reduced interaction errors, and enhanced user satisfaction through personalized accessibility accommodations that address specific user needs and capabilities. The instant adaptation benefits may eliminate the need for users to navigate complex accessibility settings or repeatedly configure accommodations across different applications and platforms.

System benefits within the user experience stage 1312 may include automatic ADA compliance achievement through systematic accessibility accommodation deployment and reduced support costs through proactive accessibility need identification and accommodation. The user experience stage 1312 may provide organizations with automated accessibility compliance verification, reduced legal liability risks, and improved user satisfaction metrics through comprehensive disability accommodation systems. The system benefits may include reduced customer support requests, improved user retention rates, and enhanced organizational reputation through demonstrated commitment to accessibility and inclusive design practices.

The modality modification system 160 may input the application data and the one or more output modalities into a generative machine learning model to obtain a plurality of instructions for generating the user interface according to the one or more disabilities, where the plurality of instructions generates the user interface that modifies the application data according to the one or more output modalities. The generative machine learning model may process disability-specific requirements, accessibility accommodation parameters, and user interface modification specifications to generate comprehensive interface adaptation instructions that address detected accessibility needs while maintaining functionality and compliance standards.

The plurality of instructions generated by the generative machine learning model may specify detailed interface modification procedures including color palette transformations for color vision deficiencies, typography and spacing adjustments for dyslexia accommodations, attention-focused design modifications for ADHD support, and motor control optimizations for users with precision limitations. The instructions may include cascading style sheet modifications, interactive element adjustments, content restructuring specifications, and accessibility feature implementations that ensure comprehensive accommodation of detected disability types while preserving semantic meaning and functional effectiveness of the original application data.

The modality modification system 160 may cause the device of the user to display the user interface, where the user interface may be generated based on the plurality of instructions received from the generative machine learning model. The user interface display process may implement the specified accessibility accommodations, interface modifications, and content adaptations while maintaining system performance and user experience quality. The generated user interface may provide personalized accessibility support that addresses specific user needs identified through the disability detection and analysis processes while ensuring compliance with accessibility standards and regulatory requirements.

The modality modification system may determine that the one or more disabilities are associated with one or more input modalities through analysis of disability-specific interaction requirements and optimal input method compatibility assessments. The determination process may evaluate how different types of disabilities affect user interaction capabilities and identify input modalities that provide enhanced accessibility and usability for specific disability types. The system may analyze the relationship between detected disabilities and available input methods to determine which input modalities offer optimal accommodation and support for individual user needs and capabilities.

Disability-input modality association analysis may examine how color vision deficiencies affect visual input processing, how dyslexia impacts text-based input methods, how ADHD influences attention-dependent input modalities, and how motor control limitations affect precision-based input techniques. The system may determine that users with color vision deficiencies may benefit from input modalities that rely on pattern recognition, texture differentiation, or audio-based input methods rather than color-dependent visual input systems. The analysis may identify that users with dyslexia may require voice input alternatives, simplified text input interfaces, or audio-assisted input methods that reduce reliance on text processing capabilities.

The system may determine that users with ADHD-related attention challenges may benefit from input modalities that provide immediate feedback, gamified interaction elements, or multi-modal input options that maintain engagement and focus during data entry operations. Motor control limitation analysis may identify that users with tremor or precision difficulties may require input modalities with larger target areas, voice input alternatives, or gesture-based input methods that accommodate reduced fine motor control capabilities. The determination process may generate input modality recommendations that optimize accessibility and interaction effectiveness for each detected disability type.

The modality modification system may retrieve a plurality of device input modalities associated with the device of the user through comprehensive device capability assessment and hardware component analysis. The retrieval process may analyze available input hardware including touchscreen interfaces, physical keyboards, voice input systems, camera-based gesture recognition, biometric sensors, and specialized accessibility input devices that may be connected to or integrated with the user device. The system may evaluate the technical specifications, accessibility features, and compatibility characteristics of each available input modality to determine their suitability for disability accommodation and user interface adaptation.

Device input modality retrieval may involve querying device hardware specifications, driver availability, sensor capabilities, and software support for different input methods to establish a comprehensive inventory of available interaction options. The retrieval process may assess touchscreen sensitivity levels, keyboard layout options, microphone quality specifications, camera resolution capabilities, and gesture recognition accuracy to determine the effectiveness of each input modality for specific accessibility requirements. The system may also evaluate external input device compatibility including specialized keyboards, alternative pointing devices, eye tracking systems, or assistive technology interfaces that may enhance input accessibility for users with specific disabilities.

Input modality capability assessment may analyze response time characteristics, accuracy levels, environmental sensitivity, and user customization options for each available input method to determine optimal configurations for disability accommodation. The retrieval process may examine voice recognition accuracy rates, gesture detection precision, touch sensitivity settings, and keyboard repeat rates to identify input modalities that provide reliable and accessible interaction options for users with different types of disabilities. The system may maintain an updated inventory of device input modalities that reflects current hardware status, software updates, and accessibility feature availability.

The modality modification system may input the one or more input modalities and the plurality of device input modalities into the generative machine learning model to obtain one or more device commands for activating device component for enabling the one or more input modalities.

The generative machine learning model may process the compatibility relationships between disability-specific input modality requirements and available device input capabilities to generate precise activation commands that configure optimal input methods for individual users. The model may analyze the technical requirements, accessibility features, and user preference parameters associated with recommended input modalities to generate device commands that enable appropriate input method configurations.

The one or more input modalities may comprise one or more of input mode parameter, input complexity parameter, audio input parameter, or video input parameter that define the characteristics and configuration requirements for disability-specific input methods. An input mode parameter may specify the primary interaction method such as voice input, touch input, gesture input, or keyboard input that provides optimal accessibility for detected disability types. The input mode parameter may define activation procedures, sensitivity settings, and customization options that optimize input method performance for specific user capabilities and accessibility requirements.

An input complexity parameter may indicate the appropriate level of input interface complexity and interaction sophistication that matches user cognitive processing capabilities and attention management abilities. The input complexity parameter may specify simplified input interfaces for users with cognitive processing challenges, streamlined interaction workflows for users with attention difficulties, or enhanced input validation and error correction features for users who may experience input accuracy challenges. The parameter may guide the generation of input interfaces that balance functionality with accessibility to ensure effective user interaction across different disability types.

An audio input parameter may define voice recognition settings, speech processing configurations, and audio input quality requirements that optimize voice-based input methods for users with various accessibility needs. The audio input parameter may specify noise cancellation levels, speech recognition sensitivity, voice command vocabulary, and audio feedback characteristics that enhance voice input effectiveness for users with motor control limitations, visual processing difficulties, or text input challenges. The parameter may include speaker verification settings, accent adaptation options, and speech rate accommodation features that improve voice input accessibility and accuracy.

A video input parameter may specify camera-based input configurations including gesture recognition settings, eye tracking calibration, facial expression analysis, and motion detection parameters that enable visual input methods for users with alternative interaction needs. The video input parameter may define gesture vocabulary, recognition sensitivity, lighting adaptation, and movement tracking accuracy requirements that optimize camera-based input methods for users with motor control variations or alternative interaction preferences. The parameter may include privacy protection settings, data processing options, and user consent management features that ensure secure and appropriate use of video-based input modalities.

The generative machine learning model may generate one or more device commands that specify hardware activation procedures, software configuration settings, and user interface modifications required to enable the recommended input modalities for detected disabilities. The device commands may include hardware initialization sequences, driver activation instructions, sensor calibration procedures, and software module loading commands that prepare the user device to support optimal input methods for individual accessibility requirements. The commands may specify timing sequences, dependency relationships, and error handling procedures that ensure reliable activation of disability-specific input modalities.

Device component activation commands may include touchscreen sensitivity adjustments, keyboard repeat rate modifications, microphone gain settings, camera resolution configurations, and gesture recognition threshold adjustments that optimize input hardware performance for specific disability accommodations. The commands may specify accessibility feature activation including voice command recognition, gesture control enablement, eye tracking initialization, or alternative input device integration that provides enhanced interaction options for users with different types of disabilities. The activation procedures may include user notification mechanisms, configuration confirmation processes, and accessibility feature testing protocols that verify successful input modality enablement.

The modality modification system may receive, in near-real time from the device of the user by the artificial intelligence agent, eye fixation metrics, saccade patterns, pupil response, and blink data that provide comprehensive physiological indicators of user cognitive processing, attention patterns, and comprehension challenges. The near-real time data collection may utilize eye tracking hardware, camera-based analysis systems, or specialized sensors that monitor user eye movement patterns and physiological responses during content interaction sessions. The artificial intelligence agent may process this physiological data continuously to maintain current awareness of user cognitive state and comprehension effectiveness throughout interaction sessions.

Eye fixation metrics may include fixation duration measurements, fixation frequency analysis, and fixation location tracking that indicate user attention distribution, content processing intensity, and comprehension difficulty levels. The artificial intelligence agent may analyze fixation duration patterns to identify when users spend excessive time processing specific content elements, suggesting complexity issues or comprehension challenges that may require content adaptation or accessibility accommodation. Fixation frequency analysis may reveal attention pattern irregularities, scanning behavior variations, or focus distribution problems that indicate cognitive processing difficulties or attention regulation challenges.

Saccade patterns may provide information about eye movement quality, reading progression efficiency, and visual processing coordination through analysis of rapid eye movement characteristics between fixation points. The artificial intelligence agent may monitor saccade velocity, accuracy, and coordination to identify reading pattern irregularities, visual processing difficulties, or attention control challenges that suggest specific disability types or accessibility requirements. Saccade pattern analysis may detect characteristic movement signatures associated with dyslexia, attention difficulties, or visual processing variations that inform appropriate accommodation strategies.

Pupil response measurements may indicate cognitive load levels, processing difficulty, and emotional engagement through analysis of involuntary pupil dilation and constriction patterns during content interaction. The artificial intelligence agent may correlate pupil response variations with content complexity, task difficulty, and user performance metrics to assess when cognitive processing demands exceed comfortable levels and require content simplification or alternative presentation methods. Pupil response analysis may provide objective indicators of user stress, confusion, or cognitive overload that guide automatic content adaptation and accessibility accommodation decisions.

Blink data analysis may reveal fatigue levels, attention maintenance capabilities, and visual processing strain through monitoring of blink frequency, duration, and pattern variations during extended interaction sessions. The artificial intelligence agent may identify increased blink rates that suggest visual fatigue or cognitive strain, decreased blink rates that indicate intense concentration or processing difficulty, or irregular blink patterns that may correlate with attention difficulties or visual processing challenges. Blink data may provide temporal indicators of user cognitive state changes that inform optimal timing for content adaptation, break recommendations, or accessibility accommodation adjustments.

The artificial intelligence agent may determine, using the collected physiological data, one or more of reading patterns, confusion indicators, engagement metrics or cognitive load through comprehensive analysis algorithms that correlate eye tracking measurements with user behavior patterns and task performance outcomes. Reading pattern analysis may identify characteristic eye movement sequences, text processing strategies, and comprehension approaches that indicate specific reading abilities, challenges, or accommodation needs. The artificial intelligence agent may detect reading patterns associated with dyslexia, visual processing differences, or attention regulation difficulties that require specialized text presentation or alternative content formats.

Confusion indicators may be identified through analysis of eye tracking irregularities, increased fixation durations, scattered attention patterns, or pupil response variations that suggest user difficulty with content comprehension or task completion. The artificial intelligence agent may detect confusion through patterns of repeated content review, irregular scanning behaviors, or physiological stress indicators that suggest cognitive processing challenges or information presentation problems. Confusion indicator analysis may trigger automatic content clarification, complexity reduction, or alternative explanation generation to address identified comprehension difficulties.

Engagement metrics may be derived from eye tracking data analysis that measures attention quality, content interaction depth, and sustained focus capabilities throughout user interaction sessions. The artificial intelligence agent may assess engagement through fixation quality, attention distribution patterns, and physiological indicators of interest or motivation that reflect user connection with presented content. Engagement metric analysis may identify when content presentation methods, interface designs, or interaction approaches successfully maintain user attention and when modifications are needed to improve user involvement and task completion effectiveness.

Cognitive load determination may utilize pupil response analysis, fixation pattern assessment, and blink rate monitoring to evaluate the mental processing demands associated with current content presentation and interface design. The artificial intelligence agent may measure cognitive load through physiological indicators that reflect mental effort, processing difficulty, and attention resource utilization during content interaction. Cognitive load analysis may identify when content complexity, interface design, or task requirements exceed user processing capabilities and require simplification, restructuring, or alternative presentation methods to optimize user experience and task completion success.

The artificial intelligence agent may generate, based on one or more of the reading patterns, the confusion indicators, the engagement metrics or the cognitive load, the one or more output modalities for the one or more disabilities through adaptive content generation algorithms that create personalized accessibility accommodations and interface modifications. The generation process may analyze the relationships between physiological indicators and user performance outcomes to determine optimal content presentation methods, interface designs, and interaction approaches that address identified accessibility needs and cognitive processing requirements.

The one or more output modalities may comprise content definitions for the application data that provide contextual explanations, terminology clarification, and background information that address confusion indicators and comprehension challenges identified through physiological monitoring. Content definitions may include hover-activated explanations, expandable glossary entries, or contextual information panels that appear when eye tracking data indicates user confusion or extended processing time with specific content elements. The artificial intelligence agent may generate definitions that match user complexity levels, vocabulary preferences, and comprehension capabilities based on analysis of reading patterns and cognitive load measurements.

Visual aids for the application data may be generated based on engagement metrics and cognitive load analysis that indicate when graphical representations, diagrams, or illustrative content would enhance user comprehension and reduce processing demands. The artificial intelligence agent may create visual aids including flowcharts, concept maps, infographics, or illustrative diagrams that supplement textual content with visual learning support. Visual aid generation may consider user visual processing capabilities, attention patterns, and engagement preferences identified through eye tracking analysis to ensure that generated visual content enhances rather than complicates user comprehension.

Simplified textual data for the application data may be generated when reading pattern analysis, cognitive load assessment, or confusion indicators suggest that original content complexity exceeds user processing capabilities or comprehension comfort levels. The artificial intelligence agent may create simplified text versions that reduce vocabulary complexity, shorten sentence structures, improve organization clarity, or enhance readability while preserving semantic meaning and information completeness. Simplified textual data generation may consider user reading speed, comprehension patterns, and attention capabilities identified through physiological monitoring to ensure appropriate complexity reduction.

Examples of the application data may be generated based on confusion indicators, engagement metrics, and cognitive load analysis that suggest users would benefit from concrete illustrations, practical demonstrations, or contextual examples that clarify abstract concepts or complex information. The artificial intelligence agent may create relevant examples, case studies, analogies, or practical applications that help users understand and apply presented information more effectively. Example generation may consider user background knowledge, interest patterns, and comprehension preferences identified through eye tracking analysis to ensure that generated examples enhance understanding and engagement with the application data.

The modality modification system 160 may receive, using an artificial intelligence agent, application data, a user context comprising a user disability profile, and real-time sensor data to enable comprehensive content transformation and accessibility adaptation based on current user needs and physiological indicators. The application data may comprise textual data and audiovisual data that require processing and adaptation to accommodate detected user disabilities and accessibility requirements. The textual data may include documents, articles, instructions, or written content that requires analysis for complexity, readability, and semantic structure to determine appropriate transformation strategies. The audiovisual data may encompass video content, audio recordings, multimedia presentations, or interactive media elements that require evaluation for accessibility compliance and user accommodation needs.

The user context comprising a user disability profile may contain comprehensive information about detected accessibility needs, accommodation preferences, and user-specific parameters that guide content transformation decisions. The user disability profile may include disability type classifications, severity indicators, accommodation effectiveness data, and user preference settings that inform appropriate transformation strategies for individual users. The user disability profile may encompass color vision deficiency types, reading pattern characteristics, attention regulation capabilities, motor control assessments, and other accessibility-related information collected through behavioral analysis and user interaction monitoring.

The real-time sensor data may comprise eye fixation metrics, saccade patterns, pupil response, and blink data that provide current physiological indicators of user cognitive state, comprehension effectiveness, and accessibility accommodation needs. Eye fixation metrics may include duration measurements, frequency analysis, and location tracking data that indicate user attention distribution and content processing intensity during real-time interaction sessions. Saccade patterns may provide information about eye movement quality, reading progression efficiency, and visual processing coordination through analysis of rapid eye movements between fixation points during content consumption.

Pupil response data may indicate cognitive load levels, processing difficulty, and emotional engagement through measurements of involuntary pupil dilation and constriction patterns that correlate with mental effort and comprehension challenges. Blink data may reveal fatigue levels, attention maintenance capabilities, and visual processing strain through monitoring of blink frequency, duration, and pattern variations during content interaction sessions. The real-time sensor data collection may operate continuously during user sessions to provide current physiological feedback that informs dynamic content transformation and accessibility accommodation decisions.

The modality modification system 160 may analyze the application data to determine semantic context of the application data, complexity of the application data, or structure of the application data through comprehensive content analysis algorithms that evaluate multiple characteristics of textual and audiovisual content. Semantic context analysis may examine the meaning, subject matter, conceptual relationships, and informational purpose of the application data to understand the content's communicative intent and knowledge requirements. The semantic analysis may identify technical terminology, abstract concepts, prerequisite knowledge assumptions, and contextual references that affect user comprehension and accessibility accommodation needs.

Complexity analysis of the application data may evaluate vocabulary difficulty, sentence structure sophistication, information density, and cognitive processing demands associated with the textual and audiovisual content. The complexity assessment may measure reading level requirements, conceptual abstraction levels, multitasking demands, and attention span requirements that determine appropriate simplification or enhancement strategies for users with different disability types. Complexity analysis may consider factors including word frequency, sentence length, paragraph organization, and conceptual hierarchy that influence user comprehension effectiveness and accessibility accommodation requirements.

Structure analysis of the application data may examine organizational patterns, information hierarchy, presentation flow, and logical relationships within textual and audiovisual content to identify opportunities for accessibility enhancement and user accommodation. The structure analysis may evaluate content organization, navigation pathways, information sequencing, and presentation coherence that affect user ability to process and understand the application data effectively. Structure assessment may identify areas where content reorganization, enhanced navigation, or alternative presentation methods may improve accessibility and user comprehension outcomes.

The modality modification system 160 may determine, based on comparing the semantic context of the application data, the complexity of the application data, or the structure of the application data with a parameter set associated with the user, a plurality of transformations for the application data that address specific accessibility needs and accommodation requirements. The parameter set associated with the user may include disability-specific accommodation parameters, user preference settings, accessibility requirement specifications, and performance optimization criteria that guide transformation selection and implementation strategies. The comparison process may evaluate the compatibility between application data characteristics and user capability parameters to identify transformation needs and optimization opportunities.

Semantic context comparison may analyze the relationship between content meaning and user knowledge background, comprehension capabilities, and contextual understanding requirements to determine when explanatory transformations, definitional enhancements, or contextual clarifications are needed. The comparison process may identify when semantic complexity exceeds user processing capabilities or when content assumptions require additional background information to ensure effective comprehension. Semantic context evaluation may trigger transformations including glossary generation, contextual explanation insertion, or conceptual simplification that bridge knowledge gaps and enhance user understanding.

Complexity comparison may evaluate the relationship between application data processing demands and user cognitive capabilities, attention span limitations, and comprehension efficiency requirements to determine appropriate simplification or enhancement transformations. The comparison process may identify when vocabulary complexity, sentence structure sophistication, or information density exceeds user comfort levels and requires reduction or alternative presentation methods. Complexity assessment may trigger transformations including vocabulary simplification, sentence restructuring, content segmentation, or alternative format generation that optimize content accessibility for individual user capabilities.

Structure comparison may analyze the relationship between application data organization and user navigation preferences, information processing patterns, and accessibility accommodation needs to determine structural transformation requirements. The comparison process may identify when content organization, presentation flow, or information hierarchy creates barriers for users with specific disability types and requires restructuring or enhancement. Structure evaluation may trigger transformations including content reorganization, navigation enhancement, presentation flow modification, or accessibility feature integration that improve user interaction effectiveness and comprehension outcomes.

The plurality of transformations for the application data may include content simplification transformations that reduce vocabulary complexity, shorten sentence structures, and decrease information density to accommodate users with reading difficulties or cognitive processing limitations. Content enhancement transformations may add explanatory material, contextual definitions, visual aids, or supplementary information that support user comprehension and accessibility needs. Presentation format transformations may convert content between different modalities including text-to-audio conversion, visual-to-textual description generation, or multimedia content adaptation that accommodates different sensory processing capabilities and user preferences.

Accessibility compliance transformations may implement color adjustments for color vision deficiencies, font modifications for reading pattern differences, interface simplifications for attention regulation challenges, or interaction method adaptations for motor control limitations. The transformation selection process may prioritize modifications that provide the greatest accessibility benefit while preserving content accuracy and semantic meaning throughout the adaptation process. The plurality of transformations may be applied simultaneously or sequentially based on user needs, content characteristics, and system performance considerations to optimize accessibility accommodation effectiveness.

The modality modification system 160 may execute the plurality of transformations to generate modified application data, where the modified application data may be delivered using the one or more output modalities associated with the one or more disabilities of the user. The transformation execution process may implement content modifications, presentation adaptations, and accessibility enhancements while maintaining semantic accuracy and information completeness throughout the modification operations. The execution process may coordinate multiple transformation algorithms simultaneously to ensure consistent and comprehensive accessibility accommodation across all content elements and presentation modalities.

Modified application data generation may produce adapted textual content with simplified vocabulary, enhanced readability, and improved organization that accommodates reading pattern differences and cognitive processing variations. The modified audiovisual data may include enhanced audio descriptions, visual overlay additions, caption improvements, or presentation timing adjustments that accommodate sensory processing differences and attention regulation needs. The modification process may preserve original content meaning while optimizing presentation format, interaction methods, and accessibility features for individual user requirements and disability accommodations.

The one or more output modalities associated with the one or more disabilities of the user may include visual presentation adaptations with color adjustments, font modifications, and contrast enhancements for users with color vision deficiencies or visual processing differences. Audio output modalities may provide enhanced narration, speech synthesis customization, and sound-based feedback that accommodate users with visual limitations or reading difficulties. Haptic output modalities may deliver tactile feedback, vibration patterns, or force feedback that support users with sensory processing variations or attention regulation needs.

Output modality selection may consider user disability types, accommodation effectiveness data, and real-time physiological feedback to determine optimal presentation methods for the modified application data. The delivery process may utilize multiple output modalities simultaneously to provide comprehensive accessibility support that addresses various aspects of user disability accommodations and interaction preferences. The output modality implementation may include real-time adaptation capabilities that adjust presentation characteristics based on ongoing user feedback and physiological monitoring data to maintain optimal accessibility accommodation effectiveness.

The modality modification system 160 may transmit the modified application data and the one or more output modalities to the device of the user through secure communication channels that preserve accessibility adaptations and user accommodation settings during data transfer. The transmission process may utilize optimized delivery protocols that maintain content quality, accessibility features, and presentation timing while minimizing bandwidth requirements and ensuring consistent user experience across different network conditions. The transmission may include metadata, configuration parameters, and presentation instructions that enable the user device to render the modified application data with appropriate accessibility accommodations and output modality implementations.

Modified application data transmission may include compressed content formats, streaming delivery options, and progressive loading capabilities that ensure timely availability of accessibility accommodations while managing system performance and network resource utilization. The transmission process may implement error correction, data integrity verification, and delivery confirmation mechanisms that ensure reliable transfer of accessibility adaptations and user accommodation features. The one or more output modalities may be transmitted with configuration specifications, hardware activation commands, and presentation parameters that enable the user device to implement appropriate accessibility accommodations and interaction method adaptations.

The modality modification system 160 may receive, from the device of the user, real-time metrics and feedback parameters associated with presenting the modified application data to the user to enable continuous monitoring and optimization of accessibility accommodation effectiveness. Real-time metrics may include user interaction quality measurements, task completion success rates, error frequency analysis, and engagement level indicators that reflect the effectiveness of applied accessibility transformations and accommodation strategies. The metrics collection may provide quantitative assessment of user performance improvements, comprehension enhancement, and interaction efficiency gains achieved through the modified application data and output modality implementations.

Feedback parameters may include user satisfaction indicators, accommodation preference updates, accessibility requirement changes, and performance optimization suggestions that inform future transformation strategies and accommodation refinements. The feedback collection may utilize physiological monitoring data, behavioral pattern analysis, and user interaction assessment to generate comprehensive feedback about accommodation effectiveness and user experience quality. Real-time feedback processing may enable dynamic adjustment of transformation parameters, output modality configurations, and accessibility accommodation strategies to maintain optimal user experience and accommodation effectiveness throughout extended interaction sessions.

The real-time metrics and feedback parameters may inform machine learning model training processes that improve transformation accuracy, accommodation effectiveness, and user experience optimization for future content adaptation operations. The feedback analysis may identify successful transformation strategies, accommodation preferences, and optimization opportunities that enhance the system's ability to provide effective accessibility support for users with similar disability types and accommodation needs. The continuous feedback loop may enable the modality modification system 160 to refine transformation algorithms, improve accommodation strategies, and enhance user experience quality through ongoing learning and adaptation based on user interaction outcomes and satisfaction indicators.

The artificial intelligence agent may generate the user interface that modifies the application data according to the one or more output modalities through comprehensive interface generation algorithms that create personalized accessibility accommodations and content adaptations based on detected disability types and user requirements. The user interface generation process may analyze the relationships between application data characteristics and output modality specifications to produce interface modifications that optimize content presentation, interaction methods, and accessibility features for individual users. The artificial intelligence agent may implement dynamic interface generation capabilities that create customized user interfaces while preserving application functionality and maintaining semantic accuracy of the original application data.

User interface generation may involve analyzing application data structure, content organization, and presentation requirements to determine appropriate modification strategies that accommodate detected disabilities through the specified output modalities. The artificial intelligence agent may process disability-specific accommodation parameters, user preference settings, and accessibility requirement specifications to generate interface modifications that address color vision deficiencies, reading pattern differences, attention regulation challenges, or motor control limitations. The generation process may create interface adaptations including color palette adjustments, typography modifications, layout simplifications, or interaction method enhancements that optimize user experience while maintaining application data integrity.

The artificial intelligence agent may implement interface modification algorithms that transform visual elements, interactive components, and content presentation methods according to output modality specifications while ensuring consistent functionality across adapted interface versions. The user interface generation may include cascading style sheet modifications, interactive element adjustments, content restructuring operations, and accessibility feature implementations that provide comprehensive accommodation for detected disability types. The generation process may coordinate multiple modification strategies simultaneously to ensure cohesive interface adaptations that address various aspects of user accessibility needs through integrated output modality implementations.

Interface generation may utilize template-based adaptation approaches that apply proven accessibility accommodation patterns while customizing specific modifications based on individual user requirements and detected disability characteristics. The artificial intelligence agent may maintain libraries of interface modification templates, accessibility accommodation strategies, and output modality implementation patterns that enable efficient generation of personalized user interfaces. The template-based approach may ensure consistency in accessibility accommodations while allowing customization based on specific user needs, application requirements, and output modality capabilities.

The modality modification system may retrieve a plurality of parameters associated with the plurality of disabilities, where the plurality of parameters may be used to determine whether a particular user interface complies with the one or more disabilities through comprehensive compliance assessment and verification processes. The parameter retrieval process may access disability-specific compliance criteria, accessibility standard requirements, and accommodation effectiveness metrics that define the characteristics and features required for user interfaces to provide appropriate accessibility support for different disability types. The plurality of parameters may encompass technical specifications, design requirements, interaction standards, and performance criteria that ensure user interface modifications meet or exceed accessibility compliance standards.

Disability-associated parameters may include color contrast ratio requirements for users with color vision deficiencies, font size and spacing specifications for users with reading pattern differences, interface simplification criteria for users with attention regulation challenges, and interaction element sizing requirements for users with motor control limitations. The parameter retrieval may access regulatory compliance standards including Americans with Disabilities Act requirements, Web Content Accessibility Guidelines specifications, and Section 508 compliance criteria that define minimum accessibility standards for digital interfaces and content presentations. The parameters may also include user-specific accommodation effectiveness metrics that reflect individual user needs and preference requirements beyond standard compliance minimums.

Parameter retrieval may involve accessing centralized compliance databases, accessibility standard repositories, and disability accommodation guidelines that maintain current requirements and best practices for user interface accessibility compliance. The retrieval process may gather parameters related to visual accessibility including color blindness accommodation requirements, contrast ratio specifications, and visual element sizing standards that ensure appropriate visual presentation for users with various types of visual processing differences. Audio accessibility parameters may include volume level requirements, frequency response specifications, and audio description standards that ensure appropriate auditory presentation for users with hearing differences or audio processing needs.

Interaction accessibility parameters may encompass keyboard navigation requirements, touch target sizing specifications, gesture recognition standards, and alternative input method support criteria that ensure appropriate interaction capabilities for users with motor control variations or alternative interaction preferences. The parameter retrieval may also access cognitive accessibility requirements including content complexity limitations, attention span considerations, and comprehension support standards that ensure appropriate cognitive accommodation for users with attention regulation challenges or processing differences. The retrieved parameters may provide comprehensive criteria for evaluating user interface compliance across multiple accessibility domains and disability types.

The modality modification system may input, into a generative model associated with the artificial intelligence agent, the user interface and the plurality of parameters to obtain a response indicating whether the user interface complies with the one or more disabilities through automated compliance verification and assessment processes. The generative model may analyze the generated user interface against the retrieved disability-associated parameters to determine compliance status, identify potential accessibility barriers, and generate recommendations for interface improvements when compliance gaps are detected. The compliance assessment process may evaluate multiple aspects of user interface design including visual presentation, interaction methods, content organization, and accessibility feature implementation.

The generative model may process user interface specifications including color schemes, typography selections, layout configurations, and interactive element properties against disability-specific compliance parameters to identify areas where interface modifications meet or exceed accessibility requirements. The model may analyze color contrast ratios against color vision deficiency requirements, evaluate font selections and spacing against reading pattern accommodation standards, and assess interface complexity against attention regulation support criteria. The compliance analysis may generate detailed assessment reports that identify specific compliance achievements and highlight areas requiring additional modification or enhancement.

Compliance response generation may include binary compliance indicators that specify whether the user interface meets minimum accessibility standards for detected disability types, along with detailed compliance scores that quantify the level of accessibility support provided by interface modifications. The generative model may produce compliance recommendations that suggest specific interface improvements, accessibility feature additions, or modification refinements that would enhance compliance status and user accommodation effectiveness. The response may include prioritized improvement suggestions that address the most significant compliance gaps while considering implementation complexity and user impact factors.

The generative model may implement continuous compliance monitoring capabilities that reassess user interface compliance as modifications are applied, user requirements evolve, or accessibility standards are updated. The compliance verification process may maintain audit trails that document compliance assessment results, modification recommendations, and improvement implementation status to support regulatory compliance reporting and accessibility program management. The generative model may also provide compliance prediction capabilities that anticipate potential compliance issues before interface deployment and suggest proactive modifications that prevent accessibility barriers.

The modality modification system may generate a user profile comprising the one or more output modalities and one or more input modalities through comprehensive profile creation algorithms that consolidate accessibility accommodation settings, user preference parameters, and interaction method specifications into persistent user configuration data. The user profile generation process may analyze detected disability types, accommodation effectiveness data, and user interaction patterns to create comprehensive profiles that capture individual accessibility needs and optimization requirements. The user profile may serve as a centralized repository for accessibility accommodation settings that can be applied consistently across multiple applications and interaction contexts.

User profile generation may involve consolidating disability detection results, accommodation preference settings, and interaction method effectiveness data into structured profile formats that enable efficient retrieval and application of personalized accessibility accommodations. The profile creation process may organize user-specific parameters including visual accommodation settings, auditory preference configurations, interaction method selections, and content presentation optimizations into coherent profile structures. The user profile may include metadata about accommodation effectiveness, user satisfaction levels, and preference evolution patterns that inform future accommodation refinements and optimization strategies.

The one or more output modalities within the user profile may comprise one or more of input mode parameter, input complexity parameter, audio input parameter, or video input parameter that define the characteristics and configuration requirements for personalized content presentation and accessibility accommodation. An input mode parameter within the output modalities may specify the preferred presentation format for content delivery including visual presentation preferences, audio narration settings, haptic feedback configurations, or multi-modal presentation combinations that optimize content accessibility for individual users. The input mode parameter may define activation procedures, sensitivity settings, and customization options that ensure optimal output method performance for specific user capabilities and accessibility requirements.

An input complexity parameter within the output modalities may indicate the appropriate level of content complexity and information density that matches user cognitive processing capabilities, attention management abilities, and comprehension efficiency requirements. The input complexity parameter may specify content simplification levels, information organization preferences, and presentation pacing requirements that optimize content accessibility while maintaining information completeness and semantic accuracy. The parameter may guide content transformation algorithms that balance information richness with cognitive accessibility to ensure effective user comprehension across different disability types and processing capabilities.

An audio input parameter within the output modalities may define voice synthesis characteristics, speech presentation settings, and auditory content optimization requirements that enhance audio-based content delivery for users with various accessibility needs. The audio input parameter may specify voice characteristics including gender selection, age characteristics, accent preferences, speech speed ranging from 0.5× to 2.0× normal rate, pitch adjustments, and volume settings that optimize auditory content presentation. The parameter may include audio enhancement features such as background noise reduction, speech clarity optimization, and frequency response adjustments that improve audio accessibility for users with hearing differences or auditory processing variations.

A video input parameter within the output modalities may specify visual content presentation settings including frame rate preferences, resolution requirements, color enhancement configurations, and motion sensitivity adjustments that optimize video content accessibility for users with visual processing differences. The video input parameter may define caption display preferences, audio description settings, visual overlay configurations, and contrast enhancement requirements that ensure comprehensive video content accessibility. The parameter may include motion reduction options, seizure prevention settings, and visual attention guidance features that accommodate users with motion sensitivity conditions or attention regulation challenges.

The one or more input modalities within the user profile may comprise one or more of the input mode parameter, the input complexity parameter, the audio input parameter, or the video input parameter that define user interaction method preferences, accessibility accommodation requirements, and input method optimization settings. The input modalities may specify the preferred interaction methods for data entry, command input, and system control including voice input preferences, touch interaction settings, keyboard input configurations, or gesture recognition parameters that optimize user interaction effectiveness. The input modality specifications may include sensitivity settings, customization options, and accessibility accommodations that ensure reliable and accessible interaction capabilities for users with different disability types.

Input mode parameters within the input modalities may define primary interaction method preferences such as voice input, touch input, gesture input, or keyboard input that provide optimal accessibility and usability for detected disability types. The input mode parameter may specify activation procedures, response sensitivity, error correction settings, and feedback mechanisms that optimize input method performance for individual user capabilities and accessibility requirements. The parameter may include alternative input method specifications that provide backup interaction options when primary input methods are unavailable or inappropriate for specific contexts or tasks.

Input complexity parameters within the input modalities may indicate the appropriate level of input interface complexity and interaction sophistication that matches user cognitive processing capabilities and motor control abilities. The input complexity parameter may specify simplified input interfaces for users with cognitive processing challenges, streamlined interaction workflows for users with attention difficulties, or enhanced input validation and error correction features for users who may experience input accuracy challenges. The parameter may guide input interface generation algorithms that balance functionality with accessibility to ensure effective user interaction across different disability types and capability levels.

Audio input parameters within the input modalities may define voice recognition settings, speech processing configurations, and audio input quality requirements that optimize voice-based input methods for users with various accessibility needs and communication preferences. The audio input parameter may specify noise cancellation levels, speech recognition sensitivity, voice command vocabulary, and audio feedback characteristics that enhance voice input effectiveness for users with motor control limitations, visual processing difficulties, or text input challenges. The parameter may include speaker verification settings, accent adaptation options, and speech rate accommodation features that improve voice input accessibility and accuracy across diverse user populations.

Video input parameters within the input modalities may specify camera-based input configurations including gesture recognition settings, eye tracking calibration, facial expression analysis, and motion detection parameters that enable visual input methods for users with alternative interaction needs or preferences. The video input parameter may define gesture vocabulary, recognition sensitivity, lighting adaptation, and movement tracking accuracy requirements that optimize camera-based input methods for users with motor control variations or alternative interaction preferences. The parameter may include privacy protection settings, data processing options, and user consent management features that ensure secure and appropriate use of video-based input modalities while maintaining user privacy and data protection standards.

User profile generation may implement profile versioning capabilities that track accommodation preference evolution, effectiveness changes, and user requirement modifications over time to maintain current and accurate accessibility accommodation settings. The profile management system may enable users to review, modify, or update their accessibility accommodation preferences while maintaining historical data about accommodation effectiveness and user satisfaction outcomes. The user profile may include synchronization capabilities that maintain consistent accessibility accommodations across multiple devices, applications, and interaction contexts while preserving user privacy and data security throughout the profile management process.

Profile security and privacy protection mechanisms may ensure that user disability information, accommodation preferences, and interaction data remain protected while enabling effective accessibility support across multiple applications and platforms. The user profile generation may implement data encryption, access control, and privacy-preserving analysis techniques that protect sensitive user information while maintaining the functionality needed for comprehensive accessibility accommodation. The profile management system may enable users to control data sharing, accommodation visibility, and privacy settings while ensuring that accessibility accommodations remain effective and consistently applied across their interaction experiences.

The flowchart in FIG. 14 illustrates process 1400 for identifying accessibility needs and modifying user interface and application data. Each operation in the process may be implemented using various computing components and machine learning architectures described in the referenced figures.

Operation 1402 involves receiving a request for application data from a user device by an artificial intelligence agent. This operation may be performed by processors 610a-610n shown in FIG. 6, which execute program instructions 670 stored in system memory 620 to handle incoming requests through network interface 640. The request processing may utilize the input/output device interface 630 to manage communication with client devices. The artificial intelligence agent may implement the machine learning model 702 architecture shown in FIG. 7 and/or the transformer of FIG. 8 to process and understand the incoming request parameters and user context information.

Operation 1404 encompasses determining that the user is associated with one or more disabilities through behavioral analysis and pattern recognition. This operation may be executed by the computing system 600 of FIG. 6, where processors 610a-610n analyze user interaction data stored as data 680 in system memory 620. The disability detection process may utilize the machine learning model 702 from FIG. 7, which processes user behavioral patterns as input 704 and generates disability classification results as output 706. The transformer 812 architecture depicted in FIG. 8 may support this analysis through encoder 808, which processes user interaction tokens 802 converted to embeddings 806 via embedding matrix 804 to generate feature vectors 814 that represent user behavioral characteristics and accessibility indicators.

Operation 1406 involves retrieving application data and one or more output modalities associated with the detected disabilities from storage systems. This operation may be implemented using the computing system 600 of FIG. 6, where processors 610a-610n access application data and accessibility parameters stored as data 680 in system memory 620. The retrieval process may involve database queries and file system operations coordinated through I/O interface 650 to gather both application content and disability-specific accommodation settings from distributed storage locations. The machine learning model 702 from FIG. 7 may assist in selecting appropriate output modalities by processing disability classifications as input 704 and generating accommodation recommendations as output 706.

Operation 1408 involves inputting the application data and output modalities into a generative machine learning model to obtain instructions for generating an accessible user interface. This operation may be implemented using the machine learning model 702 architecture shown in FIG. 7, where the application data and accessibility parameters serve as input 704 to generate interface modification instructions as output 706. The generative machine learning model may utilize the transformer 812 architecture depicted in FIG. 8, where the input data is first tokenized into tokens 802, converted to embeddings 806 through embedding matrix 804, and processed by encoder 808 to generate feature vectors 814. The decoder 810 processes these feature vectors 814 to generate output tokens 816 that specify the required accessibility accommodations and interface modifications for the detected disabilities.

Operation 1410 involves causing the user device to display the accessible user interface generated based on the instructions from the generative machine learning model. This operation may be performed through network interface 640 shown in FIG. 6, which handles the data transmission protocols and network communication to deliver the modified interface to the user device. The computing system 600 may utilize I/O interface 650 to coordinate the delivery of the accessible interface while maintaining data integrity and accessibility compliance throughout the transmission process. The processors 610a-610n execute the final rendering and display coordination operations using program instructions 670 stored in system memory 620 to ensure that the accessibility accommodations are properly implemented on the user device.

The modality modification system may implement coordinated subsystem interactions that enable seamless processing of user requests across distributed client environments while maintaining consistent accessibility accommodations and personalized interface adaptations. The communication subsystem may establish and maintain bidirectional communication channels with multiple clients simultaneously, managing data transmission protocols and ensuring reliable message delivery across diverse network conditions and client device capabilities. The communication subsystem may implement load balancing algorithms that distribute client requests across available processing resources while maintaining response time consistency and system performance standards.

Request processing coordination between the communication subsystem and modality retrieval subsystem may enable efficient data gathering operations that collect both user preference parameters and application content from distributed storage systems while client requests are being analyzed and categorized. The communication subsystem may implement request queuing mechanisms that organize incoming client requests based on priority levels, complexity requirements, and processing resource availability to optimize system throughput and response time performance. The modality retrieval subsystem may operate in parallel with request processing to pre-fetch commonly requested user parameters and application data, reducing overall response latency for subsequent client interactions.

The modality determination subsystem may coordinate with both the communication subsystem and modality retrieval subsystem to analyze collected data and generate appropriate content transformation strategies based on detected user accessibility needs and preference settings. The modality determination subsystem may implement decision algorithms that evaluate multiple factors including user disability types, content complexity levels, device capabilities, and environmental context to select optimal adaptation strategies for individual client requests. The coordination process may involve real-time data sharing between subsystems to ensure that transformation decisions reflect current user status, preference updates, and system performance conditions.

Client interaction management across multiple simultaneous sessions may require sophisticated coordination between all subsystems to maintain personalized service delivery while optimizing system resource utilization and performance consistency. The communication subsystem may implement session management protocols that track individual client states, maintain conversation context, and coordinate data flow between clients and processing subsystems throughout extended interaction sessions. The modality retrieval subsystem may implement caching strategies that store frequently accessed user parameters and application data to reduce database query overhead and improve response times for multiple concurrent client sessions.

Network communication optimization may involve adaptive protocols that adjust data transmission characteristics based on network conditions, client device capabilities, and content complexity requirements to ensure consistent service delivery across diverse client environments. The communication subsystem may implement compression algorithms, streaming protocols, and progressive loading techniques that optimize bandwidth utilization while maintaining content quality and accessibility feature integrity during transmission to client devices. The network interface may support multiple communication protocols simultaneously to accommodate different client device types and network connectivity options while maintaining security and data protection standards.

The modality determination subsystem may coordinate transformation strategy selection with real-time performance monitoring to ensure that selected adaptations can be implemented within acceptable response time limits while maintaining quality standards and accessibility compliance. The subsystem coordination may involve dynamic resource allocation that adjusts processing priorities based on client request complexity, transformation requirements, and system load conditions to maintain consistent service quality across all active client sessions. The modality determination subsystem may implement fallback strategies that provide alternative adaptation approaches when primary transformation methods exceed processing time limits or encounter resource constraints.

Data synchronization between subsystems may ensure that user preference updates, application data changes, and system configuration modifications are propagated consistently across all processing components to maintain coherent service delivery and avoid conflicts between concurrent operations. The modality retrieval subsystem may implement change notification mechanisms that alert other subsystems when user parameters or application data are updated, enabling real-time adaptation of ongoing processing operations and ensuring that all client interactions reflect current system state. The communication subsystem may coordinate data synchronization timing to minimize disruption to active client sessions while ensuring that all subsystems operate with consistent and current information.

The user interaction layer may implement comprehensive data collection capabilities that gather behavioral indicators, physiological measurements, and interaction patterns from multiple input sources simultaneously while maintaining user privacy and data protection standards. The user interaction layer may coordinate with the communication subsystem to receive real-time sensor data, user input events, and environmental context information from client devices while managing data transmission security and user consent requirements. The layer may implement data fusion algorithms that combine information from eye tracking systems, voice input analysis, touch pattern monitoring, and behavioral observation to create comprehensive user state assessments.

Data flow coordination between the user interaction layer and core processing engine may enable real-time analysis of collected user data to generate immediate accessibility accommodation decisions and content transformation strategies. The user interaction layer may implement data preprocessing operations that filter, normalize, and structure collected information before transmission to the core processing engine, reducing processing overhead and improving analysis accuracy. The coordination process may involve temporal synchronization that aligns data from different input sources to enable accurate correlation analysis and behavioral pattern recognition across multiple sensing modalities.

The core processing engine may coordinate multiple parallel processing streams that simultaneously analyze user behavioral data, assess content complexity, detect accessibility needs, and generate transformation strategies while maintaining processing efficiency and response time performance. The multi-modal processing engine within the core processing engine may implement distributed analysis algorithms that process text, audio, visual, and video content streams in parallel while maintaining semantic coherence and contextual relationships across different content types. The comprehension analysis system may coordinate with accessibility detection algorithms to correlate user behavioral indicators with specific disability types and accommodation requirements.

Processing coordination within the core processing engine may involve dynamic load balancing that distributes computational tasks across available processing resources based on analysis complexity, time constraints, and quality requirements to optimize system performance and response consistency. The content transformation component may coordinate with other processing subsystems to ensure that generated modifications preserve semantic meaning while implementing required accessibility accommodations and user preference adaptations. The core processing engine may implement quality assurance processes that verify transformation accuracy and accessibility compliance before forwarding results to subsequent processing layers.

The data profile management layer may coordinate with the core processing engine to maintain persistent user profiles that reflect current accessibility needs, preference settings, and accommodation effectiveness data while supporting real-time updates and cross-device synchronization. The universal user profile management system may implement data consistency protocols that ensure user preference updates are propagated across all active sessions and processing components without disrupting ongoing operations. The machine learning models within the data profile management layer may coordinate with processing algorithms to continuously refine user profiles based on interaction outcomes and accommodation effectiveness measurements.

Profile synchronization coordination may involve encrypted data transmission and secure storage protocols that protect user privacy while enabling effective accessibility accommodation across multiple applications and interaction contexts. The data profile management layer may coordinate with the communication subsystem to manage user authentication, profile access control, and data sharing permissions while maintaining security standards and regulatory compliance requirements. The analytics and feedback capabilities may coordinate with other system components to collect performance metrics, user satisfaction indicators, and system effectiveness measurements for continuous improvement and optimization.

ADA compliance rule enforcement within the data profile management layer may coordinate with transformation processes to ensure that all generated accommodations meet or exceed accessibility standards while maintaining user experience quality and system performance requirements. The compliance coordination may involve real-time verification algorithms that assess transformation results against regulatory requirements and generate corrective actions when compliance gaps are detected. The data profile management layer may maintain compliance audit trails that document accommodation decisions, verification results, and remediation actions to support regulatory reporting and accessibility program management.

The adaptive output layer may coordinate with all preceding processing layers to implement comprehensive content delivery that combines visual, auditory, haptic, and interactive presentation methods based on user accessibility needs and preference settings. The adaptive output layer may implement multi-modal rendering algorithms that generate synchronized presentations across different output channels while maintaining content coherence and user experience consistency. The layer may coordinate with the communication subsystem to optimize content delivery based on client device capabilities, network conditions, and user context requirements.

Output modality coordination within the adaptive output layer may involve dynamic selection and configuration of presentation methods based on real-time user feedback, environmental conditions, and accessibility accommodation effectiveness measurements. The voice synthesis capabilities may coordinate with visual display systems to provide synchronized multi-modal presentations that enhance user comprehension and accessibility accommodation effectiveness. The haptic feedback mechanisms may coordinate with audio and visual outputs to create comprehensive sensory experiences that accommodate users with diverse accessibility needs and sensory processing capabilities.

Content delivery optimization within the adaptive output layer may coordinate with network transmission protocols to ensure that accessibility accommodations are preserved during content transfer while minimizing bandwidth requirements and maintaining presentation quality. The adaptive output layer may implement progressive enhancement strategies that deliver basic accessibility accommodations immediately while continuing to apply advanced transformations and enhancements in the background. The layer may coordinate with client device capabilities to optimize presentation methods based on available hardware, software features, and user interaction preferences.

The feedback loop may implement comprehensive monitoring and assessment capabilities that track user interaction quality, accommodation effectiveness, and system performance across all processing layers while maintaining user privacy and data protection standards. The feedback loop may coordinate data collection from the adaptive output layer, user interaction monitoring from client devices, and performance metrics from all processing subsystems to generate comprehensive system effectiveness assessments. The feedback coordination may involve real-time analysis algorithms that identify optimization opportunities, accommodation refinements, and system improvements based on collected performance data.

Continuous improvement coordination through the feedback loop may enable dynamic adjustment of processing algorithms, accommodation strategies, and user interface adaptations based on measured effectiveness and user satisfaction outcomes. The feedback loop may coordinate with machine learning models throughout the system to provide training data, performance validation, and optimization guidance that improves system capabilities over time. The coordination process may involve automated parameter adjustment, algorithm refinement, and accommodation strategy optimization that enhances system effectiveness without requiring manual intervention or configuration changes.

System-wide coordination through the feedback loop may ensure that improvements and optimizations identified in one processing component are propagated appropriately to related subsystems and processing layers to maximize overall system effectiveness and user experience quality. The feedback loop may implement change management protocols that coordinate system updates, algorithm modifications, and accommodation strategy refinements across all processing components while maintaining service continuity and user experience consistency. The coordination may involve staged deployment of improvements, performance validation, and rollback capabilities that ensure system stability and reliability throughout continuous improvement processes.

Multi-modal adaptation achievement through coordinated layer operation may enable comprehensive accessibility accommodation that addresses visual, auditory, cognitive, and motor accessibility needs simultaneously while maintaining content accuracy and user experience quality. The coordinated operation may involve synchronized processing across all layers that ensures accessibility accommodations are consistent, complementary, and optimized for individual user needs and capabilities. The system integration may enable seamless transitions between different accommodation strategies, presentation modalities, and interaction methods based on changing user needs, environmental conditions, and task requirements while maintaining service continuity and user experience consistency.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

A number of implementations have been described. Nevertheless, it will be understood that various modifications may be made without departing from the spirit and scope of the disclosure. Accordingly, other implementations are within the scope of the following claims.

1. An embodiment comprising: receiving, from a user device associated with a user, a request for application data, wherein the application data is delivered using a user interface, the application data comprising one or more of textual data, image data, video data, or audio data; retrieving a plurality ofuser interface parameters and the application data, wherein the application data is retrieved from one or more applications and the plurality of user interface parameters is retrieved from a user repository, and wherein the plurality of user interface parameters comprises one or more of delivery mode parameter, data complexity parameter, audio preference parameter, or video preference parameter; inputting the application data and the user interface comprising user interface code into a generative machine learning model with a modification command to modify the user interface code and the application data using the plurality of user interface parameters, wherein the plurality of user interface parameters is input into the generative machine learning model for modifying the user interface code and the application data; receiving, from the generative machine learning model, modification data for the application data and the user interface code, the modification data uniquely generated by the generative machine learning model for the user based on the plurality of user interface parameters; modifying the application data and the user interface code using the modification data to generate modified application data and a modified user interface; and transmitting, to the user device, the modified application data with the modified user interface.

2. The method of any proceeding embodiments, further comprising: determining using the generative machine learning model and based on one or more of facial expression, eye tracking, or interaction patterns, that a complexity level associated with the application data and the user interface is improper for the user; inputting, as a parameter of the plurality of user interface parameters, a user complexity level into the generative machine learning model to receive alternative application data and an alternative user interface; and receiving from the generative machine learning model the alternative application data, wherein the alternative application data is the application data modified to lower the complexity level of the application data.

3. The method of any proceeding embodiments, further comprising: based on determining, using the generative machine learning model that the complexity level of the application data is improper, splitting the application data according to placement of the application data within the user interface into a plurality of application data segments; inputting the plurality of application data segments into the generative machine learning model with a command to generate a corresponding explanation for each data segment of the plurality of application data segments, each explanation corresponding to the user complexity level; receiving, from the generative machine learning model, the corresponding explanation for each data segment; and adding each corresponding explanation to the modified user interface according to the placement of each corresponding data segment of the plurality of application data segments.

4. The method of any proceeding embodiments, further comprising: based on determining, using the generative machine learning model that the complexity level of the application data is improper, splitting the application data based on context of the application data into a plurality of application data segments; inputting the plurality of application data segments into the generative machine learning model with a command to generate a corresponding explanation for each data segment of the plurality of application data segments, each explanation corresponding to the user complexity level; and generating, for each corresponding explanation, an audio segment to be added to the modified user interface according.

5. The method of any proceeding embodiments, further comprising: determining that the modification data indicates that video file parameters of a video file within the application data do not match the plurality of user interface parameters; identifying an alternative video file having the video file parameters matching the plurality of user interface parameters; and replacing the video file with the alternative video file.

6. The method of any proceeding embodiments, further comprising: determining that the modification data indicates that video file parameters of a video file within the application data do not match the plurality of user interface parameters; identifying portions of the video file that do not match the plurality of user interface parameters; and modifying the portions of the video file that do not match the plurality of user interface parameters.

7. The method of any proceeding embodiments, further comprising: determining using the generative machine learning model and based on one or more of facial expression, eye tracking, or interaction patterns, that the user interface is not optimal for the user; and generating for display to the user a prompt as to whether to change the user interface, wherein the prompt indicates one or more causes for the user interface not to be optimal for the user.

8. The method of any proceeding embodiments, wherein the user repository receives the plurality of user interface parameters from an artificial intelligence agent that corresponds to the user, and wherein the artificial intelligence agent is associated with a corresponding computer-executable operation set configured to be autonomously executed by the artificial intelligence agent on a software application set.

9. An embodiment comprising: receiving, by an artificial intelligence agent from a user device associated with a user, a request associated with an application comprising a component residing on the user device, wherein the request has been input using an initial input modality of the user device, and wherein the artificial intelligence agent is associated with a corresponding computer-executable operation set configured to be autonomously executed by the artificial intelligence agent on a software application set; determining that the request requires additional user data to complete, wherein the additional user data is input by the user using the user device; determining a security level associated with the additional user data, wherein the security level indicates a sensitivity level associated with the additional user data; determining whether the initial input modality matches the security level associated with the additional user data; based on determining that the initial input modality does not match the security level associated with the additional user data, selecting, based on the security level associated with the additional user data, an alternate input modality based on available input modalities for the user device; generating one or more instructions for generating an input interface according to the alternate input modality, wherein the input interface enables the user to input the additional user data via the alternate input modality; and providing the one or more instructions to the user device, wherein the user device generates the input interface and enables input of the additional user data via the input interface.

10. The method of any proceeding embodiments, wherein the alternate input modality comprises one of a voice input, a gesture input, a touch input, a key-press input, or a biometric input.

11. The method of any proceeding embodiments, wherein determining the security level associated with the additional user data further comprises: determining that the additional user data will comprise authentication data for authenticating with the application; and based on determining that the additional user data will comprise the authentication data, setting the security level to a metric not compatible with the initial input modality.

12. The method of any proceeding embodiments, wherein determining the security level associated with the additional user data further comprises: determining that the additional user data will comprise account identification data for accessing an account associated with the user; and based on determining that the additional user data will comprise the account identification data, assigning a high security level as the security level, wherein the high security level indicates that a high security modality is required.

13. The method of any proceeding embodiments, wherein determining whether the initial input modality matches a privacy setting for inputting authentication data further comprises: determining a location parameter and a movement parameter associated with a location of the user device; determining audio characteristics of the location of the user device; generating a security metric associated with the location of the user device; and determining, based on the security metric and the privacy setting, whether the initial input modality matches the privacy setting.

14. The method of any proceeding embodiments, further comprising: receiving initial output data from the application; determining an initial output modality being used by the user device does not match an output security level associated with the initial output data; and selecting, based on the security level associated with the initial output data, an alternate output modality for displaying the initial output data.

15. The method of any proceeding embodiments, wherein selecting the alternate output modality for displaying the initial output data further comprises: determining a plurality of output modalities available to the user device, wherein the plurality of output modalities comprise an output media type and one or more output parameters associated with the output media type; and selecting the alternate output modality based on the output media type and the one or more output parameters.

16. The method of any proceeding embodiments, further comprising: determining that the request has been completed; and based on determining that the request has been completed, transmitting one or more commands to the user device to change the alternate input modality to the initial input modality and an alternate output modality to an initial output modality.

17. An embodiment comprising: receiving, from device associated with a user by an artificial intelligence agent, a request for application data, wherein the application data is delivered using a user interface, the application data comprising one or more of text data, image data, video data, or audio data, and wherein the artificial intelligence agent is associated with a corresponding computer-executable operation set configured to be autonomously executed by the artificial intelligence agent on a software application set; determining that the user is associated with one or more disabilities of a plurality of disabilities, wherein each disability is associated with a corresponding output modality; retrieving the application data and one or more output modalities associated with the one or more disabilities, wherein the application data is retrieved from one or more applications and wherein the one or more output modalities are associated with one or more of delivery mode parameter, data complexity parameter, audio preference parameter, or video preference parameter; inputting the application data and the one or more output modalities into a generative machine learning model to obtain a plurality of instructions for generating the user interface according to the one or more disabilities, wherein the plurality of instructions generates the user interface that modifies the application data according to the one or more output modalities; and causing the device of the user to display the user interface, wherein the user interface is generated based on the plurality of instructions.

18. The method of any proceeding embodiments, further comprising: determining that the one or more disabilities are associated with one or more input modalities; retrieving a plurality of device input modalities associated with the device of the user; and inputting the one or more input modalities and the plurality of device input modalities into the generative machine learning model to obtain one or more device commands for activating device component for enabling the one or more input modalities, wherein the one or more input modalities comprise one or more of input mode parameter, input complexity parameter, audio input parameter, or video input parameter.

19. The method of any proceeding embodiments, further comprising: receiving, in near-real time from the device of the user by the artificial intelligence agent, eye fixation metrics, saccade patterns, pupil response, and blink data; determining, using the artificial intelligence agent, one or more of reading patterns, confusion indicators, engagement metrics or cognitive load; and generating, based on one or more of the reading patterns, the confusion indicators, the engagement metrics or the cognitive load, the one or more output modalities for the one or more disabilities, wherein the one or more output modalities comprise content definitions for the application data, visual aids for the application data, simplified textual data for the application data, or examples of the application data.

20. The method of any proceeding embodiments, further comprising: receiving, using the artificial intelligence agent, the application data, a user context comprising a user disability profile, and real-time sensor data, wherein the application data comprises textual data and audiovisual data, and wherein the real-time sensor data comprises eye fixation metrics, saccade patterns, pupil response, and blink data; analyzing the application data to determine semantic context of the application data, complexity of the application data, or structure of the application data; determining, based on comparing the semantic context of the application data, the complexity of the application data, or the structure of the application data with a parameter set associated with the user, a plurality of transformations for the application data; and executing the plurality of transformations to generate modified application data, wherein the modified application data is delivered using the one or more output modalities associated with the one or more disabilities of the user.

21. The method of any proceeding embodiments, further comprising: transmitting the modified application data and the one or more output modalities to the device of the user; and receiving, from the device of the user, real-time metrics and feedback parameters associated with presenting the modified application data to the user.

22. The method of any proceeding embodiments, further comprising: generating, using the artificial intelligence agent, the user interface that modifies the application data according to the one or more output modalities; retrieving a plurality of parameters associated with the plurality of disabilities, wherein the plurality of parameters is used to determine whether a particular user interface complies with the one or more disabilities; and inputting, into a generative model associated with the artificial intelligence agent, the user interface and the plurality of parameters to obtain a response indicating whether the user interface complies with the one or more disabilities.

23. The method of any proceeding embodiments, further comprising: generating a user profile comprising the one or more output modalities and one or more input modalities, wherein the one or more output modalities comprise one or more of input mode parameter, input complexity parameter, audio input parameter, or video input parameter, and wherein the one or more input modalities comprise one or more of the input mode parameter, the input complexity parameter, the audio input parameter, or the video input parameter.

The invention claimed is:

1. One or more non-transitory computer-readable media storing instructions thereon for modifying input modalities, wherein the instructions cause one or more processors to:

receive, by an artificial intelligence agent from a user device associated with a user, a request associated with an application comprising a component residing on the user device, wherein the request has been input using an initial input modality of the user device, and wherein the artificial intelligence agent is associated with a corresponding computer-executable operation set configured to be autonomously executed by the artificial intelligence agent on a software application set;

determine that the request requires additional user data to complete, wherein the additional user data is input by the user using the user device, and wherein the additional user data will comprise authentication data for authenticating with the application;

determine a security level associated with the additional user data, wherein the security level indicates a sensitivity level associated with the additional user data;

based on the additional user data comprising the authentication data, set the security level to a metric not compatible with the initial input modality;

determine that the initial input modality does not match the security level associated with the additional user data;

based on determining that the initial input modality does not match the security level associated with the additional user data, select, based on the security level associated with the additional user data, an alternate input modality based on available input modalities for the user device;

generate one or more instructions for generating an input interface according to the alternate input modality, wherein the input interface enables the user to input the additional user data via the alternate input modality; and provide the one or more instructions to the user device, wherein the user device generates the input interface and enables input of the additional user data via the input interface.

2. The one or more non-transitory computer-readable media of claim 1, wherein the alternate input modality comprises one of a voice input, a gesture input, a touch input, a key-press input, or a biometric input.

3. The one or more non-transitory computer-readable media of claim 1, wherein the instructions further cause the one or more processors to:

receive initial output data from the application;

determine an initial output modality being used by the user device does not match an output security level associated with the initial output data; and select, based on the security level associated with the initial output data, an alternate output modality for displaying the initial output data.

4. The one or more non-transitory computer-readable media of claim 3, wherein the instructions for selecting the alternate output modality for displaying the initial output data further cause the one or more processors to:

determine a plurality of output modalities available to the user device, wherein the plurality of output modalities comprise an output media type and one or more output parameters associated with the output media type; and select the alternate output modality based on the output media type and the one or more output parameters.

5. The one or more non-transitory computer-readable media of claim 1, wherein the instructions further cause the one or more processors to:

determine that the request has been completed; and based on determining that the request has been completed, transmit one or more commands to the user device to change the alternate input modality to the initial input modality and an alternate output modality to an initial output modality.

6. A method for modifying input modalities, the method comprising:

receiving, by an artificial intelligence agent from a user device associated with a user, a request associated with an application comprising a component residing on the user device, wherein the request has been input using an initial input modality of the user device, and wherein the artificial intelligence agent is associated with a corresponding computer-executable operation set configured to be autonomously executed by the artificial intelligence agent on a software application set;

determining that the request requires additional user data to complete, wherein the additional user data is input by the user using the user device, and wherein the additional user data will comprise account identification data for accessing an account associated with the user;

based on determining that the additional user data will comprise the account identification data, assigning a high security level as a security level, wherein the high security level indicates that a high security modality is required;

determining that the initial input modality does not match the security level associated with the additional user data;

based on determining that the initial input modality does not match the security level associated with the additional user data, selecting, based on the security level associated with the additional user data, an alternate input modality based on available input modalities for the user device;

generating one or more instructions for generating an input interface according to the alternate input modality, wherein the input interface enables the user to input the additional user data via the alternate input modality; and providing the one or more instructions to the user device, wherein the user device generates the input interface and enables input of the additional user data via the input interface.

7. The method of claim 6, wherein the alternate input modality comprise one of a voice input, a gesture input, a touch input, a key-press input, or a biometric input.

8. The method of claim 6, wherein determining whether the initial input modality matches a privacy setting for inputting authentication data further comprises:

determining a location parameter and a movement parameter associated with a location of the user device;

determining audio characteristics of the location of the user device;

generating a security metric associated with the location of the user device; and determining, based on the security metric and the privacy setting, whether the initial input modality matches the privacy setting.

9. The method of claim 6, further comprising:

receiving initial output data from the application;

determining an initial output modality being used by the user device does not match an output security level associated with the initial output data; and selecting, based on the security level associated with the initial output data, an alternate output modality for displaying the initial output data.

10. The method of claim 9, wherein selecting the alternate output modality for displaying the initial output data further comprises determining a plurality of output modalities available to the user device, wherein the plurality of output modalities comprise an output media type and one or more output parameters associated with the output media type; and selecting the alternate output modality based on the output media type and the one or more output parameters.

11. The method of claim 6, further comprising:

determining that the request has been completed; and based on determining that the request has been completed, transmitting one or more commands to the user device to change the alternate input modality to the initial input modality and an alternate output modality to an initial output modality.

12. A system comprising:

one or more processors; and one or more memories storing instructions that when executed by the one or more processors cause the one or more processors to:

receive, by an artificial intelligence agent from a user device associated with a user, a request associated with an application comprising a component residing on the user device, wherein the request has been input using an initial input modality of the user device, and wherein the artificial intelligence agent is associated with a corresponding computer-executable operation set configured to be autonomously executed by the artificial intelligence agent on a software application set;

determine that the request requires additional user data to complete, wherein the additional user data is input by the user using the user device, and wherein the additional user data will comprise authentication data for authenticating with the application;

determine a security level associated with the additional user data, wherein the security level indicates a sensitivity level associated with the additional user data;

based on the additional user data comprising the authentication data, set the security level to a metric not compatible with the initial input modality;

determine that the initial input modality does not match the security level associated with the additional user data;

based on determining that the initial input modality does not match the security level associated with the additional user data, select, based on the security level associated with the additional user data, an alternate input modality based on available input modalities for the user device;

generate one or more instructions for generating an input interface according to the alternate input modality, wherein the input interface enables the user to input the additional user data via the alternate input modality; and provide the one or more instructions to the user device, wherein the user device generates the input interface and enables input of the additional user data via the input interface.

13. The system of claim 12, wherein the alternate input modality comprises one of a voice input, a gesture input, a touch input, a key-press input, or a biometric input.

14. The system of claim 12, wherein the instructions for determining the security level associated with the additional user data further cause the one or more processors to:

determine that the additional user data will comprise account identification data for accessing an account associated with the user; and based on determining that the additional user data will comprise the account identification data, assign a high security level as the security level, wherein the high security level indicates that a high security modality is required.

\* \* \* \* \*